US009317626B2

(12) United States Patent
Chan

(10) Patent No.: US 9,317,626 B2
(45) Date of Patent: Apr. 19, 2016

(54) METHOD AND SYSTEM FOR COMBINATORIAL LAYOUT DESIGN

(71) Applicant: Luen Shing Tools Limited, Kowloon (HK)

(72) Inventor: Wai Man Chan, Kowloon (HK)

(73) Assignee: Wai Man Chan, Hong Kong (CN)

( * ) Notice: Subject to any disclaimer, the term of this patent is extended or adjusted under 35 U.S.C. 154(b) by 762 days.

(21) Appl. No.: 13/678,496

(22) Filed: Nov. 15, 2012

(65) Prior Publication Data
US 2013/0132042 A1    May 23, 2013

Related U.S. Application Data

(60) Provisional application No. 61/560,294, filed on Nov. 16, 2011.

(51) Int. Cl.
*G06F 17/50* (2006.01)
*G06N 3/12* (2006.01)

(52) U.S. Cl.
CPC ............... *G06F 17/50* (2013.01); *G06N 3/126* (2013.01); *G06F 2217/08* (2013.01); *G06F 2217/41* (2013.01)

(58) Field of Classification Search
CPC . G06F 17/50; G06F 2217/41; G06F 2217/08; G06N 3/126
USPC ............................................................ 703/1
See application file for complete search history.

(56) References Cited

U.S. PATENT DOCUMENTS 6,836,699 B2    12/2004    Lukis et al.
7,089,082 B1     8/2006    Lukis et al.
7,123,986 B2    10/2006    Lukis et al.
(Continued)

FOREIGN PATENT DOCUMENTS

CN         1979496 A      6/2007

OTHER PUBLICATIONS

Ben Hutt and Kevin Warwick, "Synapsing Variable Length Crossover: Biologically Inspired Crossover for Variable Length Genomes", IEEE trans. Evolutionary Computation, vol. 11, issue 1, pp. 118-131, 2007.
(Continued)

*Primary Examiner* — Dwin M Craig
(74) *Attorney, Agent, or Firm* — Eagle IP Limited; Jacqueline C. Lui

(57) ABSTRACT

The present invention discloses a method for combinatorial layout design, in particular family mold layout design, using a computer. The method starts with receiving design specific parameters and information about molding parts from user. A Genetic Algorithm module is then invoked to generate a population of layout designs which satisfies the design specific parameters. The Genetic Algorithm module first automatically generates a population of specially designed chromosome with three interdependent sessions. Crossover, mutation and replacement operation are applied on the population subsequently to evolve such towards a more optimal population over successive generations. In each generation step, a Genotype-Phenotype mapping module is utilized to decode the chromosome to corresponding layout design for fitness evaluation. A system for combinatorial layout design automation and optimization using this evolutionary design approach is also disclosed in the present invention.

16 Claims, 34 Drawing Sheets

(56) References Cited

U.S. PATENT DOCUMENTS

| | | | | |
|---|---|---|---|---|
| 2005/0261953 | A1* | 11/2005 | Malek et al. | 705/10 |
| 2006/0277004 | A1* | 12/2006 | Wang et al. | 703/1 |
| 2007/0078634 | A1* | 4/2007 | Krishnapillai | 703/1 |
| 2010/0185312 | A1* | 7/2010 | Wang et al. | 700/104 |

OTHER PUBLICATIONS

Inman Harvey, "The SAGA Cross: The Mechanics of Recombination for Species with Variable-length Genotypes", Parallel Problem Solving from Nature 2, pp. 269-278, 1992.
Kun-Chih Chen et. al., "A fast approach to automatic runner balance", ANTEC, 2000.
Kevin Alan and Masa R. Kamal, "A robust optimization of injection moulding runner balancing", Computers and Chemical Engineering, vol. 29, pp. 1934-1944, 2005.
Guoyan Yu, "Application of Genetic Algorithms to Conceptual Design of Injection Mould", Third International Conference on Natural Computation, vol. 4, pp. 517-521, 2007.
C. S. Chen, "Determination of the Injection Molding Process Parameters in Multicavity Injection Molds", Journal of Reinforced Plastics and Composites, vol. 25, pp. 1367-1373, 2006.
John S. Gero et. al., "Evolutionary Learning of Novel Grammars for Design Improvement", Artificial Intelligence for Engineering, Design, Analysis and Manufacturing, vol. 8, issue 2, pp. 83-94, 1994.
Gabor Renner and Aniko Ekart, "Genetic Algorithms in Computer Aided Design", Computer-Aided Design, vol. 35, pp. 709-726, 2003.
P. J. Bentley and J. P. Wakefield, "Hierarchical Crossover in Genetic Algorithms", Proceedings of the 1st On-line Workshop on Soft Computing (WSC1), pp. 37-42, 1996.
Kevin Alan and Musa R. Kamal, "Runner Balancing by a Direct Genetic Optimization of Shrinkage", Polymer Engineering and Science, vol. 44 No. 10, pp. 1949-1959, 2004.
M. Zhai, Y. C. Lam and C. K. Au, "Runner Sizing in Multiple Cavity Injection Mould by Non-dominated Sorting Genetic Algorithm", Engineering with Computers, vol. 25, issue 3, pp. 237-245, 2009.
Rohinton K. Irani et. al., "Runner System Balancing for Injection Molds using Approximation Concepts and Numerical Optimization", Proc. 18th Annual ASME Des. Autom. Conf., pp. 255-261, 1992.
Orestes Chouchoulas and Alan Day, "Design Exploration using a Shape Grammar with a Genetic Algorithm", Open House International, vol. 32, No. 2, pp. 26-35, 2007.
K. M. M Saridakis and A. J. Dentsoras, "Soft Computing in Engineering Design—A Review", Advanced Engineering Informatics, vol. 22, pp. 202-221, 2008.
Hyung-Pil Park et. al., "Variable Runner System for Family Mold Filling Balance", Solid State Phenomena, vol. 116-117, pp. 96-101, 2006.
J. Cagan et. al., "A Survey of Computational Approaches to Three-Dimensional Layout Problems", Computer-Aided Design, vol. 34, pp. 597-611, 2002.
Ho Cheong Lee and Ming Xi Tang, "Evolving Product form Designs Using Parametric Shape Grammars Integrated with Genetic Programming", Artificial Intelligence for Engineering Design, Analysis and Manufacturing, vol. 23, pp. 131-158, 2009.
Kevin Alan and Musa R. Kamal, "Runner Balancing by a Direct Genetic Optimization of Shrinkage", Polymer Engineering and Science, vol. 44, No. 10, pp. 1949-1959, 2004.
W. M. Chan et. al., "A 3D CAD Knowledge-based Assisted Injection Mould Design System", Int. J. Adv. Manuf. Technol., vol. 22, pp. 387-395, 2003.
Steven Manos et. al., "A Genetic Algorithm with a Variable-Length Genotype and Embryogeny for Microstructured Optical Fibre Design", Proceeding of Genetic and Evolutionary Computation Conference, pp. 87-124, 2006.
Philipp Rohlfshagen and John A. Bullinaria, "A Genetic Algorithm with Exon Shuffling Crossover for Hard Bin Packing Problems", Proceeding of Genetic and Evolutionary Computation Conference, pp. 1365-1371, 2007.
K. Y. Chan et. al., "A New Orthogonal Array Based Crossover with Analysis of Gene Interactions for Evolutionary Algorithms and its Application to Car Door Design", Expert Systems with Application, vol. 37, pp. 3853-3862, 2010.
M. L. H. Low and K. S. Lee, "A Parametric-Controlled Cavity Layout Design System for a Plastic Injection Mould", Int. J. Adv. Manuf. Technol., vol. 21, pp. 807-819, 2003.
X. G. Ye et. al., "Automatic Initial Design of Injection Mould", Int. J. of Materials and product Technology, vol. 16, No. 6/7, pp. 592-604, 2001.
Hal Stringer and Annie S. Wu, "Behavior of Finite Population Variable Length Genetic Algorithms under Random Selection", Proceeding of Genetic and Evolutionary Computation Conference, pp. 1249-1255, 2005.
Mei Choo Ang et. al., "Combining Evolutionary Algorithms and Shape Grammars to Generate Branded Product Design", Design Computing and Cognition, pp. 521-539, 2006.
Oguzhan Hasancebi and Fuat Erbatur, "Evaluation of Crossover Techniques in GA Based Optimum Structural Design", Computers and Structures, vol. 78, pp. 435-448, 2000.
Rafal Kicinger et. al., "Evolutionary Computation and Structural Design: A survey of the State-of-the-Art", Computers and Structure, vol. 83, pp. 1943-1978, 2005.
Maria L. H. Low and K. S. Lee, "3D Rapid Realization of Initial Design of Plastic Injection Mould", Journal of the Institution of Engineers, vol. 44, issue 4, pp. 15-30, 2004.
V. Oduguwa et. al., "Evolutionary Computing in Manufacturing Industry: An Overview of Recent Applications", Applied Soft Computing, vol. 5, pp. 281-299, 2005.
Michael O'Neill et. al., "Evolutionary Design Using Grammatical Evolution and Shape Grammars: Designing a Shelter", Int. J. Design Engineering, vol. 3, No. 1 , 2010.
Manabu kotani, "Evolutionary Discriminant Functions Using Genetic Algorithms with Variable-Length Chromosome", in proceedings of International Joint Conference on Neural Networks, vol. 1, pp. 761-766, 2001.
Riccardo Poli and Nicholas Freitag McPhee, "Exact Schema Theory for GP and Variable-length GAs with Homologous Crossover", Proceeding of Genetic and Evolutionary Computation Conference, pp. 104-111, 2001.
Ho Cheong Lee and Ming Xi Tang, "Generating Stylistically Consistent Product form Designs using Interactive Evolutionary Parametric Shape Grammars", Proceeding of International Con. Computer-Aided Industrial Design and Conceptual Design, pp. 1-6, 2006.
Alberto Moraglio et. al., "Geometric Crossovers for Multiway Graph Partitioning", Evolutionary Computation, vol. 15, issue. 4, pp. 445-474, 2007.
Alok K. Priyadarshi and Satyandra K. Gupta, "Geometric Algorithms for Automated Design for Multi-piece Permanent Molds", Computer-Aided Design, vol. 36, pp. 241-260, 2004.
Venkatesh Katari et. al., "Hybridized Improved Genetic Algorithm with Variable Length Chromosome for Image Clustering", IJCSNS International Journal of Computer Science and Network Security, vol. 7, No. 11, 2007.
Ivan W. M. Chan et. al., "A review of research, commercial software packages and patents on family mould layout design automation and optimisation", Int. J. Adv. Manuf. Technol., vol. 57, pp. 23-47,2011.
Weigang Hu and Syed Masood, "An Intelligent Cavity Layout Design System for Injection Moulds", International Journal of CAD/CAM, vol. 2, No. 1, pp. 59-75, 2002.
Annie S. Wu and Wolfgang Banzhaf, "Introduction to the Special Issue: Variable-Length Representation and Noncoding Segments for Evolutionary Algorithms", Evolutionary Computation, vol. 6, No. 4, pp. 3-6, 1999.
Riccardo Poli et. al., "Markov Chain Models for GP and Variable-Length GAs with Homologous Crossover", Proceedings of the Genetic and Evolutionary Computation Conference, pp. 7-11, 2001.
M. A. Amran et. al., "Optimisation of Gate, Runner and Spure in Two-plate Family Plastic Injection Mould", Proceeding of International Conference on Advancement of Materials and Nanotechnology, pp. 309-313, 2007.

(56) References Cited

OTHER PUBLICATIONS

Jian Sun et. al., "Shape Optimisation Using Evolutionary Techniques in Product Design", Computers & Industrial Engineering, vol. 53, pp. 200-205, 2007.

Peter Bentley, "The Revolution of Evolution in Design: From Coffee Tables to Hospitals", In Proc. of Recent Advances in Soft Computing, 1998.

Thomas H. Speller, "Using Shape Grammar to Derive Cellular Automata Rule Patterns", Complex Systems, vol. 17, pp. 79-102, 2007.

Ho Cheong Lee, "The development of parametric shape grammars integrated with an interactive evolutionary system for supporting product design exploration", The Hong Kong Polytechnic University, 2006.

C. G. Li and Yuguang Wu, "Evolutionary Optimization of Plastic Injection Mould Cooling System Layout Design", Proc. Of International Conference on Intelligent System Design and Engineering Application, pp. 693-696, 2010.

* cited by examiner

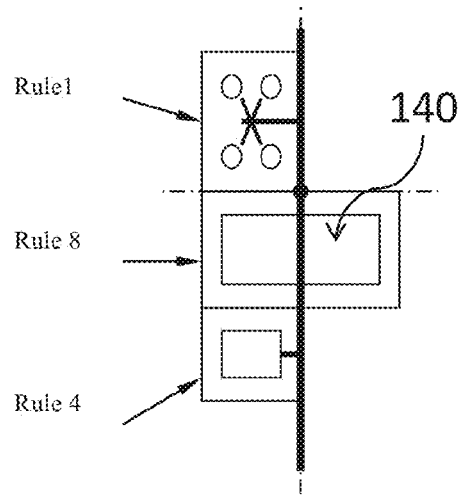
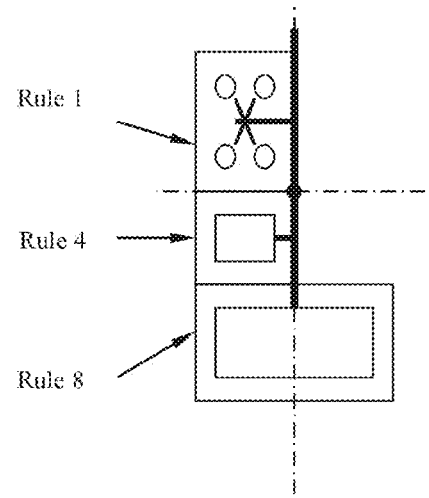
Figure 6a　　　　　　Figure 6b
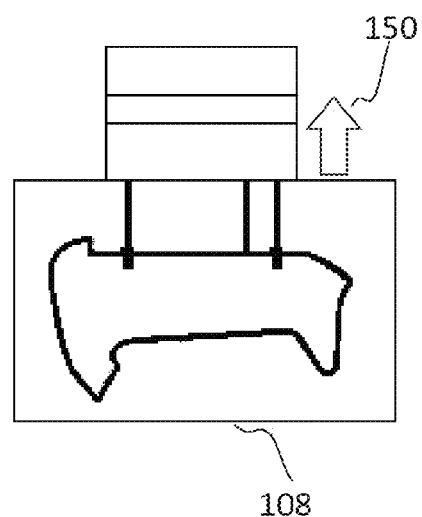
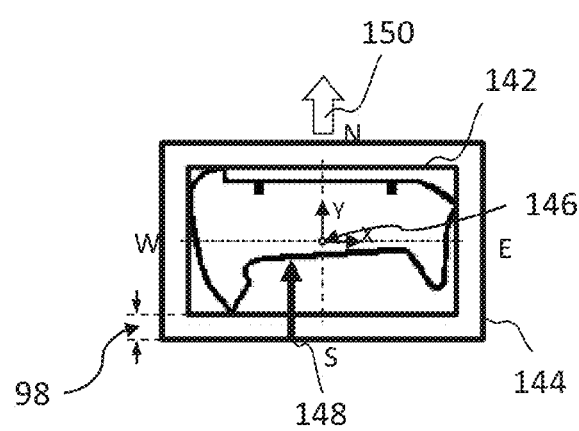
Figure 7a　　　　　　Figure 7b

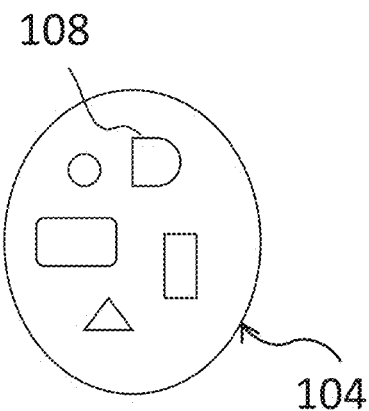
Figure 9a        Figure 9b
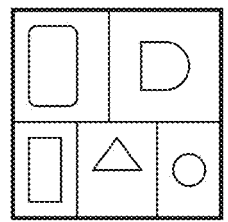
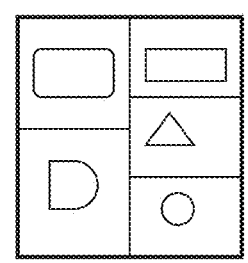
Figure 9c        Figure 9d        Figure 9e
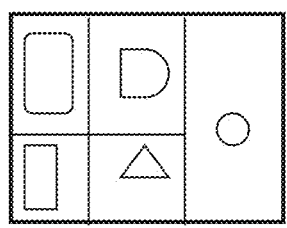
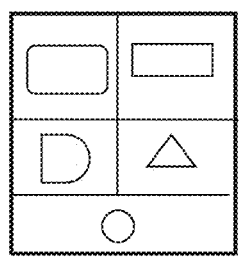
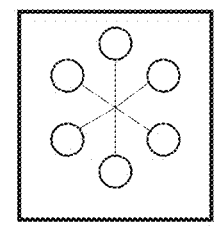
Figure 9f        Figure 9g        Figure 9h

METHOD AND SYSTEM FOR COMBINATORIAL LAYOUT DESIGN

CROSS-REFERENCE TO RELATED APPLICATION

This application claims benefit under 35 U.S.C. §119(e) of U.S. Provisional Application having Ser. No. 61/560,294 filed in Nov. 16, 2011, which is hereby incorporated by reference herein in its entirety.

FIELD OF INVENTION

This invention relates to a method and system for combinatorial layout design automation and optimisation.

BACKGROUND OF INVENTION

Combinatorial layout design has been a challenging research topic in engineering as well as operation research. In general, combinatorial layout design is a process of allocating a set of space elements on a layout base, performing grouping and designing topological and geometrical relationships between them according to certain design objectives and constraints. Therefore, a wide variety of application areas ranging from family mould layout design, architectural floor plan layout design and component space layout design to circuit board layout design, page layout design and user-interface menu layout design involve combinatorial layout design.

For example, family mould layout design is one of good application examples of combinatorial layout design, Family moulds are widely used in some industries, such as toys and domestic products, because family moulds can offer an efficient and economical way to produce dissimilar plastic parts of the same plastic material and colour for small-to-medium production volume. In Family Mould Layout Design (FMLD), Family Mould Cavity and Runner Layout Design (FMCRLD) is the most critical task that significantly affects the cost and performance of a family mould because it determines many key design and cost factors such as filling balance performance, runner cost, mould insert cost, mould base cost and so forth. Each family mould is custom-made and unique. Different family moulds must be newly designed to meet different design requirements and constraints. Therefore, FMCRLD is non-repetitive and generative. Besides, FMCRLD involves a large number of combinations of various cavity layout and associated runner layout design alternatives and design considerations. In practice, it is virtually impossible for mould designers to try out all possible design alternatives manually to find the best trade-off solution between mould performance and cost. Existing human-dependent manual FMCRLD methods and the shortage of experienced mould designers cause long design lead time, non-optimum designs and costly human errors. FMCRLD is demanding and experience-dependent. Performing FMCRLD can be regarded as a "black art" of family mould design. A computer-based design tool to assist less experienced mould designers in performing FMCRLD is urgently needed. However, over the years, no published research, commercial software package or patented system can support FMCRLD automation and optimisation. For example, most Mechanical Computer-Aided Design (MCAD) systems can provide parametric cavity layout functions that can automate routine and regular cavity layout design of "One Product Moulds" using pre-defined standard cavity layout configuration templates. However, they cannot support FMCRLD automation and optimisation. Research on mould design has been widely reported over the years. However, research on FMCRLD automation and optimisation has gained little attention. No previous research can automatically generate a global optimum FMCRLD for mass production of complex-shaped parts (with no geometric limitation) considering a number of mould layout design objectives (such as maximization of filling balance performance, clamping force balance performance and drop time performance, and minimization of mould base cost, mould insert cost, runner scrap cost, slider cost and injection moulding cost) and constraints (such as mould base size limitations of customer's available injection moulding machines).

In family mould design, runner system balancing is one of the most important issues. Traditionally, runner and gate design are experience-dependent. In the past, a balanced runner system was achieved by adding runner shut-offs, using flow restrictors or adjusting gate sizes in the test-shot phase based on a trial-and-error basis. This iterative process of testing and re-machining on the mould is very costly and time-consuming. Today, through the use of advanced commercial mould flow Computer-Aided Engineering (CAE) simulation software packages, mould designers can determine the diameters of each individual runner segments of a given initial runner layout design to achieve artificial filling balance of a family mould before building the mould. However, it still require an experienced engineer to provide an initial runner layout and gate design beforehand, and correctly diagnose the simulation results and adjust the diameter of each runner segment based on a trial-and-error basis. Moreover, artificial filling balance of family moulds should be done by balancing the pressure drops in each flow branch with a proper cavity layout, runner lengths and diameters. A better FMCRLD can improve the artificial filling balance performance with a wider process window. However, existing commercial mould flow CAE software packages cannot considerate numerous combinations of FMCRLD automatically when performing artificial filling balance of family moulds. Because of the costly, tedious and time-consuming data preparation for filling balance analysis of numerous different FMCRLD, it is virtually impossible for mould designers to try all possible FMCRLD combinations and do such time-consuming mould filling analysis to fine-tune all of them one by one to search for the best solution. Over the years, many researchers have attempted to address the problems of runner system balancing for multiple-cavity moulds (including family moulds) using various optimisation approaches. However, all the previous research on runner system balancing did not consider the numerous possible combinations of different runner layout design interrelated with different cavity layout design in family moulds.

In other application areas, similar to family mould layout design, architectural space layout design, component space layout design, circuit board layout design, page layout design, user-interface menu layout design and so forth also involve allocating a set of space elements on a layout base, performing grouping and designing topological and geometrical relationships between them satisfying their specific design objectives and constraints. All of them are complex, combinatorial, non-repetitive, generative and human-dependent. Some specialised software tools can support designers to produce a geometrical layout design. However, when human designers deal with large and complex layout design problems, they easily get bored, distracted and tend to make mistakes. A good layout design still highly depends on a human designer's experience, knowledge, and creative ability. Combinatorial layout design automation and optimisation is full of challenges. Traditional design automation approaches, such as rule based reasoning, case-based reasoning and parametric design template, cannot produce truly creative, unpredictable or novel layout design solutions because they are unable to imitate human creativity based on pre-processed human problem-solving knowledge or human-generated solutions. Moreover, a solution space of a combinatorial layout design problem is so large that design knowledge cannot be captured, formulated, reused and represented in the form of rules, cases or design templates efficiently. On the other hand, traditional optimisation techniques, such as linear programming, branch and bound and gradient-based algorithms have been adopted to find the optimum strip packing layout design and container stuffing. These traditional optimisation techniques are efficient to search for the nearest local optimal solution with respect to the given initial solution. However, they are limited to a narrow class of simple layout problems where explicit mathematical equations describing the objective functions and constraints are available. In practice, finding a global optimum layout solution to a combinatorial layout design problem cannot be treated as an ordinary design parameter optimisation problem with a fixed number of variables based on a given initial layout design. In addition, layout design objectives and constraints and interactions among them are difficult to build as true mathematical models. More importantly, a search space of a combinatorial layout design problem is so large that optimisation should aim at searching for a population of good layout design solutions rather than a single local optimum one. In addition to the aforementioned optimisation techniques, Heuristic Rule-based (HR) algorithms are commonly used to solve specific types of packing and cutting stock problems. Previous research demonstrated that acceptable layout solutions could be generated efficiently based on special heuristic rules derived from common sense or experiences. However, these HR approaches are only applicable to a specific class of component space layout design problems where well-formed heuristic rules are available. Moreover, because of these reasons, such traditional optimisation techniques are unable to navigate such large search spaces to find near optimum solutions globally and are likely to be inferior local optima. In order to overcome the limitations of such traditional optimisation techniques, other researchers focused on seeking optimum layout solutions globally using Meta-Heuristic Search (MHS) techniques, such as Tabu Search (TS), Simulated Annealing (SA) and Genetic Algorithms (GA). TS is a dynamic neighbourhood search technique combined with memory-based strategies. It has been successfully applied to many combinatorial component space layout optimisation problems such as the two-dimensional cutting stock problem and three-dimensional bin-packing problem. Meanwhile, SA is an iterative improvement algorithm simulating the metallurgical annealing of heated metals. It has been widely used in circuit layout design, manufacturing facility layout design, three-dimensional mechanical and electro-mechanical component layout design and Heat, Ventilation and Air Conditioning (HVAC) routing layout design. GA is a stochastic search technique inspired by the biological phenomenon of the natural evolutionary process of survival of the fittest. It has been proven to be reliable and able to deal with complex combinatorial and multi-objective layout problems in a wide variety of application areas ranging from runner size optimisation and strip packing layout design to floor plan layout design and Very-Large-Scale-Integration (VLSI) circuit layout design. GA is superior to TS and SA because GA can deal with populations of solutions rather than a single solution. Therefore, GA can explore the neighbourhood of the whole population and does not strongly rely on the initial solution. Besides, GA can exchange the information of a large set of parallel solutions in the population through the evolutionary process. Thus GA appears to show great potential to support combinatorial layout design optimisation with its explorative and generative design process embodied in a stochastic evolutionary search. However, combinatorial layout design automation and optimisation using GA is full of challenges. This is because GA is very problem-specific. GA highly depends on a proper chromosome design and genetic operator design specially developed for a specific application problem.

Traditionally, binary representations (e.g. 01001011 011 . . . ) are the most common representations for many combinatorial optimisation problems because the binary representation allows a direct and very natural encoding. Chromosomes in GA can also be represented in other forms, such as integer representations, real-valued representations, messy representations and direct representations. Chromosome design is very problem-specific. In some cases, it is not practical to encode a complex design problem using traditional chromosome representation methods. For example, combinatorial layout design involves grouping problems. Designers need to decide how many groups should be divided and which space elements should be grouped together to make a good layout solution. Most previous research using either standard or ordering chromosome design are not suitable for grouping problems because standard or ordering chromosome is object oriented rather than group oriented. Moreover, no previous research can deal with combinatorial layout design problems, which involves solving both grouping problems and space layout design problems at the same time. In fact, using different chromosome design can affect GA performance dramatically. Designing a proper chromosome remains the black art of GA research.

On the other hand, crossover is the most important genetic operator of GA. Crossover aims to combine pieces of genetic information from different individuals in the population. Every generation inherits traits from its parents through genes. In a fixed-length chromosome, the allele (parameter or feature value) for a particular gene (parameter or feature) is coded for at a particular locus (genotype position). It is simple for a standard crossover operator to exchange homologous segments divided by the same crossover point in each parent genotype. However, combinatorial layout design problems cannot be simply encoded into fixed-length chromosomes because numbers of groups and numbers of space elements in each group are variable and unknown beforehand. When variable-length chromosomes are used, no homologous segments divided by the same crossover point in each parent genotype can be exchanged to produce offspring that can inherit meaningful building blocks from both parents. It may produce invalid offspring because genes are combined independently from each of both parents in a cut-and-concentrate manner during a crossover process. A special chromosome requires a specialised crossover operator to inherit and recombine individuals' important genetic properties from generation to generation. Designing a crossover operator to produce valid offspring that can inherit meaningful building blocks from both parents with chromosomes containing grouping genetic information, space layout genetic information and so forth is very challenging.

SUMMARY OF INVENTION

In the light of the foregoing background, it is an object of the present invention to provide an evolutionary design method for combinatorial layout design automation and optimisation using GA. Another object is to provide a method and system, entitled "Intelligent Conceptual Mould Layout Design System (ICMLDS)" as a domain-specific realisation of the combinatorial layout design approach. The ICMLDS is customised based on said evolutionary design method to support automation and optimisation of FMCRLD at the early conceptual layout design stage for mass production of complex-shaped plastic parts.

In the ICMLDS, mould designers only need to provide information of moulding parts (such as overall dimensions, shape codes, wall thickness dimensions, types and locations of gates, dimensions and locations of sliders, and plastic material) and moulding requirements of a family mould (such as required numbers of shots and estimated cycle time for production). Without any experienced mould designers' intervention, the ICMLDS can automatically generate global optimum FMCRLD solutions from scratch considering multiple mould layout design optimisation objectives and constraints for mass production. The mould layout design optimisation objectives are: maximisation of filling balance performance, clamping force balance performance and drop time performance, and minimisation of mould base cost, mould insert cost, runner scrap cost, slider cost and injection moulding cost. The mould layout design constraints relate to validity issues in FMCRLD and mould base size limitations of customer's available injection moulding machines. In addition, mould designers are allowed to adjust weighting factors of the aforementioned performance and cost objectives, and specify the mould base size constraint to fulfil different customers' requirements. Accordingly, the ICMLDS can automatically evolve a population of good and error-free FMCRLD solutions, which can satisfy the specific family mould design optimisation objectives and constraints. Then, mould designers can browse and visualise different FMCRLD alternatives associated with their fitness values in the population to select the best trade-off FMCRLD solution between performance and cost. Based on the selected FMCRLD solution, the ICMLDS seamlessly integrated with a Pro/Engineer® Wildfire® 4.0 MCAD system can automatically generate a preliminary mould design assembly model and mould layout drawing associated with a table of Bill of Material (BOM), mould design configuration and specification for streamlining multiple mould development workflows starting from the early quotation phase to the later downstream detail mould design and manufacturing phase.

Accordingly, the present invention, in one aspect, is a method implemented on a computer for family mould layout design. The method comprising: (a) providing a knowledgebase for family mould layout design; (b) providing a means for encoding the FMCRLD using a specially designed chromosome; (c) providing a Genotype-Phenotype mapping module for decoding the specially design chromosome to a family mould layout solution; (d) receiving design specific parameters via a user input interface module; (e) invoking a Genetic Algorithm (GA) method that can automatically generate a population of valid chromosomes, which correspond to feasible FMCRLD solutions; and evolve the population towards a resulting one which satisfies the user-specified design specific parameters over successive generations; in each generation, the Genotype-Phenotype mapping module is utilised to decode the population of valid chromosomes to a corresponding population of FMCRLD solutions; (f) facilitating users to learn and search for the best FMCRLD solution by exploring and visualising different optimised FMCRLD solutions through an instant design feedback of quantitative fitness values; and (g) generate a mould design assembly model and mould layout drawing according to the selected best FMCRLD solutions.

In one embodiment, the knowledgebase comprise a set of group placement rules, a set of internal cavity layout rules, a set of runner layout shape rules, a plurality of mould design knowledgebase, which comprise a standard mould base database, empirical formula of runner sizes, empirical cavity layout design rules and empirical design rules of sliders and a group of feasible family mould layout design alternatives. These alternatives are generated via applying the group placement rules, internal cavity layout rules and runner layout shape rules to various initial shapes successively In another embodiment, the FMCRLD comprises at least two cavity groups. Each cavity group comprises a plurality of cavities which are inter-connected by runners. The encoding means encodes such FMCRLD to a specially designed chromosome with three interdependent sessions: (a) an orientation session contains a set of genes that control orientation of corresponding cavities; (b) a group session contains a set of genes that control cavity grouping design information of corresponding cavities; and (c) a variable-length group layout shape rule session contains a set of genes that control geometric and topological layout information of corresponding cavities, cavity groups and runners in a family mould.

In yet another embodiment, the Genotype-Phenotype mapping module performs the mapping that comprises the steps of: (a) reading data of the chromosomes; (b) decoding each chromosomes based on the knowledgebase; (c) for each cavity group, computing assembly coordinates of each cavity and creating runner for connecting all cavities within the cavity group; (d) selecting suitable mould bases from the standard mould base database in the knowledgebase for accommodating all cavity groups computed from step (c); (e) determining the diameter of each runner according to empirical formula of runner sizes in the knowledgebase; and (f) determining the configuration of sliders based on empirical design rules of sliders in the knowledgebase.

In one embodiment, the GA method comprises the steps of: (a) generating a population of valid chromosomes automatically based on the knowledgebase; (b) using the Genotype-Phenotype mapping module to decode the population of valid chromosomes into phenotypes for fitness evaluation; (c) using a fitness evaluation algorithm to evaluate fitness values of all phenotypes in the population; (d) selecting two chromosomes from the population as parents by using a tournament selection strategy based on their fitness values; (e) generating at least one valid offspring chromosome by utilising a crossover operation to the selected parents; (f) mutating the offspring chromosome by a mutation operation; (g) decoding the offspring chromosomes to a corresponding phenotype; (h) evaluating fitness values of the offspring phenotypes; (i) ranking all chromosomes in the population according to their fitness values and identifying the lowest rank chromosomes; (j) if one of the fitness values of the two offspring chromosomes is better than that of the lowest rank chromosome, replacing the lowest rank chromosome with the better offspring chromosome; (k) repeating step (d) to step (j) until a pre-defined generation gap (i.e. the number of the lowest rank chromosomes being replaced at each generation) is attained; and (l) repeating steps (d) to (k) over successive generations until one of predefined stopping criteria is attained.

In another embodiment, the step for generating a population of valid chromosomes further comprises the steps of: (a) randomly creating a plurality of cavity groups, the quantity of the plurality of cavity groups should be greater than two and less than or equal to the quantity of the moulding parts; (b) randomly filling the group session of the chromosome by assigning at least one moulding part to each cavity group; (c) filling the variable-length group layout shape rule session with a combination of identification numbers of group placement rule, internal cavity layout rule and runner layout shape rule respectively; wherein the valid identification numbers are chosen randomly, but the combination of them is conformed to the knowledgebase; and (d) filling the orientation session by assigning an orientation parameter to each moulding part.

In another embodiment, the fitness values evaluation step further comprises the steps of: (a) calculating a first weighted sum of plurality of costs; (b) calculating a second weighted sum of plurality of performance values; and (c) computing the fitness value which is a ratio of the first weighted sum to the second weighted sum computed from step (a) and step (b) respectively.

In yet another embodiment, the plurality of costs comprise cost of mould insert, cost of mould base, cost of runners, cost of external sliders, cost of injection moulding and a penalty cost of violating the predefined design specific parameters; whereas the plurality of performance values comprise flow path balance performance value, runner diameter balance performance value, clamping force balance performance value and drop time performance value.

In another embodiment, the crossover operation comprises the steps of: (a) selecting at least gene in the group layout shape rules session in each of the two parents as crossing groups; (b) injecting the crossing groups into each other; (c) copying corresponding gene in the orientation session and the group session associated with the crossing groups into each other to generate the offspring chromosomes; (d) eliminating the moulding parts that occur more than once and the cavity group that does not contain any moulding part in the offspring chromosomes; and (e) changing sliders based on new location and orientation of the moulding parts.

In another embodiment, the mutation operation performs one of the following steps: (a) changing the orientation session of the offspring chromosome randomly; (b) changing the group session of the offspring chromosome randomly and eliminating any empty cavity groups therefrom; (c) creating a new group in the group layout shape rule of the offspring chromosome randomly, assigning one of the moulding parts to the new group; and updating the group sessions of the offspring chromosome accordingly; (d) randomly modifying the group placement rule, the internal cavity layout rule or the runner layout shape rule of at least one group in the group layout shape rule session of the offspring chromosome; or (e) any combination of the above.

In a further embodiment, the GA method terminates its execution when one of the following predefined stopping criteria occurs: (a) a maximum number of generations specified by the user is reached; (b) a maximum running time specified by the user is reached; (c) no improvement between the first cost performance values and the second cost performance values for a sequence of predefined number of iterations in the repeating step is found; or (d) any combination of the above conditions occurs.

According to another aspect of the present invention, it is a system for family mould layout design. The system comprises: (a) a knowledgebase; (b) an encoding module for encoding family mould layout designs to chromosomes; (c) a Genotype-Phenotype mapping module for decoding the chromosome to phenotypes that represent family mould layout solution; (d) a user input interface module for receiving design specific parameters; (e) a Genetic Algorithm module for generating a population of valid chromosomes and evolving the population towards a resulting one which satisfies the user-specified design specific parameters and optimum mould flow filling balance over successive generations; and (f) a system output interface module for exploration and visualisation of family mould layout design solution and generation of mould design assembly model and mould layout drawing.

In another embodiment, the knowledgebase of the system further comprises: (a) a group placement rules dataset; (b) an internal cavity layout rules database; (c) a runner layout shape rules database; (d) a plurality of mould design knowledge comprising standard mould base database, database of empirical formula of runner sizes, database of empirical cavity layout design rules and database of empirical design rules of sliders; and (e) a feasible family mould layout design alternatives database.

In yet another embodiment, the family mould layout comprises at least two cavity groups. Each cavity group comprises a plurality of cavities which are inter-connected by runners. The encoding module of the system further comprises three submodules: (a) an orientation encoding submodule for encoding the orientation of the cavity to an orientation session of the chromosome; (b) a cavity group encoding submodule for encoding the cavity grouping design information to a group session of the chromosome; and (c) a geometric encoding submodule for encoding the geometric and topological layout information of the cavity and runners to a variable-length group layout shape rule session of the chromosome.

In another embodiment, the user interface module of the system further comprises a storage means for storing design specific parameters, for example information regarding the moulding parts, design objectives and constrains, moulding requirements and predefined parameters and stopping criteria for the Genetic Algorithm module.

In a further embodiment, the Genetic Algorithm module further comprises: (a) a retrieving submodule for retrieving design specific parameters, encoded chromosome and phenotypes from storage mean of the interface module, encoding module and Genotype-Phenotype mapping module respectively; (b) an initialisation submodule for generating a population of valid chromosomes; (c) a fitness evaluation submodule for computing quantitative fitness values of the phenotype; (d) a mould cost estimation submodule for calculating a plurality of cost factors of the phenotype; (e) a parent selection submodule for selecting two parents from said population of valid chromosome using tournament selection strategy; (f) a crossover operation submodule for producing at least one offspring chromosome from the selected parents; (g) a mutation operation submodule for mutating the offspring chromosomes randomly; (h) a replacement submodule for replacing the lowest rank chromosome in the population by the offspring chromosome if the chromosome has a higher fitness value than that of the lowest rank chromosome; and (i) a termination submodule for terminating the Genetic Algorithm module when any one of the predefined stopping criteria is attained.

In yet another embodiment, the system output interface module further comprises: (a) a data retrieving submodule for retrieving information from the Genetic Algorithm module; (b) a rapid visualisation submodule for visualising family mould layout designs, which are decoded from the population of valid chromosome utilising the Genotype-Phenotype mapping module, and corresponding quantitative fitness values; (c) a graph plotting submodule for illustrating the change of quantitative fitness values across successive generations; and (d) a computer-aid-design submodule for generating mould design assembly model and mould layout drawing.

It should be noted that the present invention should not be limited to the field of family mould layout design, as described in the aforesaid embodiments. With domain-specific knowledgebase and corresponding design rules and Genotype-Phenotype mapping algorithm, the framework of the present invention could be generalised to fit in different kinds of combinatorial layout design.

In view thereof, a method for combination layout design using a computer is also disclosed in the present invention. The method comprises the step of (a) providing a knowledgebase for the combinatorial layout designs; (b) providing a mean for encoding the combinatorial layout design to chromosomes; (c) providing a Genotype-Phenotype mapping module for decoding the chromosomes to corresponding combinatorial layout solution, which are represented by phenotypes; (d) receiving design specific parameters via a user input interface module; and (e) invoking a Genetic Algorithm module to generate a population of valid chromosomes and evolve such towards a resulting one which satisfy the predefined design specific parameters over successive generations. In each generation, the chromosomes are evolved by a crossover operator and mutation operator and their fitness value are measured after decoding such to a layout solution by the Genotype-Phenotype mapping module.

One major advantage of the present invention is that its novel evolutionary design method and system can automate and optimise FMCRLD considering critical economic factors, mould design objectives and constraints for mass production of dissimilar complex-shaped plastic parts without any experienced mould designers' intervention, which dramatically reduces the total design lead time and improves the total quality of design of production family moulds.

Another advantage of the present invention is that it can streamline the workflows starting from the early quotation phase to the later detail design phase, which enables mould designers to free up a lot of time to further optimise the design and make the right decisions at the beginning. Most importantly, an individual mould designer's mistakes or bad design decisions on FMCRLD at an early design stage may cause some major design defects, such as serious short-shot and out of specification mould base size. If the FMCRLD proves to be totally faulty just before the mould is delivered, it will require high cost and time to rework the entire mould, involving purchasing a new mould base and tool material, machining the mould cavities and so forth. The present invention can generate error-free FMCRLD and eliminate the costly human errors.

Moreover, the present invention provides a rapid design visualisation and instant design feedback capabilities which enable less experienced mould designers to explore more what-if design scenarios in less time and thereby learn the art of family mould design by digital experimentation in an intelligent and interactive design environment. In other words, the present invention can provide not only a powerful intelligent design automation tool but also an interactive design-training tool capable of encouraging and accelerating mould designers' design alternative exploration, exploitation and optimisation for better design in less time. The present invention provides the ground-breaking evolutionary FMCRLD method and system that totally innovates the old-fashioned manual FMCRLD workflow to boost mould designers' ability and productivity in performing FMCRLD during the FMLD phase.

BRIEF DESCRIPTION OF FIGURES

FIG. 6a and FIG. 6b shows exemplary group layouts for the runner design.

FIG. 7a shows a real-life example of an individual cavity layout design and 7b shows the corresponding representation according to the present invention.

FIGS. 9a to 9h show a set of internal cavity layout rules of the present invention.

FIG. 11 shows summary of runner layout rules applied to various initial internal cavity layouts.

FIG. 16 shows the sub-dialogue menu of the ICMLDS for inputting the parameters of moulding requirements, design optimisation objectives and GA.

FIG. 17 shows the sub-dialogue menu of the ICMLDS for inputting the design optimisation constraints and the GA stopping criteria.

FIG. 34 shows the dialogue menu of the evolutionary process.

DETAILED DESCRIPTION OF THE PREFERRED EMBODIMENTS

As used herein and in the claims, "comprising" means including the following elements but not excluding others.

The present invention discloses a novel approach for combinatorial layout design, which involves allocating a set of space elements on a layout base, performing topological and geometrical grouping on them so as to satisfy certain user-specified design objectives and constraints. The Genetic Algorithm (GA) is adopted to explore and search a large feasible solution space, and through its stochastic evolutionary search process generates a set of creative design alternatives that yield an optimal population of valid layout solutions. A multi-session chromosome design is disclosed to encode the entire layout configuration and a corresponding Genotype-Phenotype mapping algorithm is used to decode the layout information in the chromosome and transform it to a physical layout. Special cross-over and mutation operators are also developed to operate on this multi-session chromosome. This novel layout design approach can be applied to many practical layout design problems, such as architectural space layout design, component space layout design, circuit board layout design, page layout design in a publication, user-interface menu layout design and so forth. For each of these applications, domain-specific knowledgebase and design rules will be used in connection with the GA module. However, the general framework of solving the combinatorial layout design remains the same.

Figure 1:
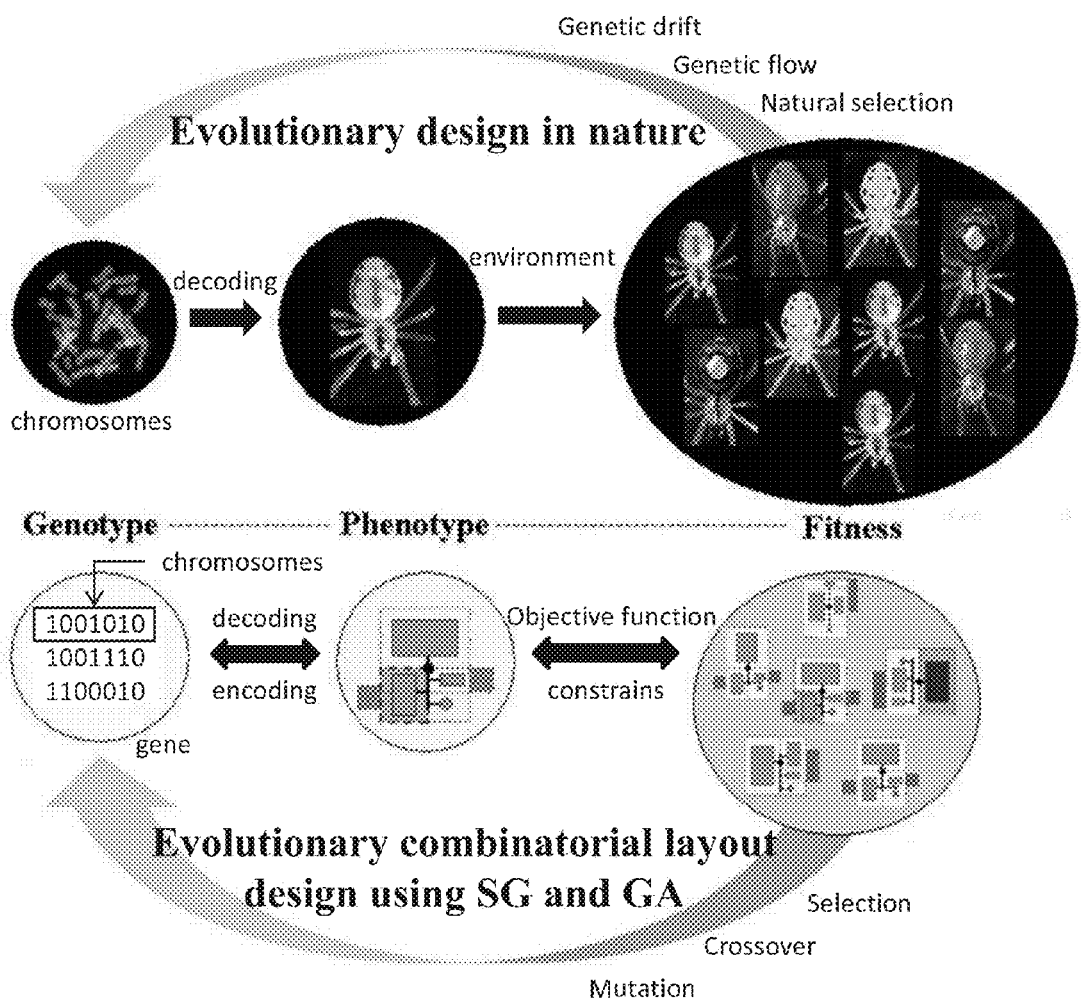
FIG. 1 shows the concept of a nature-inspired evolutionary combinatorial layout design of the present invention.

Referring now to FIG. 1, it shows the concept of a nature-inspired evolutionary combinatorial layout design of the present invention. Every living thing in the natural world is a masterpiece of evolved design. Evolutionary design in nature is the original and best evolutionary design system. In nature, a chromosome is an organised structure of Deoxyribonucleic Acid (DNA) and protein. A segment of DNA is called a "gene". Genes provide information that instructs an organism how to make an individual in many ways. The process of the generation of form in living systems involves the sequence of coded instructions for selecting and locating different kinds of protein in particular locations. Phenotype is an individual organism's actual observed physical properties decoded from its genotype. In nature, the fitness of an individual organism is measured by its ability to survive and produce offspring in its living environment. Evolution is the process of change in the inherited traits of a population of organisms from one generation to the next driven by three main mechanisms—natural selection, genetic drift and gene flow. Natural selection provides competition between organisms for survival and reproduction. Every generation inherits traits from its parents through genes. Consequently, stronger organisms' genes can be passed on to the next generation while weaker organisms die out. Gene flow is the transfer of genes within and between populations during reproduction through genetic recombination (crossover). Genetic drift is a random change (mutation) of gene information, also known as alleles, during reproduction. Taking the happy-face spider as an example, spiders with different colour patterns in many forms of smiles are generated through natural evolution because their predators (the Hawaiian Honeycreeper) are good at searching for the most common morph, the yellow morph. The main driving force behind evolutionary design in nature is "Survival of the Fittest".

Figure 2:
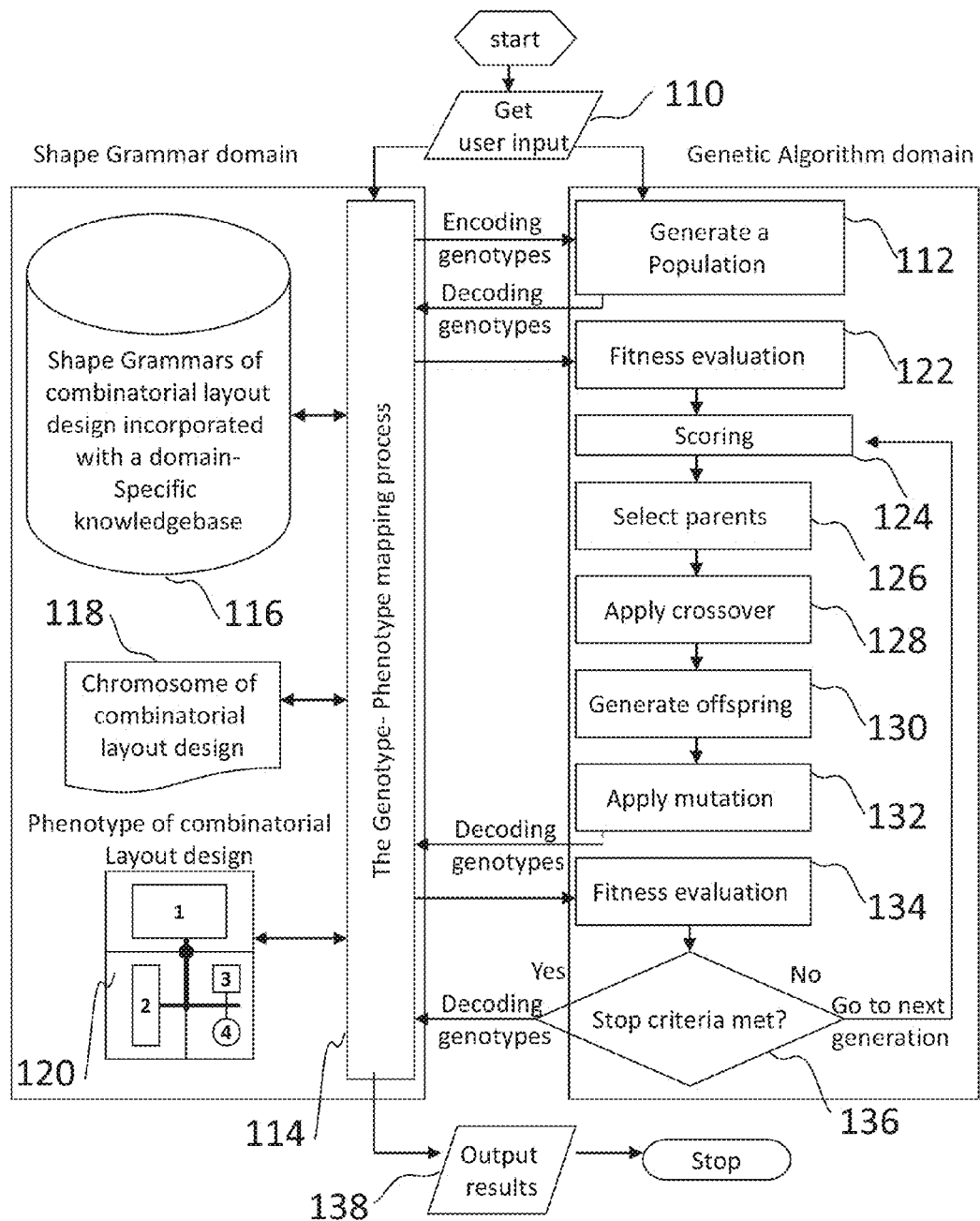
FIG. 2 shows the conceptual program flow chart of the evolutionary combinatorial layout design of the present invention.

FIG. 2 shows the conceptual program flow chart of the evolutionary combinatorial layout design. Based on the principle of "Survival of the Fittest", the main concept of the present invention is to simulate the natural evolutionary process to evolve combinatorial layout design using Shape Grammar (SG) and Genetic Algorithm (GA). Analogous to the biological growth of form in living systems as mentioned previously, a gene's locus is represented by a SG rule while the genotype (recipe) and the combinatorial layout design solutions are represented by the plan (sequence of rules) and phenotype (blueprint) respectively. Each genotype ("control" part) corresponds to a unique phenotype (the body features—the "controlled" part) through the Genotype-Phenotype mapping process 114 (see FIGS. 3 to 12 for more details). A SG of combinatorial layout design incorporated with a specific design knowledgebase 116 provides an encoding/decoding mechanism specially designed for evolving combinatorial layout design based on a specially designed hybrid SG-based chromosome 118 (see FIG. 13 for more details). The evolutionary process starts by receiving the user input at step 110 and proceeds to generating a population at step 112 using the knowledgebase 116 which comprises shape grammars of the combinatorial layout design and corresponding domain-specific knowledgebase. Then the genotypes are transformed into phenotypes 120 for the fitness evaluation process at step 122. A specific scoring scheme at step 124 is used to quantify the fitness value of each individual in the population considering multiple mould design objectives and constraints. The fittest ("best") members of the population are then selected at step 126 randomly to produce an offspring at step 130 through the crossover operation at step 128 (see FIG. 33 for more details). At step 132, the mutation introduces additional changes into the resulting genotype randomly to generate a new design solution (see FIGS. 34 to 37 for more details). Fitness evaluation will be done again in step 134 and weak individuals will be replaced by the better offspring and will disappear eventually during the natural evolutionary process. The selection, crossover and mutation operations are applied repeatedly to the population until the termination conditions are met at step 136. Finally, the program outputs the resulting population at step 138. The GA coupled with SG-based chromosomes 118 aims to allow for the generation of feasible and novel combinatorial layout design solutions and enable the GA to search for optimum solutions more efficiently. This approach can bring together the SG's design synthesis capability and the GA's capabilities of design space navigation and optimisation.

A specific realisation on applying this combinatorial layout design approach to tackle the family mould layout design is disclosed herein. In the context of injection moulding design, a cavity is a negative of a moulding part being produced, when the cavity is filled with heated molten material, it is cooled and becomes solid material resulting in a completed positive moulding part. Hence the configuration of the cavity is determined by the corresponding moulding part. Shape Grammar (SG) is a set of shape replacement rules that can be applied consecutively to generate infinitely many instances of shape arrangements conforming to the specified rules in a non-deterministic manner. In the present invention, a novel SG of FMCRLD integrated with mould layout design knowledge is first developed. The main concept of the newly developed SG is to synthesise generative FMCRLD by manipulating three sets of interdependent SG—(i) group placement SG (see FIGS. 3 to 6), (ii) internal cavity layout SG (see FIGS. 7 to 9) and (iii) runner layout SG (see FIGS. 10 to 12).

Figure 3:
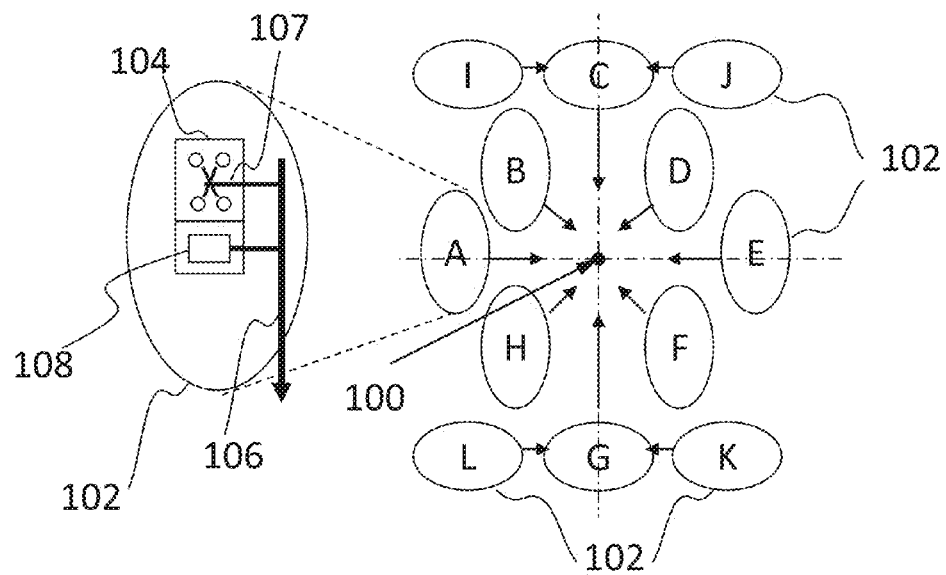
FIG. 3 shows the concept of virtual cavity groups and 12 main virtual multi-cavity regions of the present invention.

FIG. 3 shows the concept of virtual multi-cavity groups 104 and twelve main virtual multi-cavity group regions 102. A group placement design is decomposed into virtual multi-cavity groups 104 and main virtual multi-cavity group regions 102. The virtual multi-cavity group 104 represents a group of cavities that are filled through the same sub-runner 107 from the primary runner 106. The virtual multi-cavity group region 102 defines the virtual boundary of different non-overlapping zones allocated around the virtual centre of the mould base 100 (also the sprue location). A virtual multi-cavity group 104 is represented by a rectangular boundary box. Each individual virtual multi-cavity group 104 containing one or more cavities 108 is placed in twelve different virtual multi-cavity group regions (A-L) 102. Each region 102 can contain more than one virtual cavity group. Based on this concept, twelve shape placement rules for their corresponding twelve different regions are developed.

Figure 4:
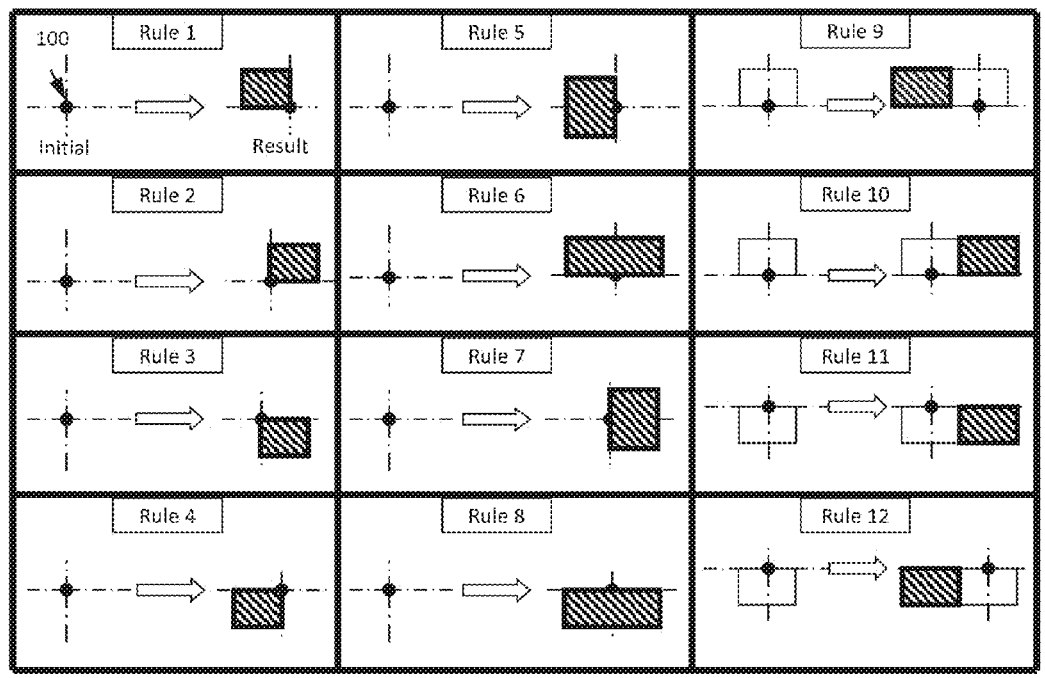
FIG. 4 shows 12 basic shape placement rules of the group placement shape.

FIG. 4 shows the twelve basic shape placement rules of the group placement SG. The group placement SG can control the placement of virtual multi-cavity groups 104 in a FMCRLD and generate unlimited numbers of different group placement designs.

Figure 5:
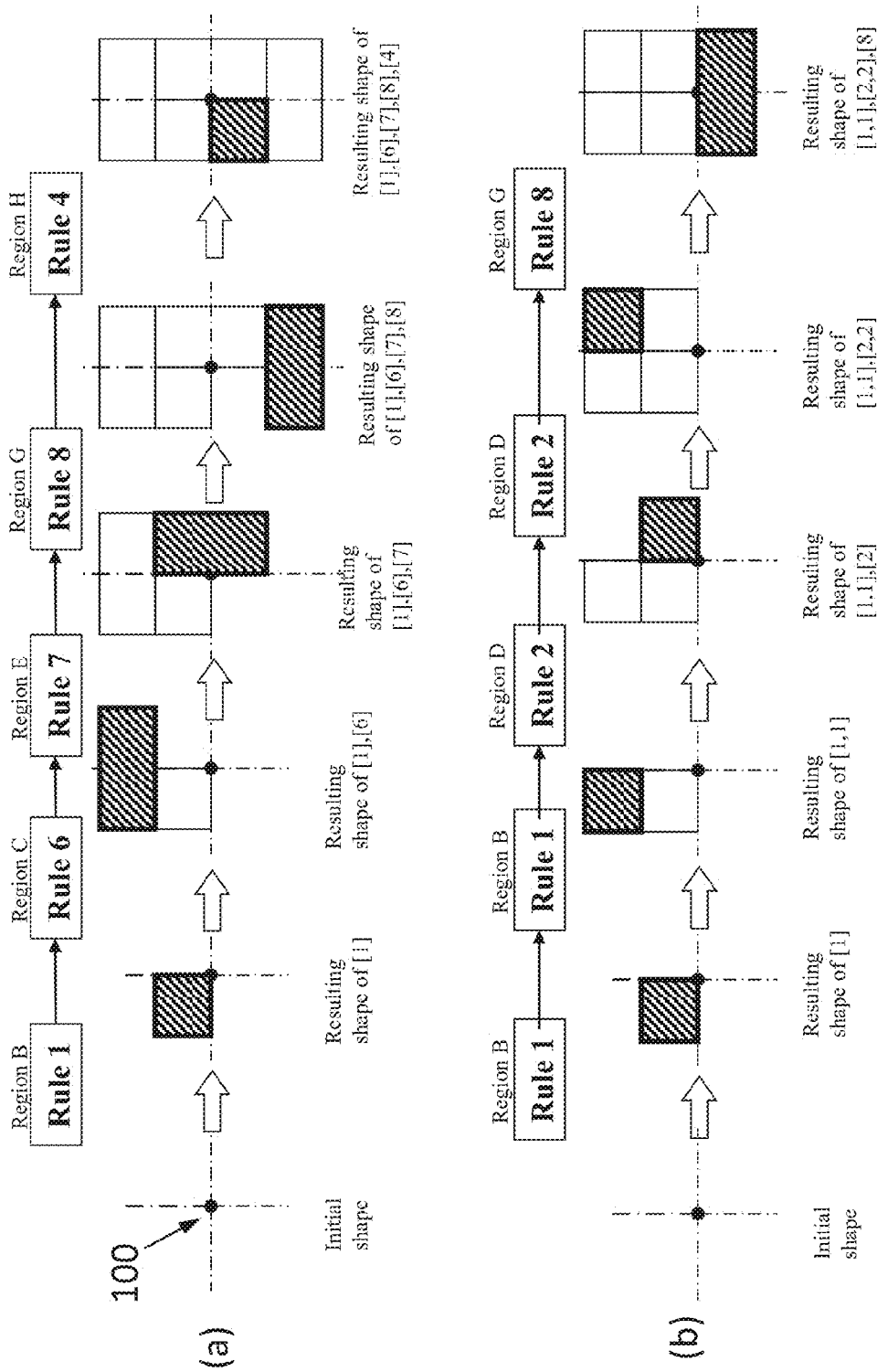
FIG. 5 shows examples of generation of group layout design using the group placement rules.

FIG. 5 shows examples of the application of various shape placement rules to various initial shapes. As illustrated in FIG. 5a, if shape placement rule 1 is applied to the initial shape of the centre point of the mould base, the lower right corner of the rectangular box will be aligned to the centre point. Then, if rule 6 is applied to the shape added by rule 1 in the previous step, the rectangular box will be added on top of the box. Subsequently, the resulting group placement design can be generated by applying rules 7, 8 and 4. Another example of the application of various shape placement rules to various initial shapes is illustrated in FIG. 5b.

FIGS. 6a and 6b illustrate how the group placement design SG can avoid any invalid group layout design. For example, the application of rule 4 is allowed in region H (as shown in FIG. 5a) only. Rule 8 can only be applied to the centre point of the mould base in region G if there are no groups placed in regions H or F (as shown in FIG. 5a). Rule 9 can only be applied to the shape added in the previous step in region I. Therefore, a valid group layout can be generated accordingly, as illustrated in FIG. 6b. FIG. 6a shows an example of an invalid group layout caused by no restriction on the application of shape placement rules to different initial shapes in different regions. That results in an invalid group layout for improper runner design.

FIG. 7a shows a real-life example of an individual cavity layout design. FIG. 7b shows how an individual cavity layout design is represented. In the present invention, moulding parts are classified into two shape codes: Circular and Rectangular. All circular moulding parts are represented by simple circular cylinders while all irregular moulding parts are represented by rectangular boxes. The cavity internal bounding box 142 equal to the overall size of the moulding part is enclosed by the rectangular virtual cavity external bounding box 144 with an offset distance 98 for sufficient shut-off area and space for runners and cooling channels. The four sides of the external bounding box are denoted by W, N, E and S. Information on the possible gate location 148 and the required slide action 150 are represented by arrows as shown in FIG. 7b.

Figure 8A:
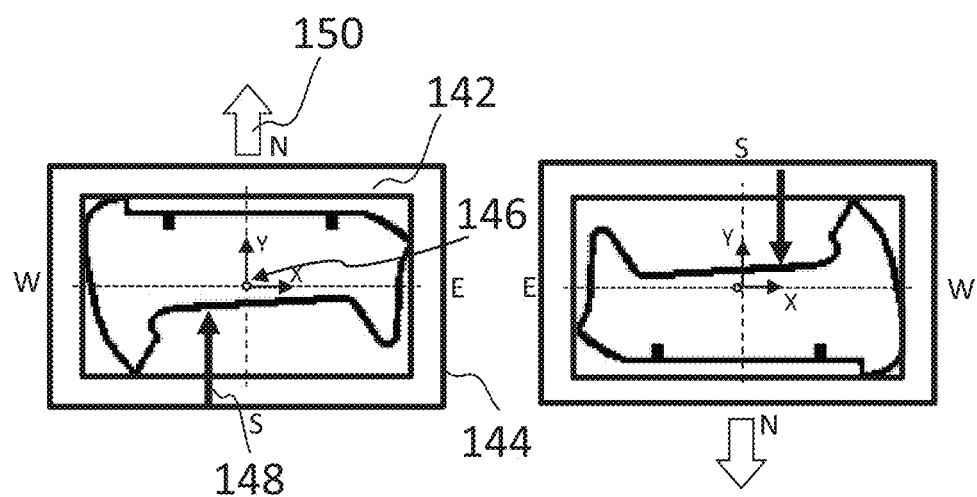
FIGS. 8a and 8b show orientation parameters of an individual cavity of the present invention.
Figure 8B:
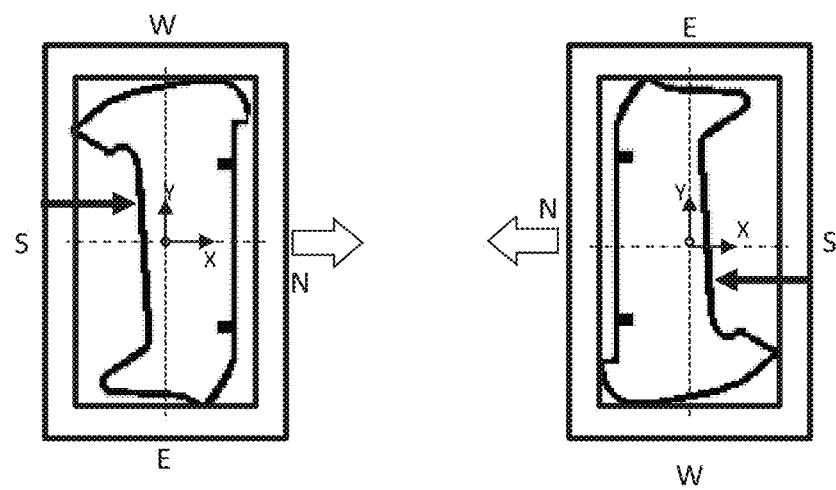

FIG. 8a shows the two possible orientation options for orientation parameter equals to 0 (horizontal) and FIG. 8b shows the two possible orientation options for vertical orientation parameter equals to 1 (vertical). These parameters are used to control the orientation of each individual cavity 108 in a virtual multi-cavity group 104.

FIG. 9 shows a set of internal cavity layout SG rules which aim to control the location arrangements of multiple cavities 108 in a virtual multi-cavity group 104. The set of internal cavity layout rules, corresponding to FIGS. 9b to 9h respectively, are listed below:

| | |
|---|---|
| T1 | Horizontal series layout |
| T2 | Horizontal grid layout |
| T3 | Vertical series layout |
| T4 | Vertical grid layout |
| T5 | Horizontal grid layout with a single cavity at the end |
| T6 | Vertical grid layout with a single cavity at the end |
| T7 | Circular layout |

As example, FIG. 9a shows the initial shape of the virtual multi-cavity group 104 and FIGS. 9b to 9h illustrates the resulting shape after applying internal cavity layout rules T1 to T7 respectively. Hence, if internal cavity layout rule T1 is applied to the virtual multi-cavity group 104 as shown in FIG. 9a, the layout of each individual cavity 108 will be arranged horizontally as shown in FIG. 9b.

The internal cavity layout SG integrated with cavity layout design knowledge enables an automatic arrangement of multiple cavities in a virtual multi-cavity group 104 considering the shape code, volumetric size, gate location and slider location of each individual cavity 108 as well as the location of the virtual multi-cavity group 104.

Figure 10A:
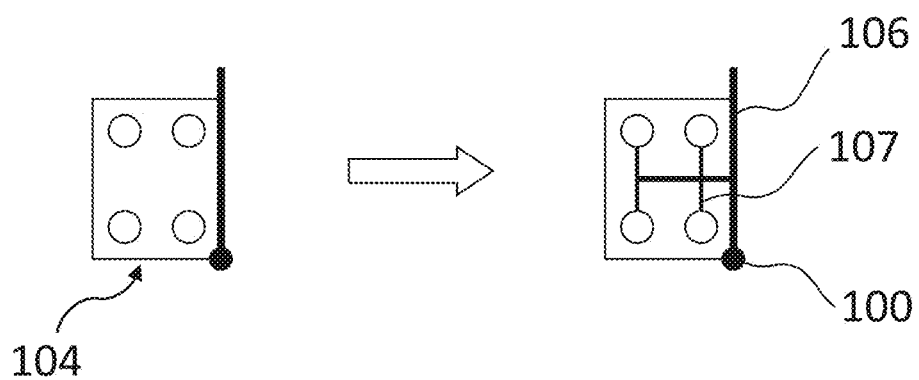
FIGS. 10a and 10b show examples of application of runner layout shape rules of the present invention.
Figure 10B:
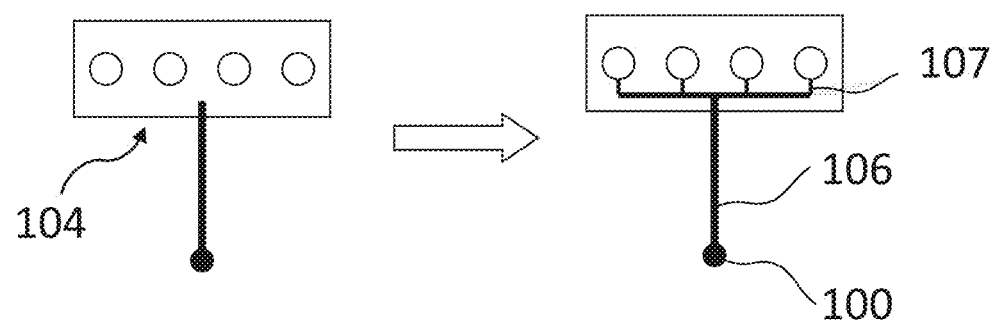

In practice, family mould runner layout design involves four commonly used runner layout styles: "Fishbone", "H", "X" and "Radial". Based on these four runner layout styles, a set of runner layout SG rules are developed for automatic generation of feasible runner layout design that can adapt to different cavity layout designs intelligently. FIGS. 10a and 10b show two examples of application of runner layout shape rules. As shown in FIG. 10a, runner layout shape rule R1 ("Fishbone" style) applied to the virtual multi-cavity group 104 with internal cavity layout rule T2 generates the resulting "Fishbone" style runner layout design with four sub-runner 107 and an primary runner 106. In another example, referring to FIG. 10b, if the internal cavity layout rule is changed from T2 to Internal cavity layout rule T1, the resulting "Fishbone" style runner design can be changed accordingly.

Figure 11:
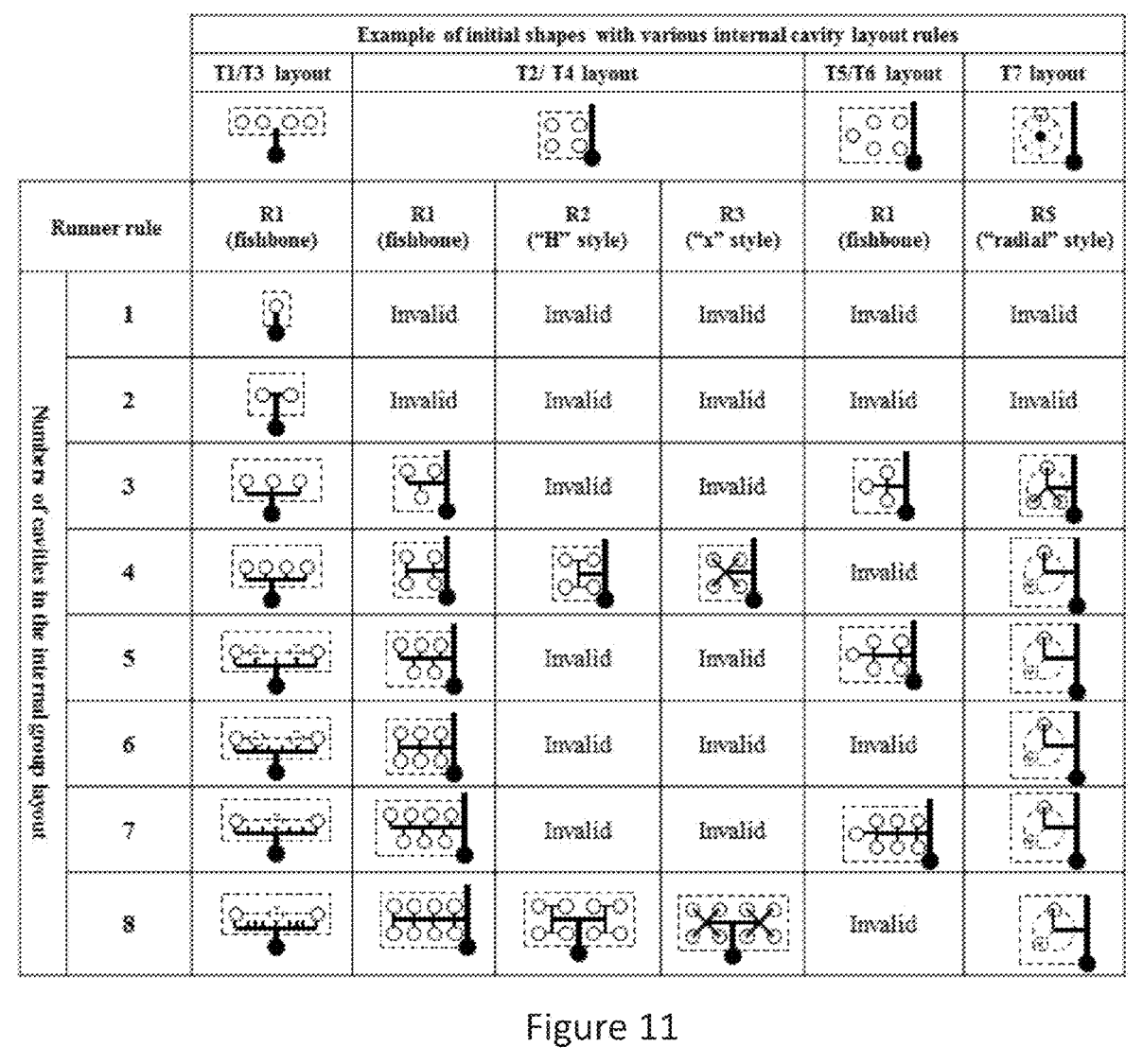

FIG. 11 summarises the application of the runner layout SG rules to virtual multi-cavity groups 104 with different numbers of cavities and various internal cavity layout rules can generate a number of different runner layout designs. There are some general rules to avoid invalid runner layout designs. For example, R2 ("H" style) or R3 ("X" style) can only be applied to a cavity group containing four or eight cavities with layout rule T2 or T4. R4 ("Radial" style) is only valid for cavity groups with three or more identical circular parts.

Figure 12:
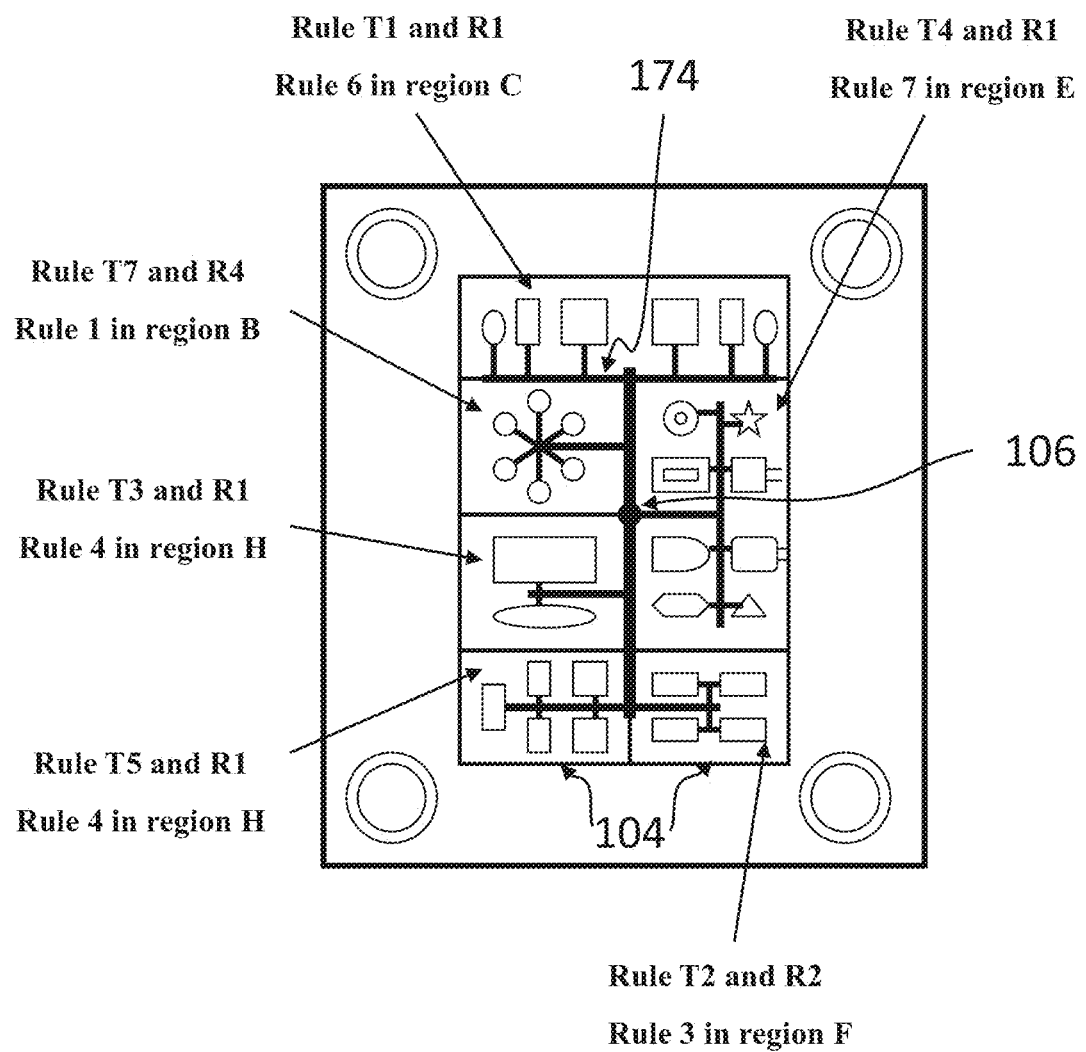
FIG. 12 shows an example of an FMCRLD using the shape grammars of FMCRLD of the present invention.

FIG. 12 illustrates an example of a FMCRLD of six virtual multi-cavity groups 104 synthesised by the application of different shape placement rules (1, 3, 4, 6 or 7) in different regions (B, C, E, F or H as shown in FIG. 3) respectively. The six virtual multi-cavity groups 104 are filled through the six individual "Fishbone" style secondary runners 174 branched from the primary runner 106. Different cavities in each individual virtual multi-cavity group 104 are filled locally through its sub-runner system generated using different runner layout shape rules (R1, R2 or R4) associated with different internal cavity layout shape rules (T1, T2, T3, T4, T5 or T7). For better flow balancing and clamping force balancing, internal cavity layout SG rule T1 can automatically place a cavity with a bigger size closer to the vertical centre position considering the volumetric size of dissimilar cavities and group placement rule 6 in Region C. Similarly, internal cavity layout SG rule T3 combined with group placement rule 4 in Region H can place a cavity with a bigger size closer to the horizontal centre position. Internal cavity layout SG rule T4 combined with group placement rule 7 in Region E can intelligently not only place a cavity with a bigger size closer to the horizontal centre position but also place two cavities with external sliding action close together and near the outside group boundary for easy and economic fabrication of the slider. If the number of sliders on each side of the mould is more than one, all the sliders will be grouped into one slider. Using different combinations of the proposed SG rule applications and various configurations of the virtual multi-cavity groups 104 including the number of groups and the content of each group can generate a large number of different family mould cavity layout designs. On the other hand, FMCRLD also needs to consider the cavity layout and runner layout design restrictions to produce feasible FMCRLD. This kind of restriction is called a "Design Constraint". In the present invention, the "Design Constraints" are handled by the SG of FMCRLD in association with the hybrid SG-based chromosome specially developed for synthesising FMCRLD (see FIG. 13). The SG of FMCRLD is used as a decoder to transform genotypes into phenotypes and act as an encoder to generate genotypes for the initial population (see FIG. 20). This approach can maintain the feasibility of individuals in the population and simplify the search space regardless of any invalid FMCRLD generated during the evolutionary process.

Figure 13:
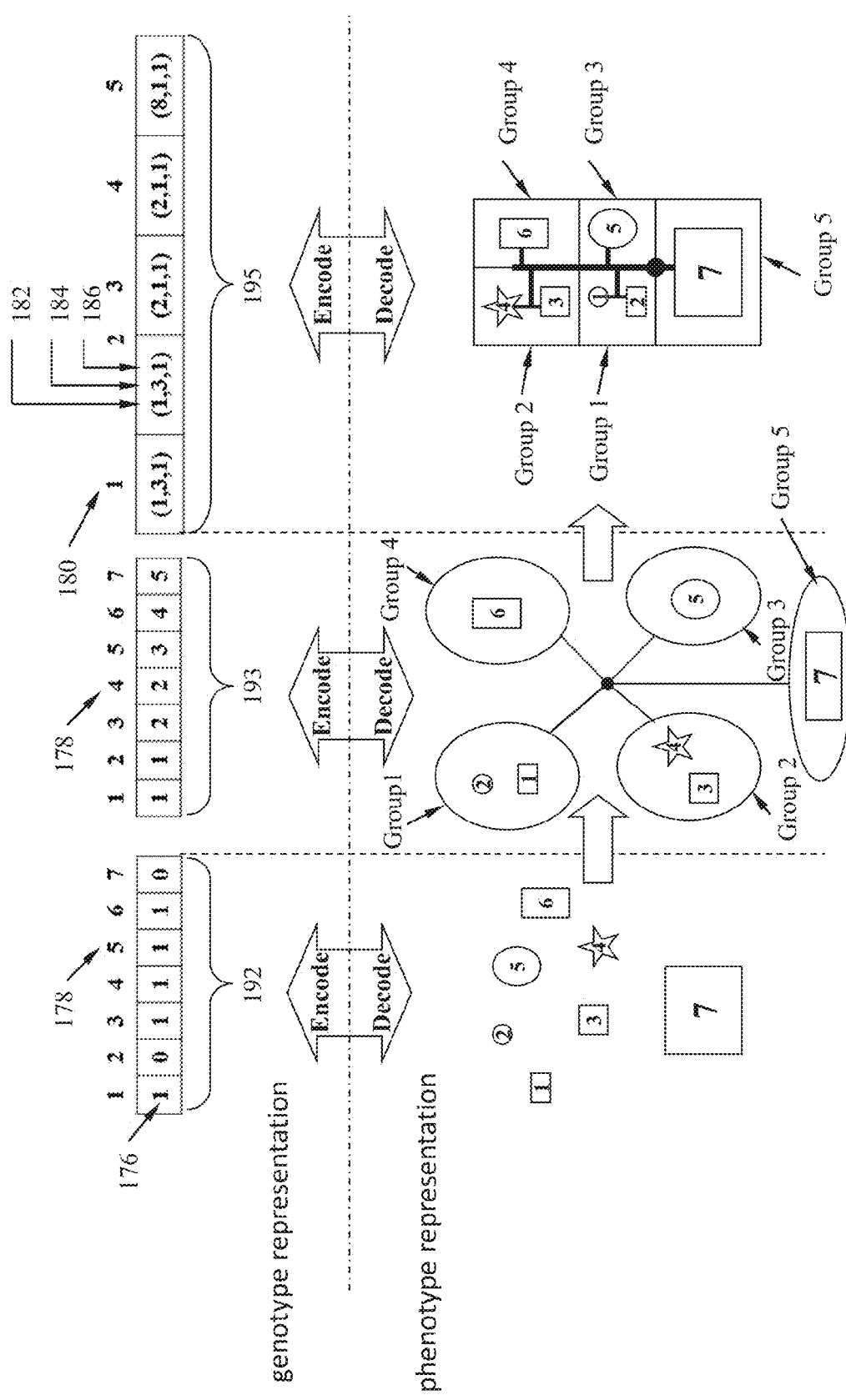
FIG. 13 shows the chromosome design of combinatorial layout design of the present invention.

The configuration of virtual multi-cavity groups 104 can be considered a combinatorial grouping design problem involving a large number of possible combinations of different numbers of groups and different content of each group. In order to encode not only the geometrical layout design information but also the grouping design information in combinatorial layout design, the present invention, referring to FIG. 13, presents a new hybrid SG-based chromosome that consists of three interdependent chromosome sessions—(a) Orientation session 192, (b) Group session 193 and (c) Group layout shape rules session 195. FIG. 13 shows the mapping of the graphical phenotype representation with its corresponding chromosome session in genotype representation. The orientation session 192 of the chromosome contains a series of orientation parameters. Each gene 176 (also referred as orientation parameter) of the orientation session 192 contains information of a corresponding individual space element on a layout base for a particular combinatorial layout design application. For example, the space element and the layout base in FMCRLD are cavities and mould layout base respectively. In other application areas, the space element can be a room in a building, an electronic component in a circuit board, a component in a machine, a paragraph, article or advertisement in a web page, magazine or newspaper, an item in a user-interface menu of a device; whereas the layout base can be the floor plan of a building, the physical size of a circuit board, the form factor of a machine, the screen size of a web page, magazine or newspaper, the screen resolution of the menu and so forth. A locus (position) of the gene represents the space element identification number 178. The allele of the gene (gene information) is the space element's orientation parameter as defined in FIG. 8. The length of this session is fixed because it is equal to the number of the space elements. The grouping design information is stored in the group session 193 where the position of the gene represents the space element identification number 178 and the corresponding gene information is the space element's group identification number. For example, the space element's group in FMCRLD is a cavity group. In other application areas, the space element's group can be a department or functional area in a building, a module in a circuit board, a module in a machine, a functional group in a web page, magazine or newspaper, a module in a user-interface menu of a device and so forth. In the group layout shape rules session 195, the position of the gene represents the group identification number 180 on a one-gene-for-one-group basis. The length of this session is variable because the number of groups is variable. In each gene, a list of SG rule numbers enclosed in parenthesis represent the geometrical and topological layout information. For example, in FMCRLD, each gene in this session comprises three rule number labels enclosed in parenthesis that represent the group placement rule 182 (see FIG. 4), the internal cavity layout rule 184 (see FIG. 9) and the runner layout rule 186 (see FIG. 11) of their corresponding group, respectively. Using the SG of FMCRLD, the genotype can be decoded to form the phenotype as shown in FIG. 13. The main advantage of using this new hybrid SG-based chromosome is that the "Orientation session" 192 and the "Group session" 193 can represent the moulding part's orientation and the cavity grouping design while the associated "Group layout shape rules session" 195 can represent the geometrical and topological layout design with minimum redundancy. Moreover, the solution space can be reduced because this new hybrid SG-based chromosome design enables all individuals generated in the population to be feasible solutions conforming to the SG of FMCRLD. Using this concept, different sets of SG rules customised for different design applications can work with this chromosome design to encode combinatorial layout design for GA.

Figure 14:
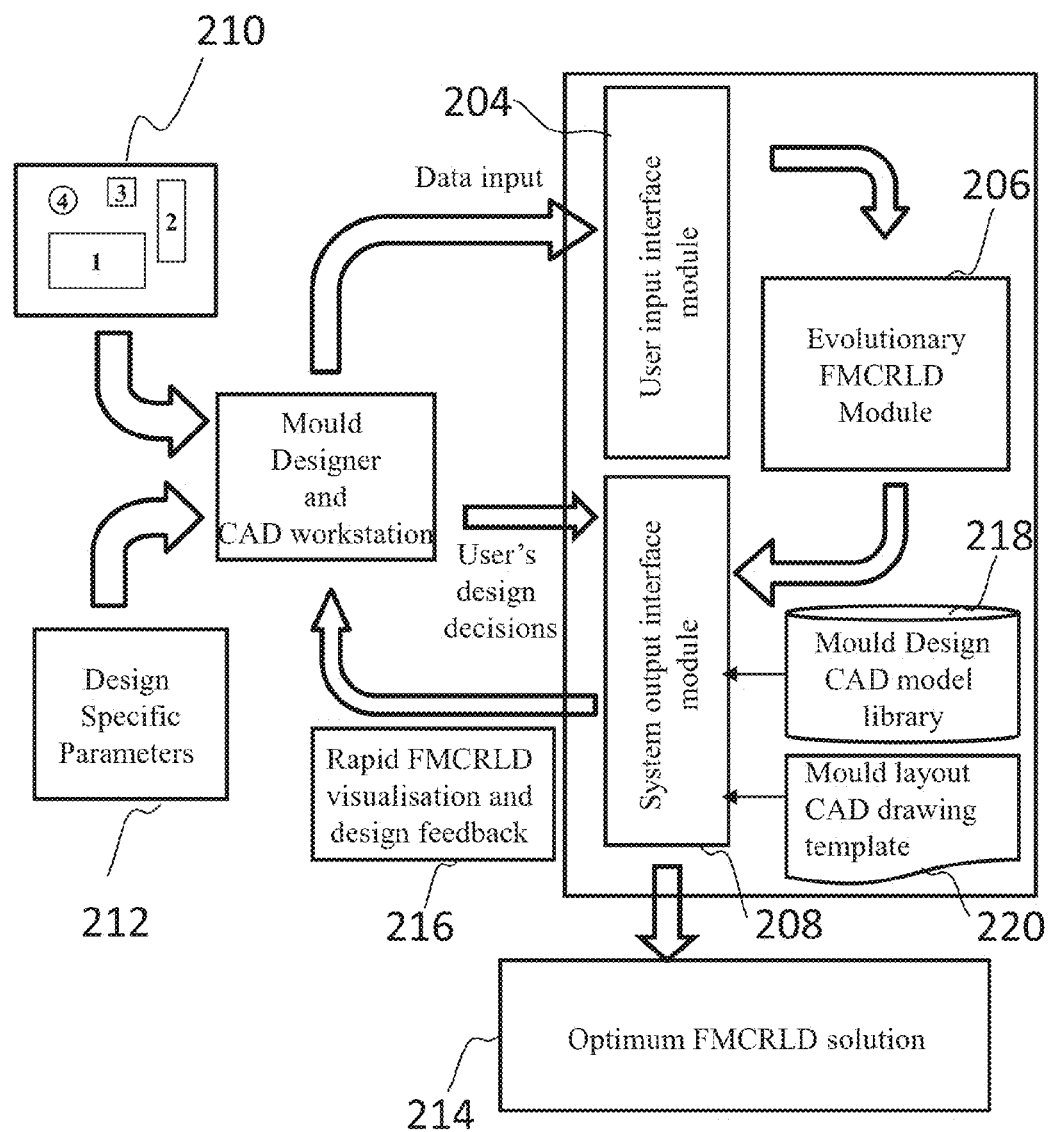
FIG. 14 shows the system architecture of the ICMLDS of the present invention.

FIG. 14 illustrates the system architecture of the ICMLDS. The ICMLDS seamlessly integrated with the Pro/Engineer® Wildfire® 4.0 MCAD system comprises three main modules: (I) User input interface module 204, (II) Evolutionary FMCRLD module 206, which comprises an encoding module, a Genotype-Phenotype mapping module and a Genetic Algorithm module, and (III) System output interface module 208. Mould designers are required to input information of the moulding parts 210, design specific parameters 212, for instance moulding requirements and constraints, stopping criteria and fitness evaluation parameters for the Genetic Algorithm modules, using the user input interface module (see FIGS. 15 to 17 for more details) embedded within the MCAD system. The evolutionary FMCRLD module 206 is the core of the whole system that generates FMCRLD automatically and searches for optimum FMCRLD solutions 214 using SG and GA. The system output interface module 208 is used to provide and display rapid FMCRLD visualisation and design feedback 216 on fitness evaluation results of different FMCRLD alternatives in the resulting population generated from the evolutionary FMCRLD module 206. Based on mould designers' final design decisions, the system output module can generate mould layout design CAD models and associated layout drawings accordingly using domain-specific knowledgebase. In FMCRLD, these knowledgebase include mould design CAD model library 218 and the customised mould layout CAD drawing template 220. According to the present invention, the Genetic Algorithm module further comprises a retrieving submodule for retrieving information from other modules, an initialisation submodule, a fitness evaluation submodule, a mould cost estimation submodule, a parent selection submodule, a crossover operation submodule, a mutation operation submodule, a replacement submodule and a termination submodule. On the other hand, the system output interface module 208 further comprises a data retrieving submodule for retrieving information from the Genetic Algorithm module, a rapid visualisation submodule, a graph plotting submodule and a computer-aid-design submodule.

Figure 15:
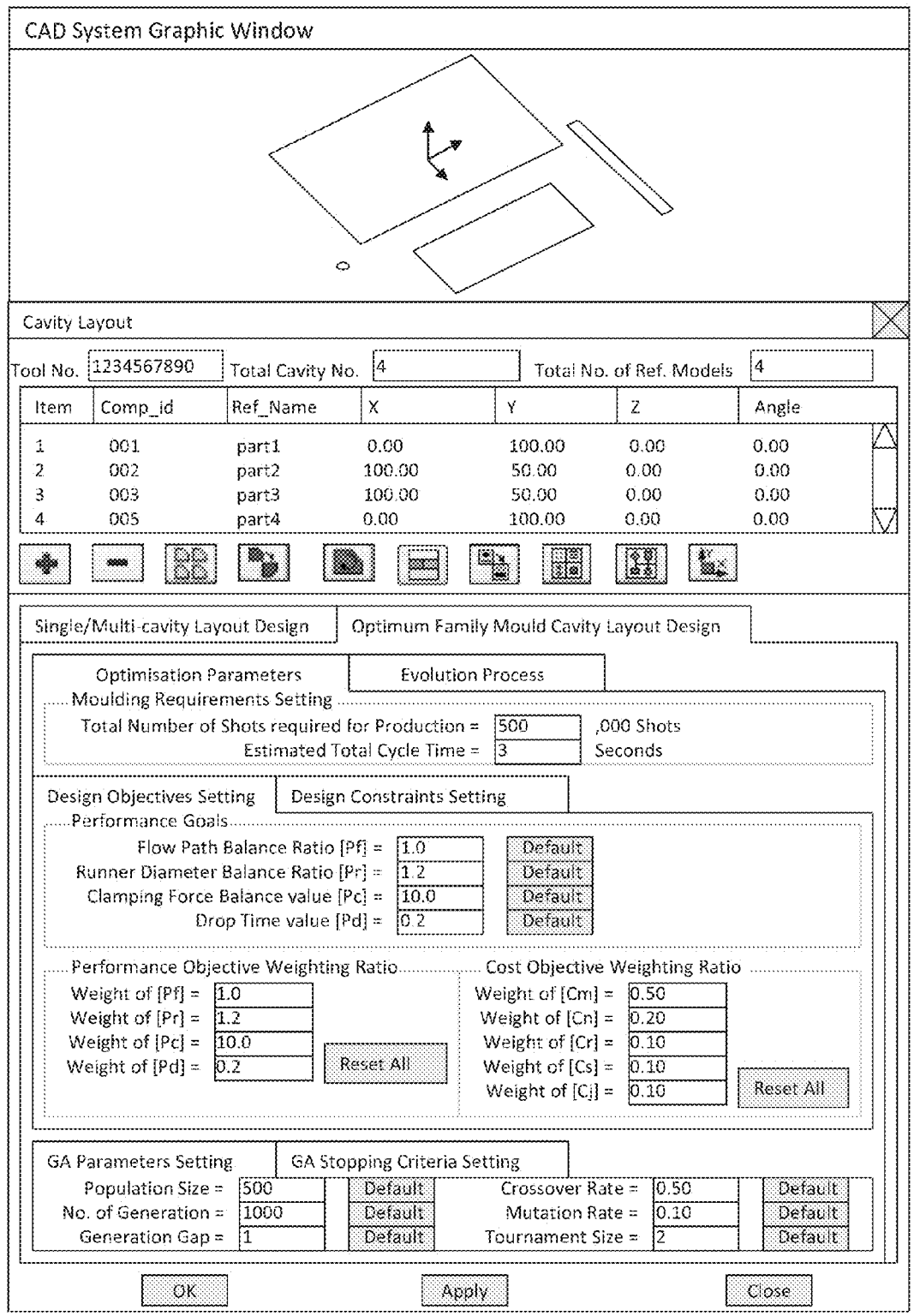
FIG. 15 shows the main dialogue menu of the ICMLDS integrated with the Pro/Engineer® Wildfire® 4.0 MCAD system.

FIG. 15 shows the main dialogue menu of the ICMLDS integrated with the Pro/Engineer® Wildfire® 4.0 MCAD system. For example, four dissimilar moulding parts are initially added into the FMCRLD prototype system through the use of the graphical user interface integrated with the Pro/Engineer® Wildfire® 4.0.

Figure 16:
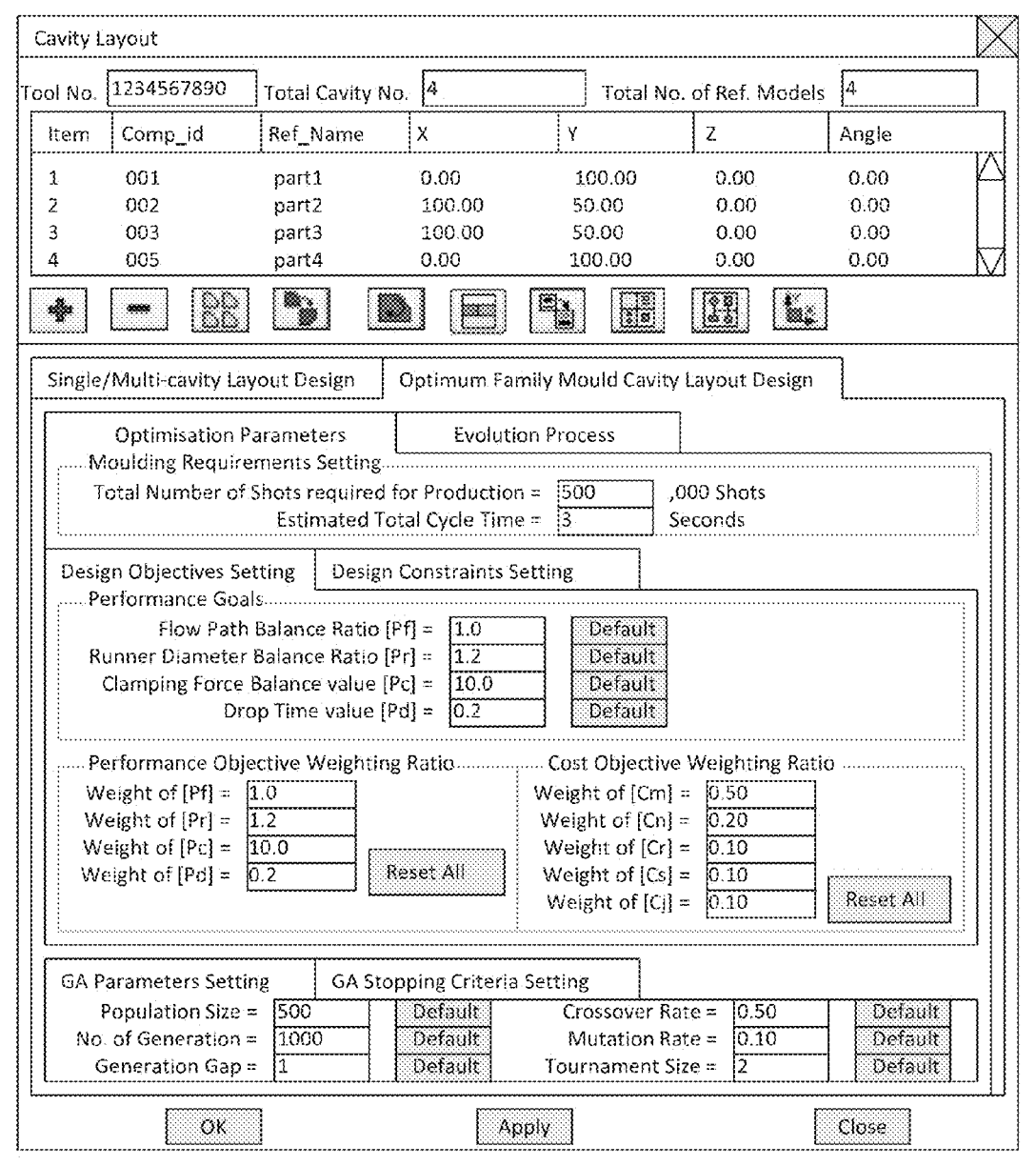

FIG. 16 shows the sub-dialogue menu of the ICMLDS for inputting parameters of moulding requirements, design optimisation objectives and GA. The ICMLDS requires mould designers to input the moulding requirements such as total number of shots and the estimated total cycle time (see the layout of "Optimisation Parameters" in FIG. 16). Besides, mould designers can modify a number of parameters of design objectives such as the performance goals and the weighting ratios of the performance objectives and the cost objectives to change the optimisation objectives and constraint for different design cases (see the layout of "Design Objectives Setting" in FIG. 16). As shown in the layout of "GA Parameters Setting" in FIG. 16, the values of the GA parameters can be modified if necessary.

Figure 17:
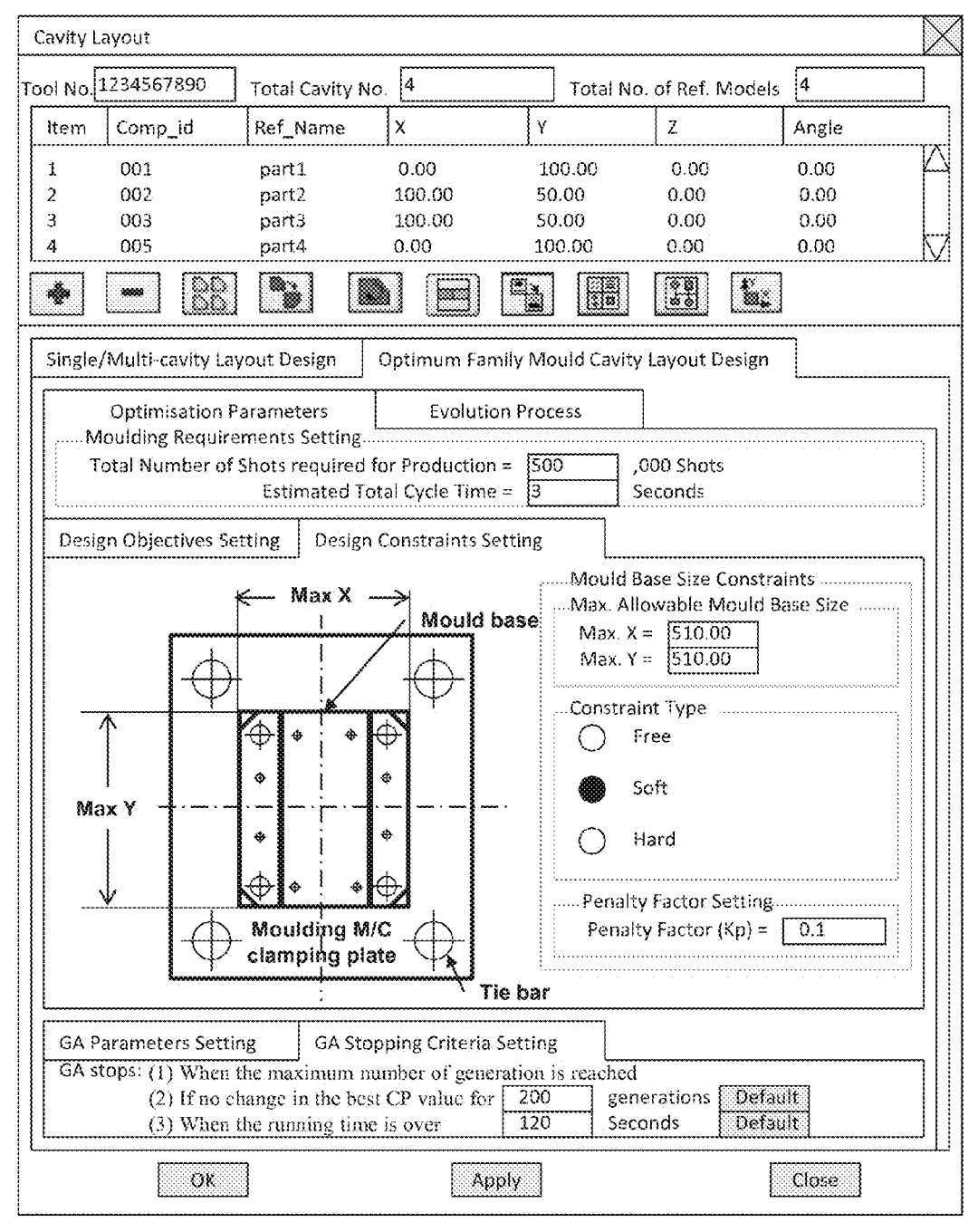

FIG. 17 shows the sub-dialogue menu of the ICMLDS for inputting the design optimisation constraints and the GA stopping criteria. The design constraints including the maximum allowable mould base size, constraint type and penalty factor can be input using the graphical user interface as shown in the layout of "Design Constraints Setting" in FIG. 17. A more detailed description of the design optimisation objectives and constraints can be found in FIG. 21. Finally, mould designers can modify the stopping criteria if necessary (see the layout of "GA Stopping Criteria Setting" in FIG. 17).

Figure 18:
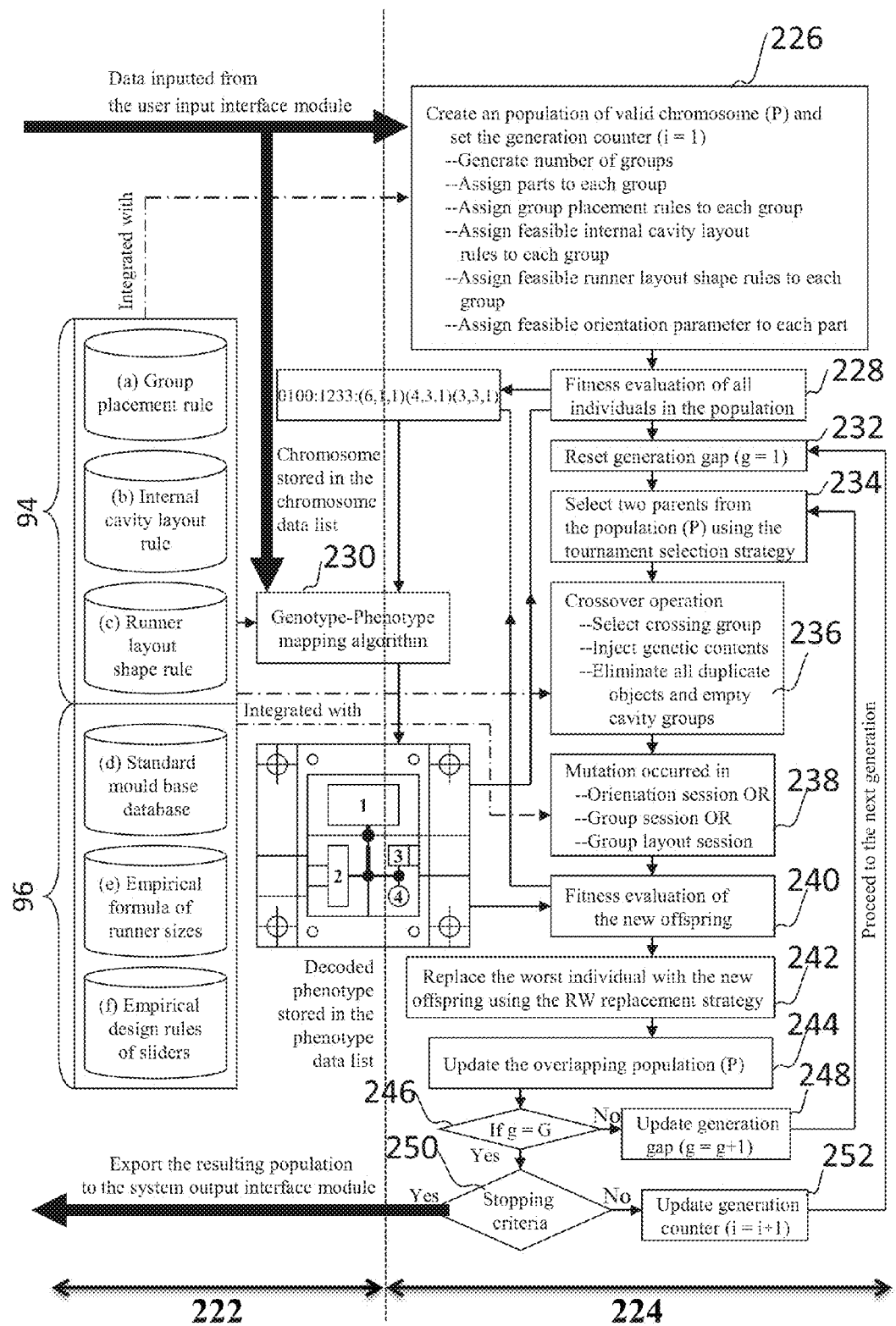
FIG. 18 shows the program flow chart of the evolutionary FMCRLD module.

FIG. 18 shows the program flow chart of the evolutionary FMCRLD module. This module consists of two main components: Shape Grammar (SG) module 222 and Steady-State Genetic Algorithm (SSGA) module 224. According to the user input information, the algorithm in step 226 integrated with the SG of FMCRLD 94 and mould design knowledgebase 96 is developed to generate a population of valid chromosomes (P) step by step (see FIG. 19 for more details). The algorithm will stop when the number of generated individual design solutions is equal to the specified population size "m". Meanwhile, the generation counter (i) is set to one initially. At Step 228, the Genotype-Phenotype mapping algorithm (see FIG. 20 for more details) denoted as Step 230 is called to decode the chromosome into the phenotype for fitness evaluation. According to the resulting phenotype, the fitness value of each individual in the population can be calculated using the weighted sum approach. This simple approach can integrate a number of performance goals ($P_f$, $P_r$, $P_c$ and $P_d$), costs ($C_m$, $C_n$, $C_r$, $C_s$ and $C_j$) and the penalty function for handling the mould base size constraint into a single Cost Performance (CP) value. This approach allows mould designers to change the priority of individual performance goal, cost and the penalty function for different mould customers' specifications and requirements in a simple way. In the present invention, an overlapping steady-state population model is adopted in an attempt to reduce the computing workload as well as the memory usage for the fitness evaluations and the genetic operations. In this model, offspring and parents in the same population compete for survival. The number of individual in the population to be replaced during each generation is controlled by the generation gap (G). Starting from Steps 232 to 252, the main program loop begins. Initially, the generation gap counter g is set to one. At Step 234, two parents from the population (P) are selected at random using the tournament selection strategy. This selection strategy can simulate the mating battles often seen in nature by mutual "competition" of s individuals (tournament size) chosen at random from the population. In other words, it can provide the stochastic "ingredient" of the selection naturally introduced by the random choice of competing couples. At Step 236, a new offspring is reproduced using the crossover operation with a predefined crossover rate. Subsequently, the offspring is mutated at Step 238 using the new mutation operation with a predefined mutation rate. At Step 240, the fitness of the new offspring is evaluated. The present invention adopts a simple Replace the Worst (RW) replacement strategy because it can imitate the natural evolutionary process of "Survival of the Fittest" in the simplest way. At Step 242, if the fitness of the new offspring is better than the worst individual found in the population (P), this worst individual will be replaced by this new offspring. Accordingly, the overlapping population (P) is updated at Step 244. At Step 246, if the generation gap counter g is equal to the generation gap (G), the program will check if one of the stopping criteria (maximum number of generations, maximum running time and stall generations) is met, or else the program will go to Step 248 to accumulate the generation gap counter g by 1, and go back to Step 234. When the generation gap counter g is equal to the generation gap G, the program checks the stopping criteria again at Step 250. If one of the termination criteria is met, the program will pass the resulting population (P) to the system output interface module, or else the generation counter i will be accumulated by 1 at Step 252 and the program will go back to Step 232 to start the next program loop for the next generation. These stopping criteria are used to prevent the GA from running for too long. If the result is not satisfactory when the algorithm stops due to one of these conditions, the values of Maximum running time and Stall generations can be increased to improve the results.

Figure 19:
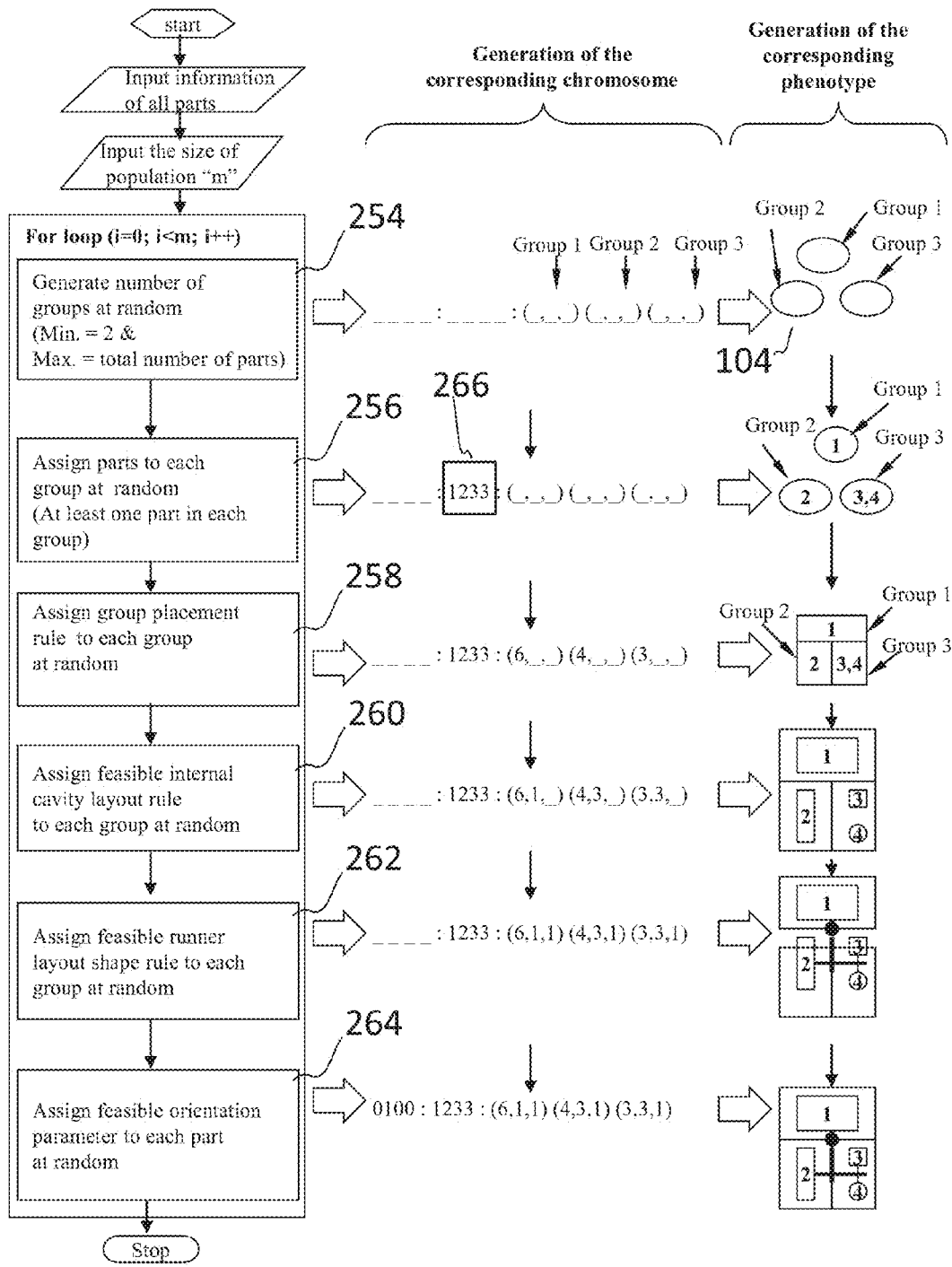
FIG. 19 shows the algorithm flow chart for generation of an initial population and step by step chromosome generation process.

FIG. 19 shows the algorithm flow diagram for generation of a population of valid chromosome and the step-by-step generation process. First of all, the information of the moulding parts must be input by the mould designers. The information includes part shape (circular or irregular), overall part size, part weight, type of gate, gate location, number of sliders and so forth. The population size "m" must be specified before the recursive loop, starting from Steps 254 to 264, begins. The loop will be stopped when the number of generated individual design solutions is equal to the specified population size "m". Step 254 is to generate a number of groups at random. The minimum number of moulding parts "n" must be equal to or more than two. The virtual multi-cavity group 104 must contain at least one moulding part. Therefore, the minimum number of groups must be equal to two and the maximum number of groups must be equal to the number of moulding parts "n" in a family mould. The number of virtual multi-cavity groups 104 can be selected at random within the range (2 to n). Step 256 is to assign moulding parts to each group at random. For example, Part 1 and Part 2 are assigned to Group 1 and Group 2 respectively. Parts 3 and 4 are assigned to Group 3. Then, the group session 266 of the chromosome becomes "1233". The graphical representation of its phenotype is shown on the left-hand side of FIG. 19. Step 258 is to assign a group placement rule to each group at random. The rule identification number is selected for each group at random from the list of group placement rules (1-12) as shown in FIG. 4. Step 260 is to assign a feasible internal cavity layout rule to each group at random. The rule identification number is selected for each group at random from the valid list of internal cavity layout rules as illustrated in FIG. 9. Subsequently, Step 262 is to assign feasible runner layout shape rules to each group at random. Based on the number of moulding parts in the virtual multi-cavity group 104 and the internal cavity layout rules, a rule identification number is selected at random from the valid list of runner layout shape rules as summarized in FIG. 11. The three rule identification number forms a gene that indicates which rules in each of the three shape grammars to apply. Finally, Step 264 is to assign a feasible orientation parameter to each moulding part at random. The feasible orientation parameter of each cavity is selected at random depending on the existing group placement, internal cavity layout and runner layout.

Figure 20:
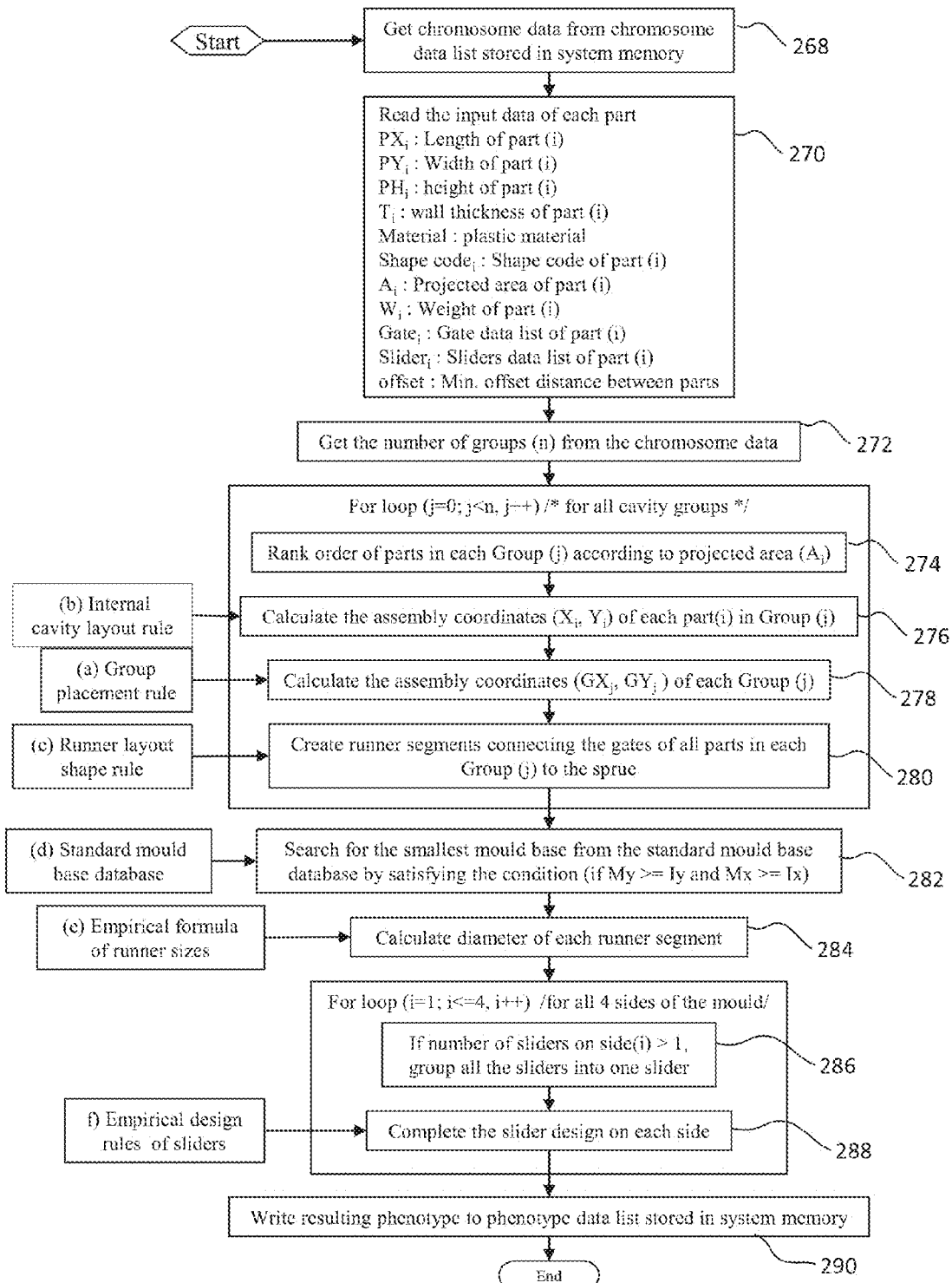
FIG. 20 shows the program flow chart of the Genotype-Phenotype mapping algorithm.

FIG. 20 shows the program flow chart of the Genotype-Phenotype mapping algorithm. The mapping algorithm starts from reading the chromosome data at Step 268. At Step 270, the data of each moulding part (i), such as its size, wall thickness, Cavity Flow Path (CFP) and so on, is read from the corresponding pointer arrays stored in the system memory. Step 272 is to count the total number of groups (n) in the group layout shape rule session. Then, a program loop is started from Steps 274 to 280 for each group. The order of all moulding parts in a group according to their projected area is ranked at step 274. Step 276 is to calculate the assembly coordinates of moulding parts in each group according to the layout position decoded from the internal cavity layout SG rule number. At Step 278, the assembly coordinate of each group is calculated according to its overall size and the layout position decoded from the group placement SG rule number. Step 280 is to create runner segments connecting the gates of all moulding parts in each group to the sprue according to the runner layout design decoded from the runner layout SG rule number. At Step 282, the smallest suitable mould base is selected from the standard mould base database based on the condition: if the width of the mould insert (Ix) is equal to or smaller than the width of the ejector plate of the mould base (Mx) and the length of the mould insert (Iy) is equal to or smaller than the inner vertical space between the return pins (My). Step 284 is to calculate the diameter of each runner segment according to the empirical formula in relation to Wi, Li, Ti and the number of runner branches. With regard to the generation of sliders, the program loop is started from Steps 286 to 288 for four sides of the mould. At Step 286, if the number of sliders on each side is more than one, all the sliders will be grouped into one slider. Step 288 is to complete the slider design on each side according to the empirical slider design rules. Finally, the resulting phenotype will be saved in the pointer arrays at Step 290.

Each family mould is unique, non-standard and custom-made according to different customers' requirements and constraints. No research intensively focused on FMCRLD automation and optimisation has been reported over the years. Therefore, FMCRLD optimisation objectives and constraints still remain unknown. However, some general mould layout design objectives should be considered. According to the mould design literature, the general mould layout design objectives are:

1. To keep the same filling time and melt temperature of all cavities.
2. To keep the minimum runner volume for reducing scrap plastic material.
3. To keep sufficient space between cavities for cooling lines and ejector pins, and an adequate cross section to withstand the force from injection pressure.
4. To keep the sum of all reactive forces in the centre of gravity of the platen.
5. To keep the layout as symmetrical as possible for easy designing, manufacturing, cooling and ejection.

In addition, other economic design objectives have to be taken into consideration. They are listed below:

6. To keep the overall size of the cavity layout design as minimal as possible for the limited size of mould base and moulding machines.
7. To keep the number of sliders as minimal as possible for the reduction of the cost of making sliders.
8. To keep the drop height as minimal as possible for the reduction of cycle time.

In practice, FMCRLD also involves two major constraints. They are: i. Mould base size constraint; and ii. Mould layout design constraint.

Figure 21:
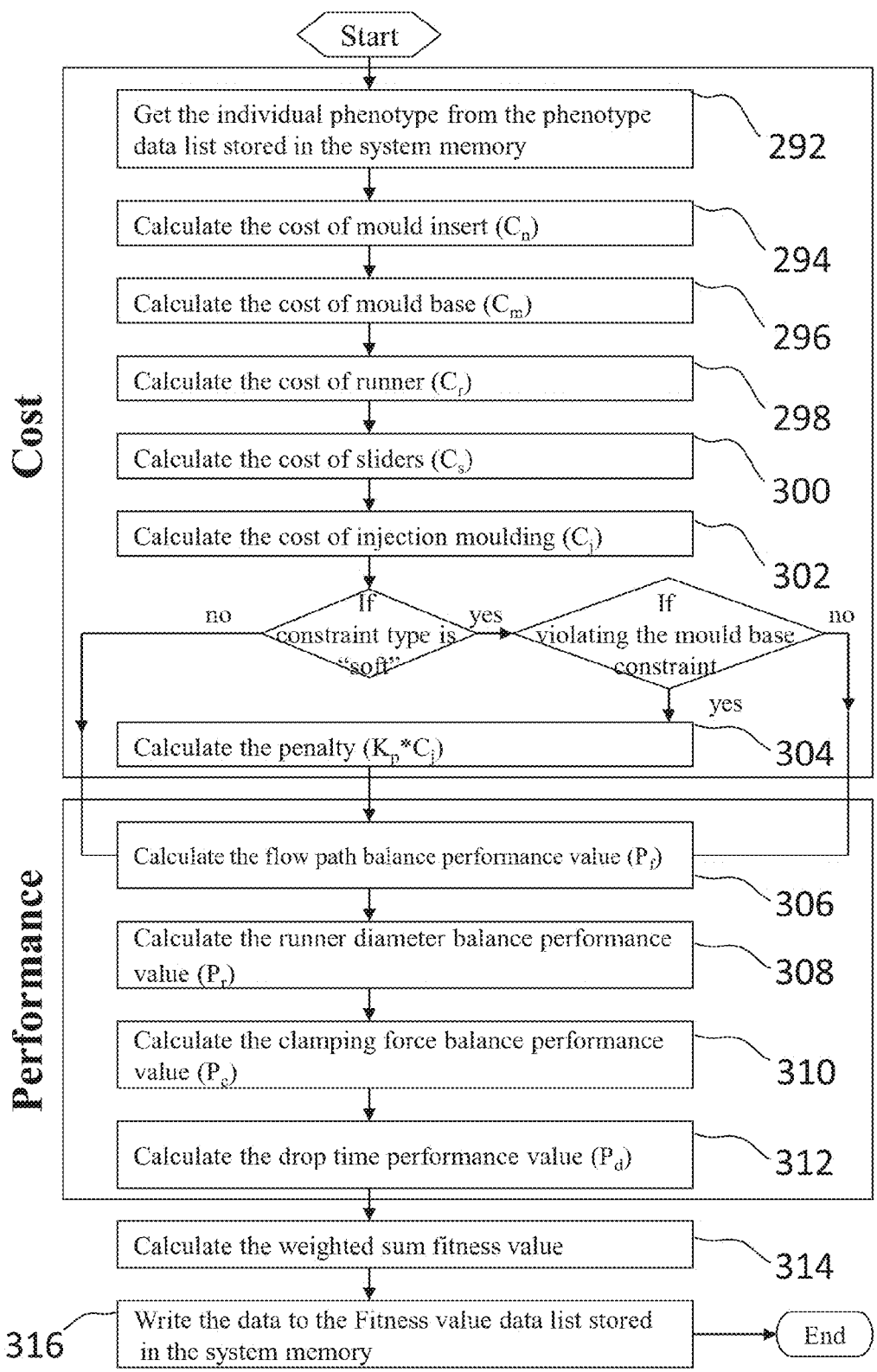
FIG. 21 shows the program flow chart of the fitness evaluation algorithm.

FIG. 21 shows the program flow chart of the fitness evaluation algorithm. In the present invention, the evaluation criteria for optimum FMCRLD are mainly related to Cost (C) and Performance (P) according to the aforementioned FMCRLD optimisation objectives and constraints. The fitness evaluation algorithm starts from reading the individual phenotype from the phenotype data list in the system memory at Step 292. The quantitative cost evaluation of FMCRLD focuses on estimating the critical cost factors: Cost of mould insert ($C_n$), Cost of mould base ($C_m$), Cost of runners ($C_r$), Cost of external sliders ($C_s$) and Cost of injection moulding ($C_j$) using the empirical formulae as mentioned below.

At Step 294, the cost of mould insert ($C_n$) is calculated. The overall size of a cavity layout design determines the material cost of mould inserts (see equation 1).

$$C_{n,i} = X_i * Y_i * Z_i * D_n * P_n \quad (1)$$

where $C_{n,i}$ is the estimated cost of the mould insert for design solution (i) (HK\$), $X_i$ is the horizontal dimension of the mould base for design solution (i) (mm), $Y_i$ is the vertical dimension of the mould base for design solution (i) (mm), $Z_i$ is the total height of the mould base (mm), $D_n$ is the density of the material of the mould base (kg/mm$^3$), and $P_n$ is the price of the material of the mould base (HK\$/kg).

At Step 296, the cost of mould base ($C_m$) is calculated. The overall size of a mould base determines the cost of mould base (see equation 2).

$$C_{m,i} = 0.9 * (5 * W_i + W_i * L_i * H_i * D_m * P_m) \quad (2)$$

where $C_{m,i}$ is the estimated cost of the mould base of design solution (i) (HK\$), $W_i$ is the horizontal dimension of the mould base of design solution (i) (mm), $L_i$, is the vertical dimension of the mould base of design solution (i) (mm), $H_i$, is the total height of the mould base of design solution (i) (mm), $D_m$ is the density of the material of the mould base (Kg/mm$^3$), and $P_m$ is the price of the material of the mould base (HK\$/kg).

At Step 298, the cost of runners ($C_r$) is calculated. The goal of reducing scrap plastic material is measured by calculating the total volume of runners (see Equations 3 and 4).

$$V_{total,j} = \sum_{j=1}^{m} N_{i,j} * V_{i,j} \qquad (3)$$

$$\sum_{j=1}^{m} N_{i,j} * L_{i,j} * (\pi r_{i,j}^2)$$

$$C_{r,i} = V_{total,i} * D_r * P_r * S \qquad (4)$$

where m is the number of different types of segments in the runner system of design solution (i), j is an index referring to a specific runner segment of design solution (i), $N_{i,j}$ is the number of the runner segment j of design solution (i), $V_{i,j}$ is the volume of the runner segment j of design solution (i), $L_{i,j}$ is the length of the runner segment j of design solution (i) (mm), and $r_{i,j}$ is the radius of the runner segment j of design solution (i) (mm), $C_{r,i}$ is the estimated cost of runner of design solution (i) (HK$), $D_r$ is the density of the plastic material (g/mm3), $P_r$ is the price of the plastic material (HK$/g), S is the total number of shots required for the whole production.

At Step 300, the cost of external sliders ($C_s$) is calculated. The cost of sliders is estimated based on the required number and overall size of sliders (see Equation 4).

$$C_{s,i} = \overbrace{\frac{1}{K_1 T_i}}^{\substack{Fixed \\ assembly \\ cost}} + \overbrace{\frac{1}{K_2 T_i}}^{\substack{Fixed \\ machining \\ cost}} + \sum_{j=1}^{T_i} (\overbrace{\frac{1}{K_3 V_{i,j}}}^{\substack{Variable \\ material \\ cost}} + \overbrace{\frac{1}{K_4 V_{i,j}}}^{\substack{Variable \\ machining \\ cost}}) \qquad (5)$$

where i is an index referring to design solution (i), j is an index referring to the individual slider used for design solution (i), $T_i$ is the total number of sliders used for design solution (i), K1 is the coefficient of the fixed assembly cost=600 (HK$/slider), K2 is the coefficient of the fixed machining cost=600 (HK$/slider), K3 is the coefficient of the variable material cost=0.003 (HK$/mm³), K4 is the coefficient of the variable machining cost=0.005 (HK$/mm³), and $V_{i,j}$ is the envelope size of individual slider assembly j used for design solution (i) (mm³).

At Step 302, the cost of injection moulding ($C_j$) is calculated. The maximum allowable mould based size is limited to the space between tie bars on the mould platen of a customer's available moulding machines. Therefore, different FMCRLD alternatives require different sizes of mould bases that affect the selection of injection moulding machines. The estimated cost of injection moulding depends on the total number of shots, the cycle time per shot and the average operating cost of the required injection moulding machine (see Equation 6). In practice, a larger moulding machine requires a higher operating cost because of the higher purchase price, higher maintenance cost, higher energy consumption, more man-hours to set up and so forth (see Table 1 for more details).

$$C_{j,i} = S(t/3600)P_i \qquad (6)$$

where i is an index referring to design solution (i), S is the total number of shots required for the whole production, t is the estimated cycle time per shot (seconds), and $P_i$ is the average operating cost of the required injection moulding machine for design solution (i) (HK$/hour) (see Table 1).

TABLE 1

Examples of technical parameters and average operation costs of various injection moulding machines

| Model No. | Locking Force (ton) | Max. W (mm) | Max. T (mm) | Max. Daylight (mm) | Operating Cost (HK$/hour) |
|---|---|---|---|---|---|
| PT80  | 80  | 357 | 357 | 630  | 48.92 |
| PT130 | 130 | 409 | 409 | 650  | 58.58 |
| PT160 | 160 | 459 | 459 | 750  | 58.04 |
| PT200 | 200 | 510 | 510 | 830  | 62.54 |
| PT250 | 250 | 570 | 570 | 910  | 66.46 |
| PT300 | 300 | 560 | 610 | 1160 | 93.71 |
| PT350 | 350 | 680 | 720 | 1420 | 99.29 |
| PT450 | 450 | 720 | 822 | 1590 | 109.98 |

At Step 304, the penalty cost ($K_p * C_j$) is calculated. The mould base size constraint must be considered because the maximum allowable mould base size is limited to the space between tie bars on the mould platen of a customer's available moulding machines. This type of restriction can be regarded as a "Geometric Constraint". This geometric constraint can be soft or hard. For example, a smaller mould base is usually preferable because it can be fit into a smaller moulding machine for the reduction of operating cost, but a larger one may be allowed if necessary. If the mould base size of an individual FMCRLD solution is larger than the maximum allowable space between tie bars on the mould platen of a customer's available moulding machine, it will always be regarded as an invalid FMCRLD. The operating cost of the required injection moulding machine ($C_j$) (see Step 302) for an individual solution is already incorporated into the fitness function (see Step 314). The weighting ratio of this cost factor can be adjusted if necessary. In addition, a simple static penalty function is adopted to handle this geometric constraint in the present invention. If the geometric constraint is set to "soft", the individual solution violating the soft constraint will be penalised by adding an extra penalty cost $K_p(C_j)$ to its fitness value where $K_p$ is a penalty factor. If the geometric constraint is set to "free", $K_p$ will be equal to zero. If the geometric constraint is set to "hard", all solutions violating the hard constraint will be thrown out.

With regard to the performance evaluation of FMCRLD, the present invention presents a new Flow path balance performance measurement ($P_f$) (see Step 306) and Runner diameter balance performance measurement ($P_r$) (see Step 308) to quantify the filling balance performance of FMCRLD without the aid of expensive and time-consuming mould flow CAE simulation. In addition to the filling balance performance measurement, the present invention also introduces new methods for quantifying Clamping force balance performance measurement ($P_c$) (see Step 310) and Drop balance performance measurement ($P_d$) (see Step 312).

Figure 22:
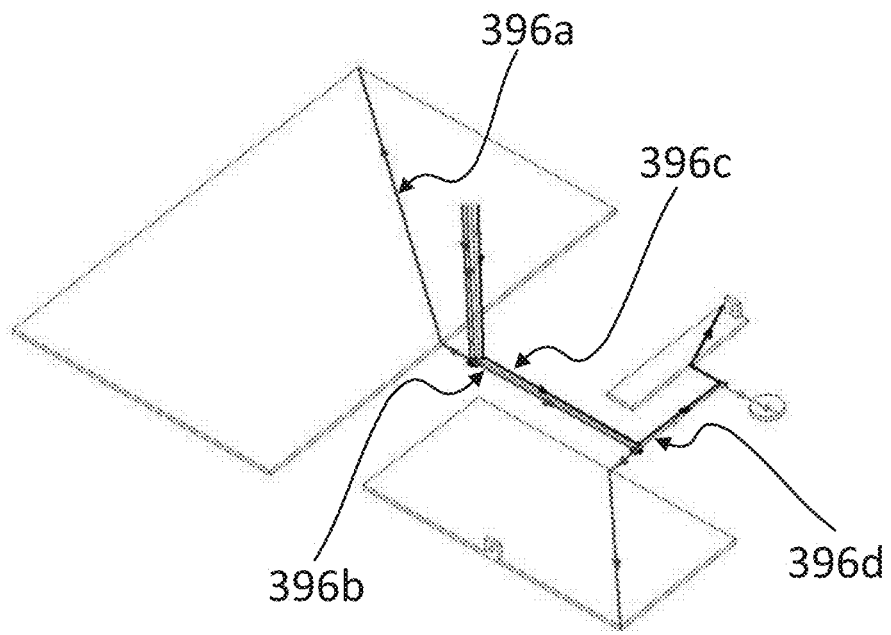
FIG. 22 shows an illustrative example of flow paths of four dissimilar cavities in a family mould.

At Step 306, the flow path balance performance measurement ($P_f$) is calculated. The present invention developed a Flow Path Balance Ratio (FPBR) to quantify the filling balance performance of a large number of FMCRLD alternatives rapidly for fitness evaluation in GA without using time-consuming and computer-intensive mould flow CAE simulations to evaluate numerous different FMCRLD alternatives. FIG. 22 shows an illustrative example of flow paths of four dissimilar cavities in a family mould. The Flow Path (FP) of each individual flow group consists of its individual Runner Flow Path (RFP) and its Cavity Flow Path (CFP). RFP is the total length of various runner branches delivered from the sprue to the gate of the cavity. CFP is the estimated longest flow length measured from the selected gating location to the boundary of the cavity. The FPBR is defined as the average variation of Flow Path (FP) relative to the minimum FP across all flow groups (see Equation 7). The smaller the FPBR is the better the filling balance performance that can be achieved. If all FP across all flow groups are the same, FPBR will be equal to one in the ideal case for filling balance performance. In the present invention, a Flow Path Balance Performance value ($P_f$) is first developed to measure the relative performance of an individual compared to the user-defined goal value of the FPBR (see Equation 8).

$$\text{Flow Path Balance Ratio } (FPBR) = \frac{\sum_{i=1}^{n}(FP_i/FP_{min}) - 1}{n - 1} \quad (7)$$

where i is the index number of individual cavity, n is the total number of cavities in the family mould, $FP_i$ is the flow path length measured from the starting point of the sprue to the boundary of the cavity (mm), and $FP_{min}$ is the minimum flow path length among all flow path lengths (mm).

$$\text{Flow Path Balance Performance } (P_f) = \frac{FPBR_{goal}}{FPBR_i} * 100\% \quad (8)$$

where $FPBR_{goal}$ is the user-defined goal FPBR value (ideally equal to 1), and $FPBR_i$ is the FPBR value of design solution (i).

Figure 23:
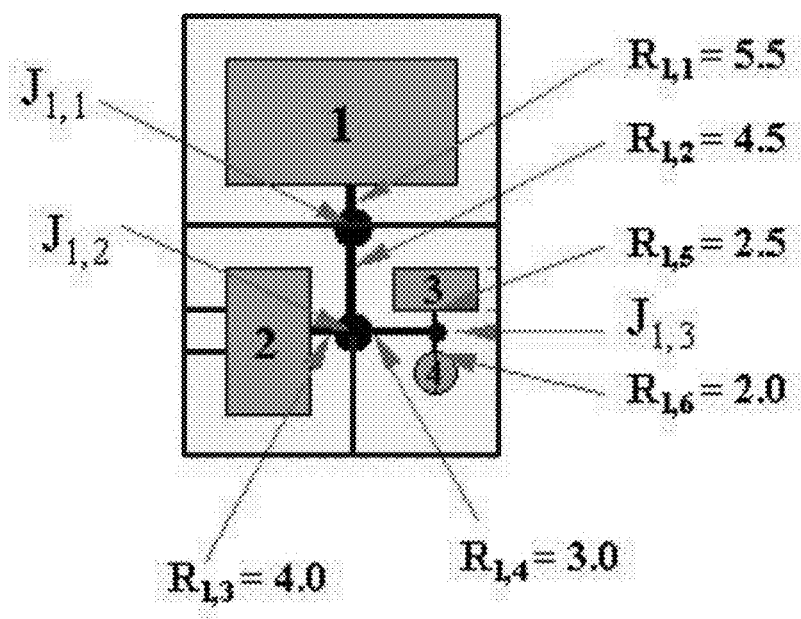
FIG. 23 shows an illustrative example of Runner Diameter Balance Ratio (RDBR) of a family mould.

At Step 308, the runner diameter balance performance ($P_r$) is calculated. The Flow Path Balance Ratio (FPBR) focuses on measuring the average variation of FP relative to the minimum FP across all flow groups, but it cannot consider the effect of possible flow hesitation caused by the significant variation of diameters of all runner segments. As shown in FIG. 23, different FMCRLD alternatives have different numbers of runner segments with different lengths and branching nodes resulting in different variations of the diameters of each runner segments. In the present invention, a Runner Diameter Balance Ratio (RDBR) is first developed to measure the variation of runner diameters at each runner branching node (see Equation 9). For example, RDBR at $J_{1,1}$ is equal to 1.22 ($R_{1,1}/R_{1,2}$=5.5/4.5). RDBR at $J_{1,2}$ is equal to 1.33 ($R_{1,3}/R_{1,4}$=4.0/3.0). RDBR at $J_{1,3}$ is equal to 1.25 ($R_{1,5}/R_{1,6}$=2.5/2.0). The overall RDBR of FMCRLD solution (i) is defined as the maximum RDBR across all junctions (see Equation 10). In this case, the overall RDBR is less than two. This means that this FMCRLD solution has a better chance of avoiding possible flow hesitation occurring at runner branching nodes. The present invention first defines a Runner Diameter Balance Performance value ($P_r$) to measure the relative performance of an individual compared to the user-defined goal value of the Runner Diameter Balance Ratio (RDBR) (see Equation 11).

$$\text{Runner Diameter Balance Ratio } (RDBR) \text{ at junction } (J_{i,j}) = \frac{R_{max} \text{ at junction } (J_{i,j})}{R_{min} \text{ at junction } (J_{i,j})} \quad (9)$$

where $R_{max}$ is the maximum runner diameter (mm) at junction ($J_{i,j}$) excluding the input runner, $R_{min}$ is the minimum runner diameter (mm) at junction ($J_{i,j}$) excluding the input runner, i is an index referring to Design solution (i), and j is an index referring to Junction (j) of Design solution (i).

$$RDBR_i = \max\{RDBR_{i,1}, RDBR_{i,2} \ldots RDBR_{i,n}\} \quad (10)$$

where $RDBR_i$ is the maximum value across all RDBR at junction ($J_{i,j}$), i is an index referring to Design solution (i), j is an index referring to Junction (j) of Design solution (i), and n is the total number of junctions in the runner system of Design solution (i).

$$\text{Runner Diameter Balance Performance } (P_r) = \frac{RDBR_{goal}}{RDBR_i} * 100\% \quad (11)$$

where $RDBR_{goal}$ is the user-defined goal RDBR value (usually equal to 1.2), and $RDBR_i$ is the RDBR value of design solution (i).

Figure 24A:
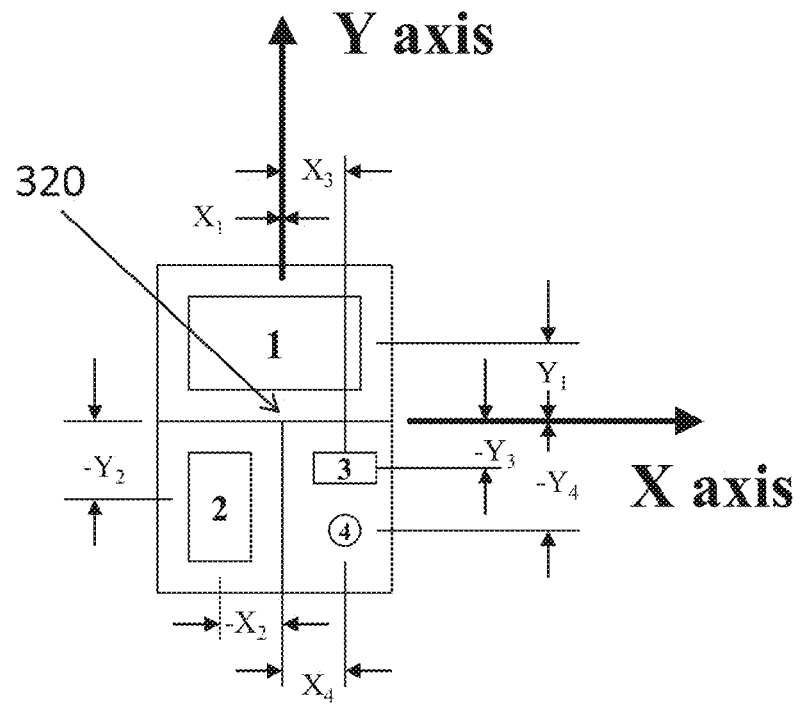
FIGS. 24a and 24b show an illustrative example of centre of resultant clamping force of a family mould.
Figure 24B:
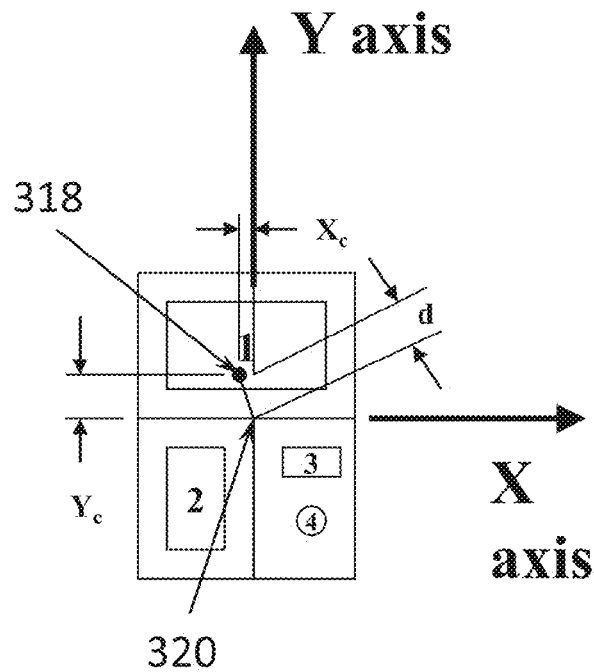

At Step 310, the clamping force balance performance ($P_c$) is calculated. One of the mould layout design objectives is to keep the sum of all reactive forces in the centre of gravity of the platen. In other words, cavities should be arranged about the centre of the mould as symmetrically as possible to ensure an even and adequate clamping force over the entire mould area. As shown in FIG. 24, the present invention makes use of the centre of the resultant clamping force 318 acting on all dissimilar moulding parts located in different locations with respect to the centre of a family mould 320 to measure the clamping force balance performance of a FMCRLD alternative (as calculated using Equations 12 and 13). The offset dimension (d) is defined as the offset distance between the centre of the resultant clamping force 318 and the centre of the family mould 320 for the given cavity layout design (as calculated using Equation 14). The smaller the offset dimension (d) is the better clamping force balance performance that can be achieved. The present invention defines a clamping force balance performance value ($P_c$) to measure the relative performance of an individual compared to the user-defined goal value of the offset dimension (d) (see Equation 15).

$$X_c = \frac{\sum_{i=1}^{n}(F_i * X_i)}{\sum_{i=1}^{n} F_i} \quad (12)$$

$$Y_c = \frac{\sum_{i=1}^{n}(F_i * Y_i)}{\sum_{i=1}^{n} F_i} \quad (13)$$

where $X_c$ is the X-coordinate of the centre of the resultant clamping force 318 measured from the centre of the family mould 320, $Y_c$ is the Y-coordinate of the centre of the resultant clamping force 318 measured from the centre of the family mould 320, i is the index of individual moulding part in the family mould, n is the total number of moulding parts in the family mould, $F_i$ is the estimated clamping force for the moulding part (i), $X_i$ is the X-coordinate of the centre of the estimated clamping force acting on the moulding part (i) measured from the centre of the family mould 320, and $Y_i$ is the Y-coordinate of the centre of the estimated clamping force acting on the moulding part (i) measured from the centre of the family mould 320.

$$d = \sqrt{(X_c)^2 + (Y_c)^2} \quad (14)$$

$$\text{Clamping force balance performance } (P_c) = \frac{d_{goal}}{d_i} * 100\% \quad (15)$$

where $d_{goal}$ is the pre-defined goal value of the offset distance of the centre of the resultant clamping, and $d_i$ is the offset distance of the individual design solution (i).

Figure 25:
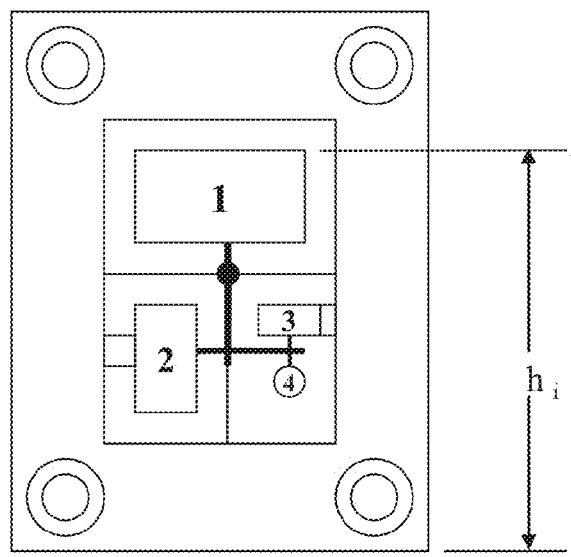
FIG. 25 shows a drop height of moulding parts of a family mould.

At Step 312, =the drop time performance ($P_d$) is calculated. FIG. 25 shows a drop height of moulding parts of a family mould. FMCRLD affects the drop height ($h_i$) of the moulding parts. Assuming that the product has no initial speed downward at the point of ejection, the estimated drop time can be calculated using Equation 16. Accordingly, the drop time performance value ($P_d$) is defined to measure the relative performance of an individual compared to the user-defined goal value of the drop time (see Equation 17).

$$t_i = \sqrt{2h_i/a} \quad (16)$$

where $t_i$ (second) is the time of free fall for the design solution (i), $h_i$ (m) is the falling distance required to clear the moulding area before re-closing the mould, and a is the gravity (m/s$^2$).

$$\text{Drop time performance } (P_d) = \frac{t_{goal}}{t_i} * 100\% \quad (17)$$

where $t_{goal}$ is the pre-defined goal value of the drop time, and ti is the estimated drop time of Design solution (i).

At Step 314, the weighted sum fitness value is calculated. The objective of using Cost Performance (CP) to represent the "fitness" value in the present invention is to search for a group of design solutions having a good balance of performance over cost. The cost factor consists of the costs of mould insert material (see Step 294), mould base (see Step 296), runner material (see Step 298), sliders (see Step 300), injection moulding (see Step 302) and penalty (see Step 304). The performance factor involves flow path balance performance (see Step 306), runner diameter balance performance (see Step 308), clamping force balance performance (see Step 310) and drop time performance (see Step 312). In current practice, the performance and cost objectives for each individual family mould design may be different from case to case depending on the different mould specifications and requirements. In some embodiments, the objectives are: the drop height performance can be ignored, the pressure drop balance is the most important factor, and the cost of runner material and sliders are less important than the cost of the mould base. In other embodiments, the cost of the mould base may be the main concern. The priority of each sub-objective must be able to be changed individually for different mould specifications and requirements. Therefore, a simple weighted sum approach is adopted in the present invention for combining a number of performance goals, incurred costs and penalty into a single CP value using Equation 18.

$$CP = \frac{K_m(C_m) + K_n(C_n) + K_r(C_r) + K_s(C_s) + K_j(C_j) + K_p(C_j)}{W_f(P_f) + W_r(P_r) + W_c(P_c) + W_d(P_d)} \quad (18)$$

where $P_f$ is the flow path balance performance value (%), $P_r$ is the runner diameter balance performance value (%), $P_c$ is the clamping force balance performance value (%), $P_d$ is the drop height balance performance value (%), $W_f$ is the weighting ratio of $P_f$, $W_r$ is the weighting ratio of $P_r$, $W_c$ is the weighting ratio of $P_c$, $W_d$ is the weighting ratio of $P_d$, $C_m$ is the cost of the mould base (HK$), $C_n$ is the cost of mould insert material (HK$), $C_r$ is the cost of runner material for the whole production volume (HK$), $C_s$ is the cost of sliders (HK$), $C_j$ is the cost of injection moulding (HK$), $K_m$ is the weighting ratio of $C_m$, $K_n$ is the weighting ratio of $C_n$, $K_r$ is the weighting ratio of $C_r$, $K_s$ is the weighting ratio of $C_s$, $K_j$ is the weighting ratio of $C_j$, $K_p$ is the penalty factor, $W_f + W_r + W_c + W_d = 1$, and $K_m + K_n + K_r + K_s + K_j = 1$.

The total cost incurred to achieve such overall performance improvement is the sum of all sub-costs (HK$) multiplied by their corresponding weighting ratios. The sum of $W_f$, $W_r$, $W_c$ and $W_d$ must be equal to 1. The sum of $K_m$, $K_n$, $K_r$, $K_s$ and $K_j$ must be equal to 1. Mould designers can adjust the weighting ratios according to their desired objectives. For example, $W_d$ can be set to zero if the drop height performance can be ignored. If the cost of the mould base is more important than the cost of sliders, users can set $K_m$ higher than $K_s$. $K_p$ is a penalty factor for adjusting the weighting ratio of the penalty cost of injection moulding ($C_j$).

At Step 316, the cost performance data is written to the Fitness value data list stored in the system memory.

Figure 26:
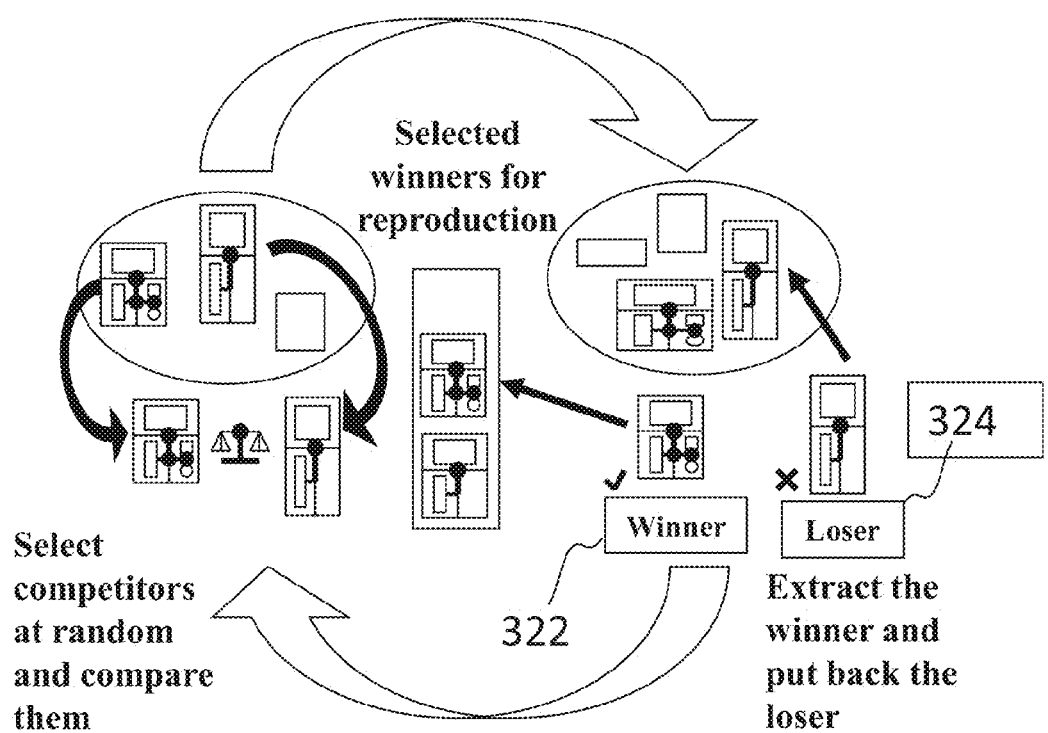
FIG. 26 illustrates the tournament selection strategy adopted in the present invention.

FIG. 26 illustrates a tournament selection strategy adopted in the present invention. The tournament selection strategy simulates the mating battles often seen in nature by mutual "competition" of s individuals (tournament size) chosen at random from the population. In the mating battle of two individuals (s=2), the winner 322 (individual with comparatively higher fitness) is selected and the loser 324 (individual with comparatively lower fitness) is put back into the population. This mating battle is repeated until the required number of individuals for reproduction is selected.

Figure 27:
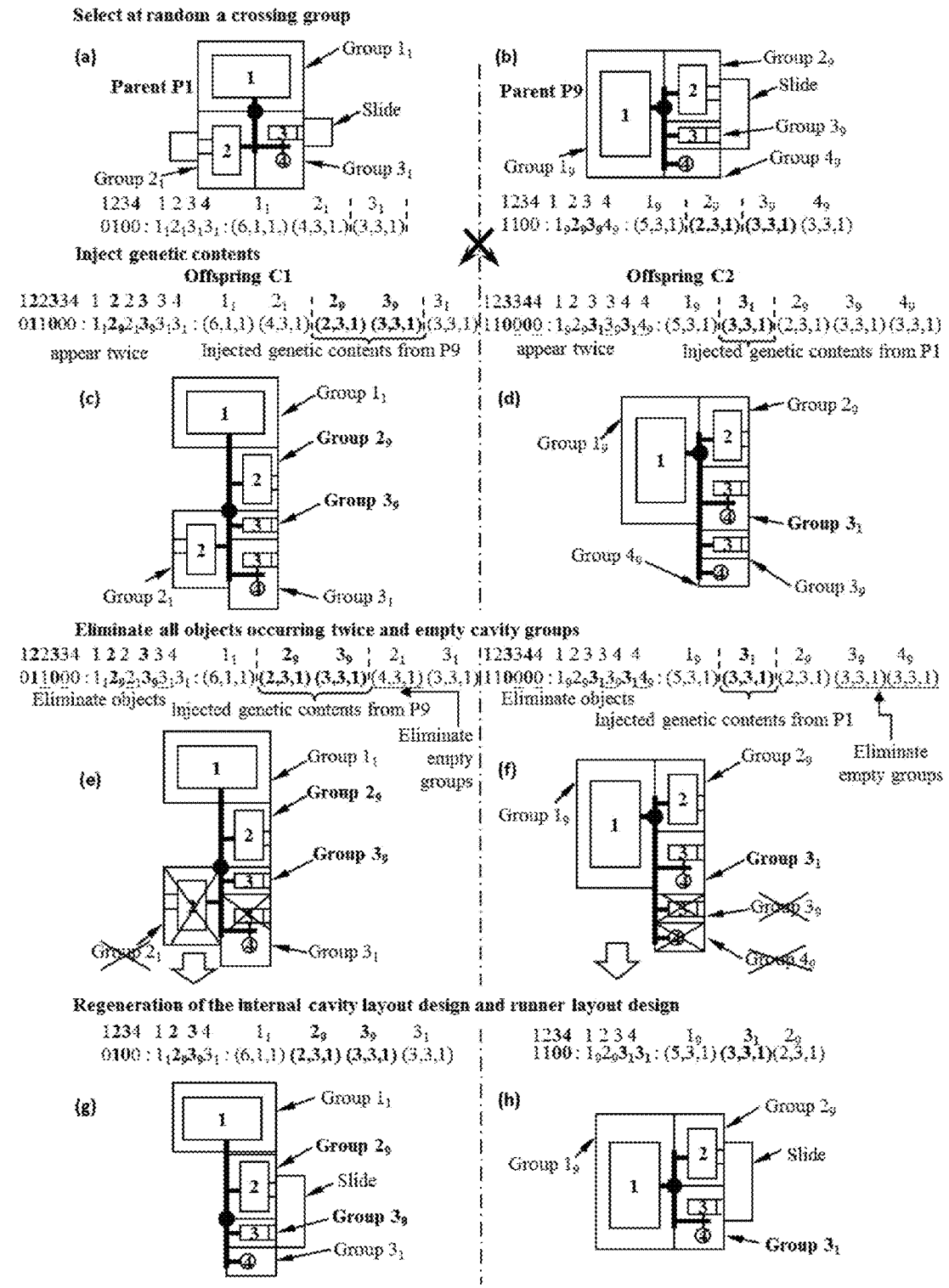
FIG. 27 illustrates the group-oriented SG-based crossover operator.

FIG. 27 illustrates a novel group-oriented SG-based crossover operator, which is specially developed to fit the properties of the new variable-length SG-based chromosome. This new group-oriented SG-based crossover operator integrated with a SG and knowledgebase aims to reproduce valid offspring during the evolutionary process. In the present invention, the crossover operator works with a SG of FMCRLD incorporated with a mould design knowledgebase. As shown in FIGS. 27a and 27b, the first step is to select at random a crossing group in the Group Layout Shape Rules Session in each of the two parents with a predetermined crossover rate. The crossover rate can be set between 0.3 and 1.0, and reflects a proportion of a number of crossing groups to a total number of cavity groups in each of the two parents. For example, if the crossover rate is set to 0.3, the number of crossing groups for P1 and P9 will be equal to 0.3×3=0.9 (corrected to an integer value of 1) and 0.3×4=1.2 (corrected to an integer value of 2) respectively. Accordingly, Group 3 of the first parent (P1) and Groups 2 and 3 of the second parent (P9) are selected at random. If the crossover rate is set to 1.0, no crossover will occur because there will be only clones of the parents. As shown in FIGS. 27c and 27d, the second step is to inject the crossing groups of both parents to each other. The allele in the orientation session and the group session associated with the crossing section of the second parent (P9) are copied to the corresponding locus of the first parent (P1), and vice versa. The last step is to eliminate all objects occurring twice and empty groups as shown in FIGS. 27e and 27f. Accordingly, the slider will also be automatically changed based on the new location and orientation of the moulding parts in the new FMCRLD. Because of the SG of FMCRLD, the group placement design, regeneration of the internal cavity layout design and the runner layout design can be performed of the new offspring can be intelligently regenerated while maintaining the feasibility of FMCRLD after the crossover operation (see FIGS. 27g and 27h). It is noticed that offspring C1 inherits the single slider design for Parts 2 and 3 from P1. Offspring C2 can inherit not only the single slider design for Parts 2 and 3 from P9 but also the balanced runner layout design from P1. In other application areas, the crossover operator can work with different sets of SG rules incorporated with different design knowledgebase in the same manner. This new group-oriented SG-based crossover operator can inherit or combine meaningful features from both parents to reproduce a stronger offspring without violation of the design constraints and disruption of the useful moulding parts (schemata) of the chromosome during recombination. The proportion of features inherited from each of the parents is controlled by the crossover rate.

A mutation operator aims to introduce new species into the population in the GA to explore the solution space by performing random modification of an individual's gene value. In the present invention, three types of SG-based mutation operators are specially developed for the (i) orientation session (see FIG. 28 for more details), (ii) group session (see FIG. 29 for more details), or (iii) group layout shape rules session (see FIG. 30 for more details) of the new hybrid SG-based chromosome. One of these mutation operators for different sessions is selected at random and is applied to the offspring chromosome based on a predetermined mutation rate. The mutation rate can be set to between 0.0 and 1.0, and decides how often the offspring chromosome will be mutated. A random number between 0.0 and 1.0 is generated for each offspring chromosome reproduced at each generation that is less than or equal to the mutation rate (for example, 0.1), then the mutation operation is performed. A mutation rate of 0.0 means that no mutation will occur. A mutation of 1.0 means that all offspring chromosomes will be mutated.

Figure 28:
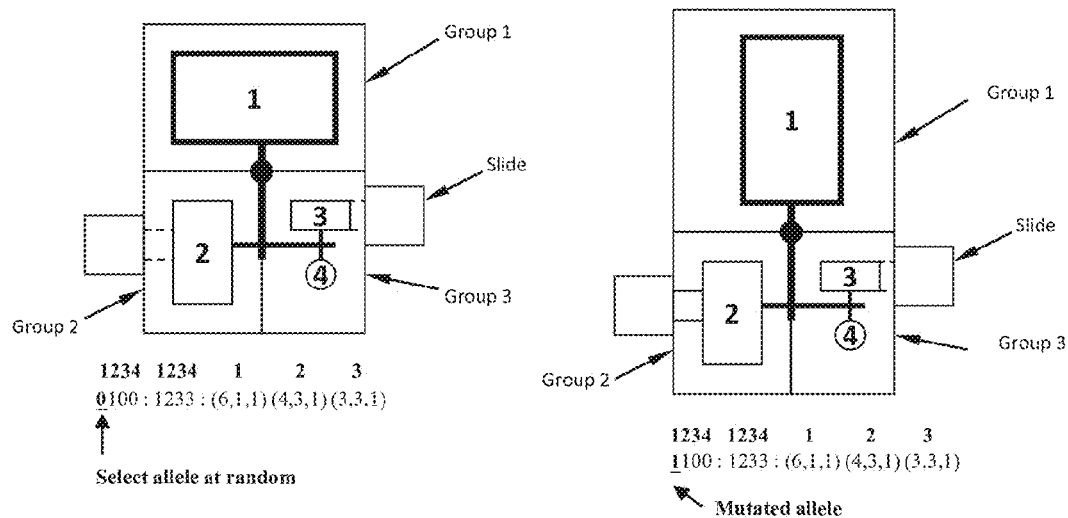
FIG. 28 illustrates the mutation of the allele of the gene in the orientation session.

FIG. 28 illustrates the mutation of the allele of the gene in the orientation session. The first gene (representing Part 1) is selected at random. The allele of this gene is flipped from zero to one. The orientation of Part 1 will be changed from horizontal to vertical if there is no violation of the design constraint of the allowable gate location of the moulding part, existing runner layout and the space for the slider.

Figure 29:
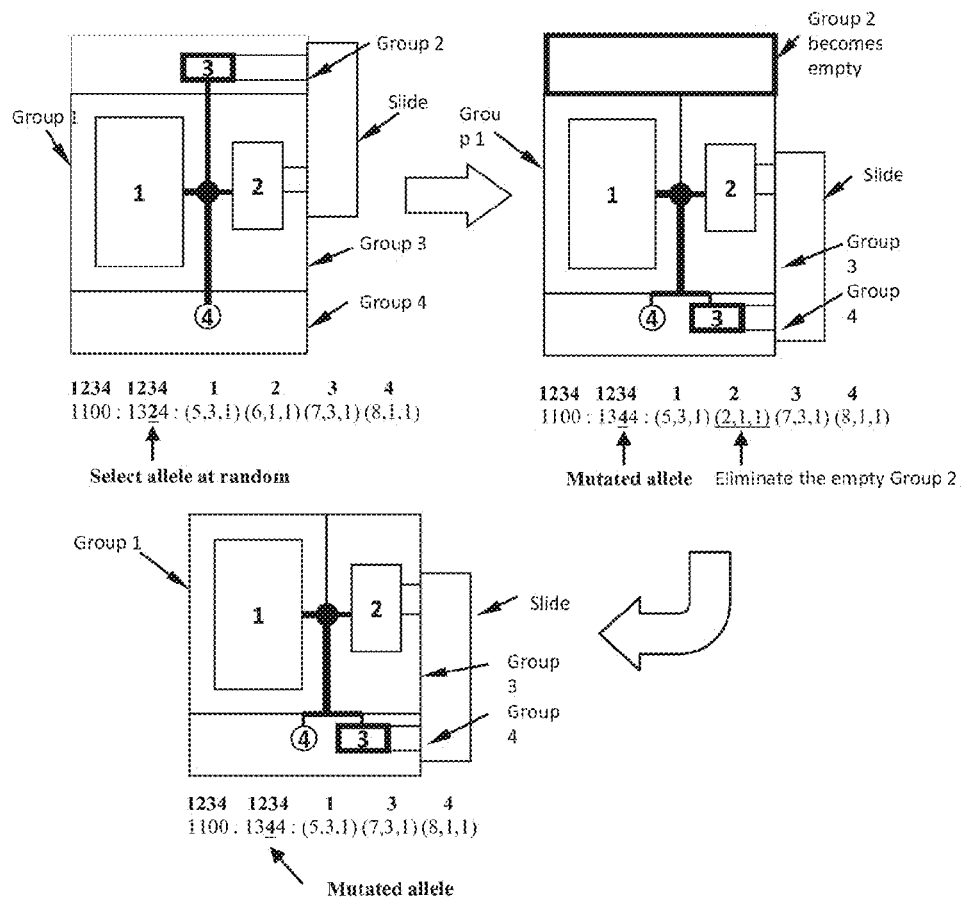
FIG. 29 illustrates the mutation of the allele of the gene in the group session—change group and eliminate empty groups.

FIG. 29 illustrates the mutation of the allele of the gene in the group session—change group and eliminate empty groups. In the group session, mutation changes groups and eliminates empty groups, if any. As shown in FIG. 29, the third gene (representing Part 3) in the group session is selected at random. Its allele (representing the group number) is changed to any group randomly selected from the existing other groups or to a new group created randomly. In this example, the group of Part 3 is changed from 2 to 4. According to the group placement rules of Group 4, the internal cavity layout and runner layout for Parts 3 and 4 is generated automatically. Then, Group 2 becomes empty and it will be eliminated.

Figure 30:
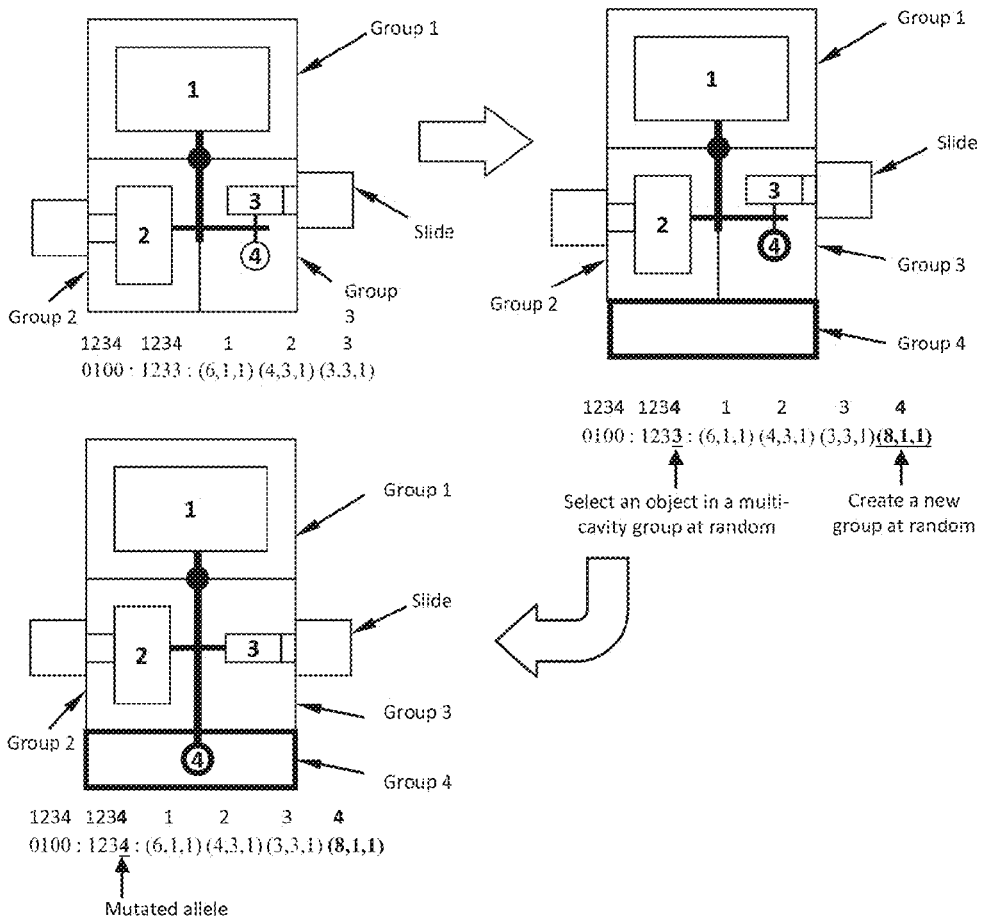
FIG. 30 illustrates the mutation of the allele of the gene in the group session—create a new group.

FIG. 30 illustrates the mutation of the allele of the gene in the group session—create a new group. In this example, Group 4 is newly generated at random. The forth gene (representing Part 4) in the group session is selected at random. According to the group placement rules of Group 4, the internal cavity layout and runner layout for Part 4 is generated automatically.

Figure 31:
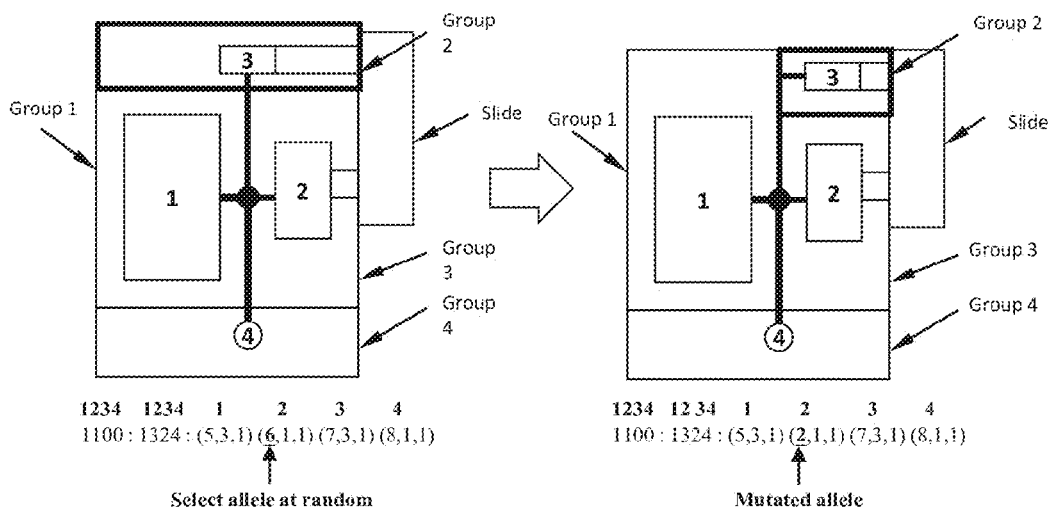
FIG. 31 illustrates the mutation of the allele of the gene in the group layout shape rules session.

FIG. 31 illustrates the mutation of the allele of the gene in the group layout shape rules session. In the group layout shape rules session, mutation modifies the group placement shape rule, internal cavity layout rule or runner layout shape rule of the cavity group selected at random. In this example, the gene (representing the group placement shape rule of Group 2) is selected at random. If its allele is modified from 6 to 2, the phenotype will be changed accordingly.

Figure 32:
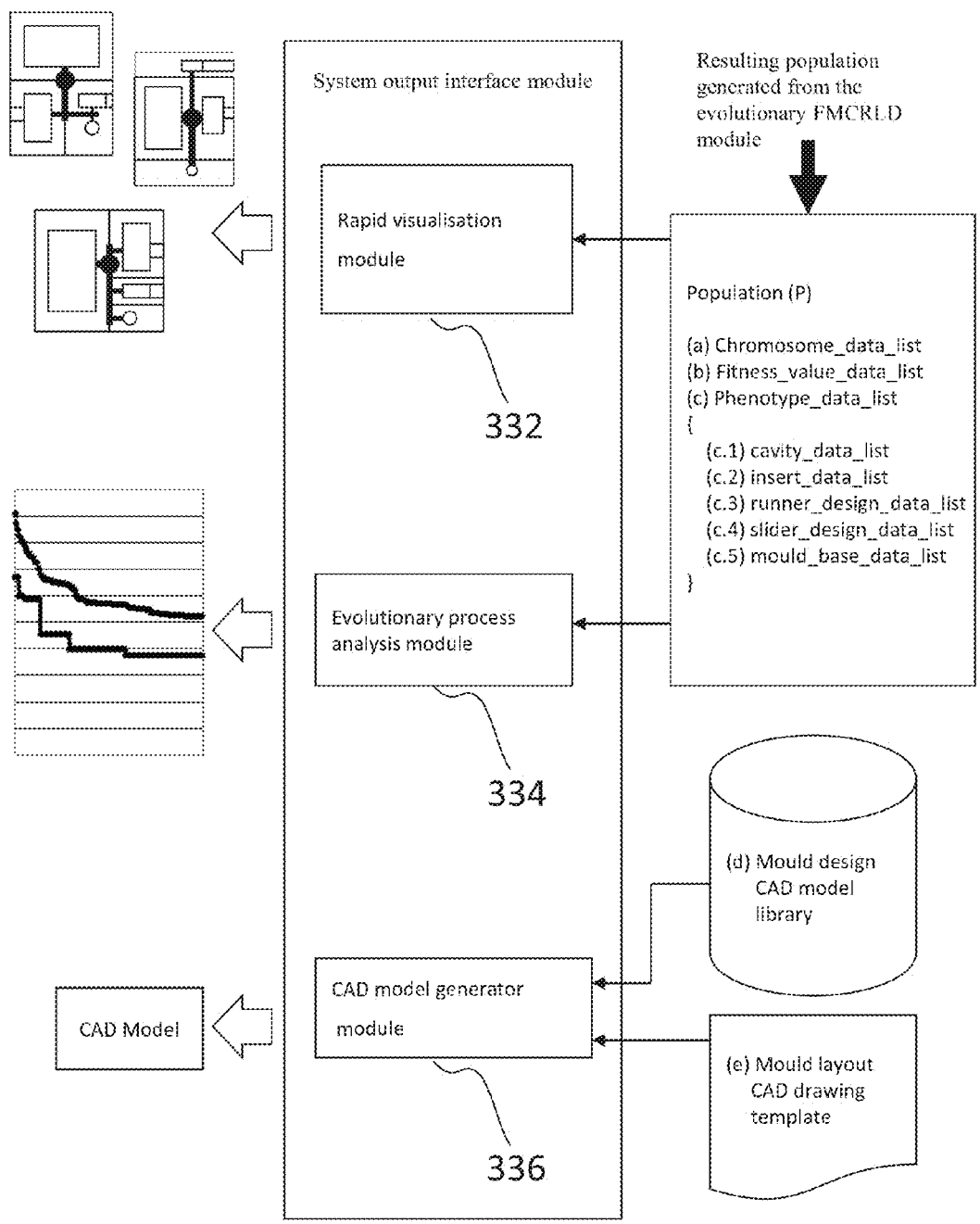
FIG. 32 shows the program flow chart of the system output interface module.

FIG. 32 shows the program flow chart of the system output interface module. The system output interface module is composed of three key modules: (1) Rapid visualisation module 332 (see FIG. 33 for more details), (2) Evolutionary process analysis module 334 (see FIG. 34 for more details) and (3) CAD model generator module 336 (see FIG. 35 for more details).

Figure 33:
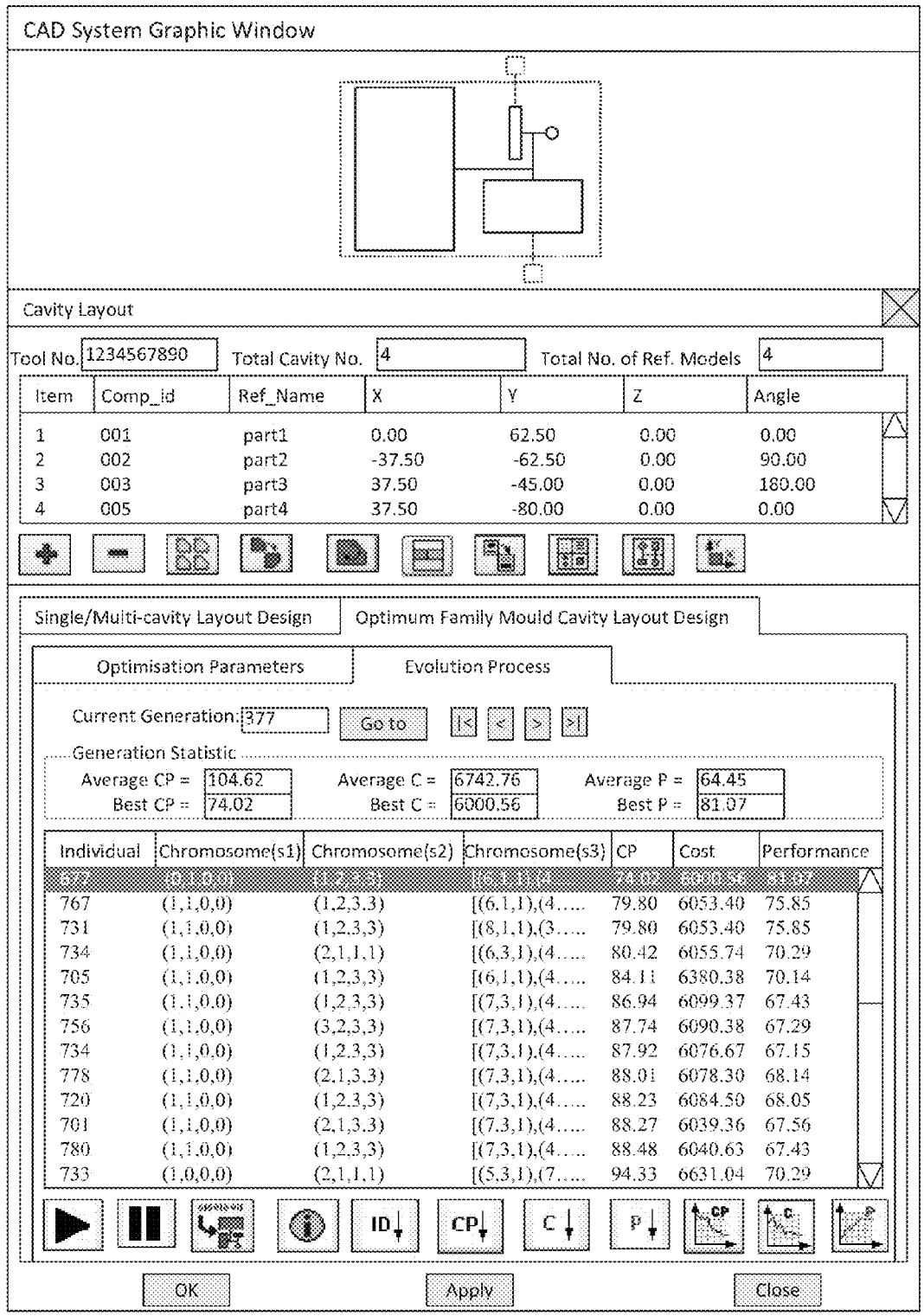
FIG. 33 shows the graphical user interface of the evolutionary process.

FIG. 33 shows the graphical user interface of the evolutionary process. The resulting population can be obtained from the evolutionary FMCRLD module (see FIG. 18). Then the "rapid visualisation module" (see FIG. 35) is activated automatically to display the results in the main dialogue box menu.

Figure 34:
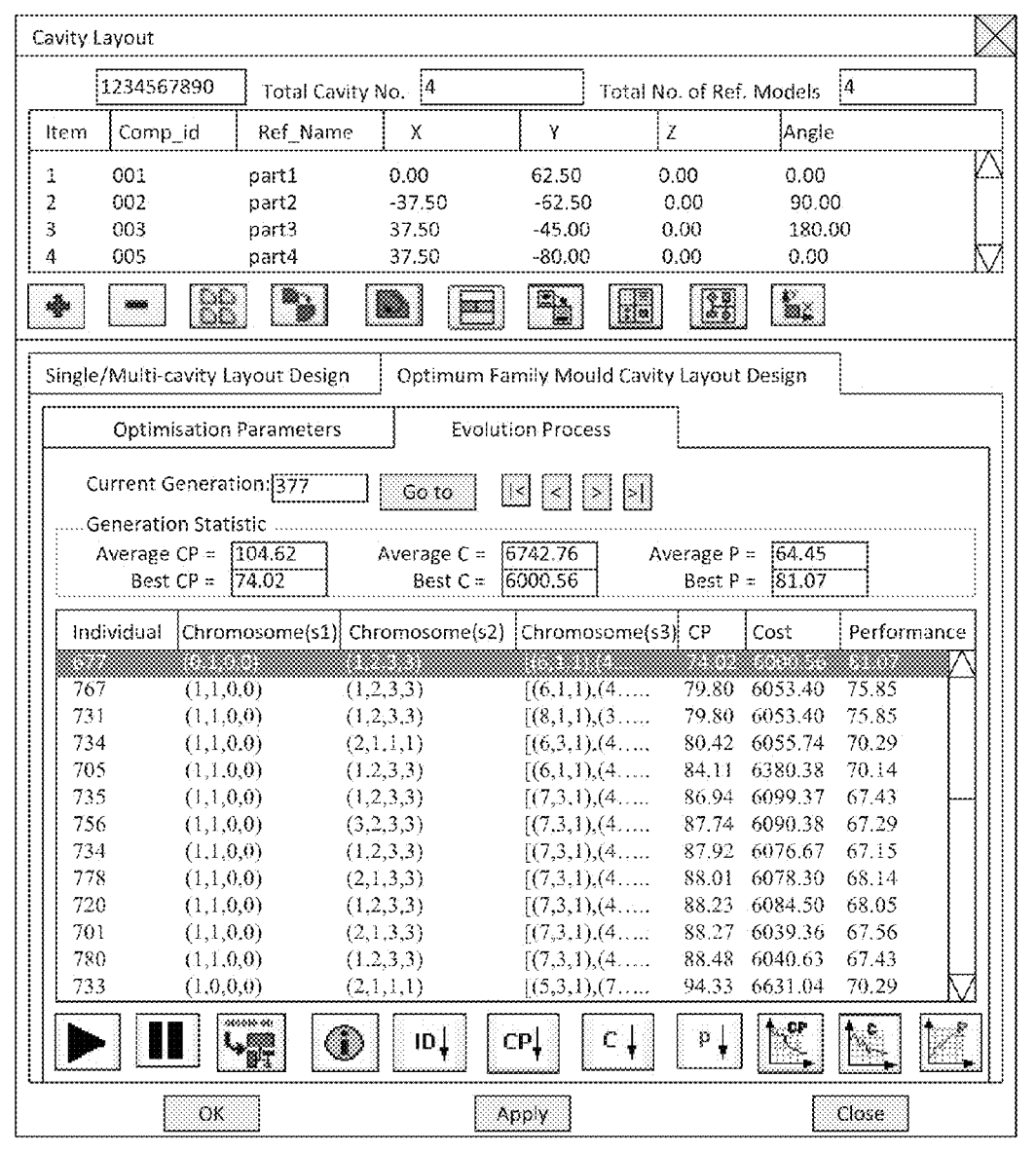

FIG. 34 shows the dialogue menu of the evolutionary process. Mould designers can browse the number of generations one by one using the graphical user interface as shown in the layout of "Current Generation". The values of average Cost Performance (CP), best Cost Performance (CP) and so forth of the selected generation are shown in the layout of "Generation Statistics" in FIG. 34. All individuals of the population of the selected generation are listed in the table (see the table below the layout of "Generation Statistics" in FIG. 34). This table shows the information of each individual such as individual identity number, chromosome, CP value and so forth. When a mould designer highlights one of the individuals in the table, the instant visualisation of its phenotype is shown in the graphic window (see FIG. 33). Mould designers can press the "Analysis function" button to activate the "Evolutionary process analysis module" to study the line chart of CP plotted against generations.

Figure 35:
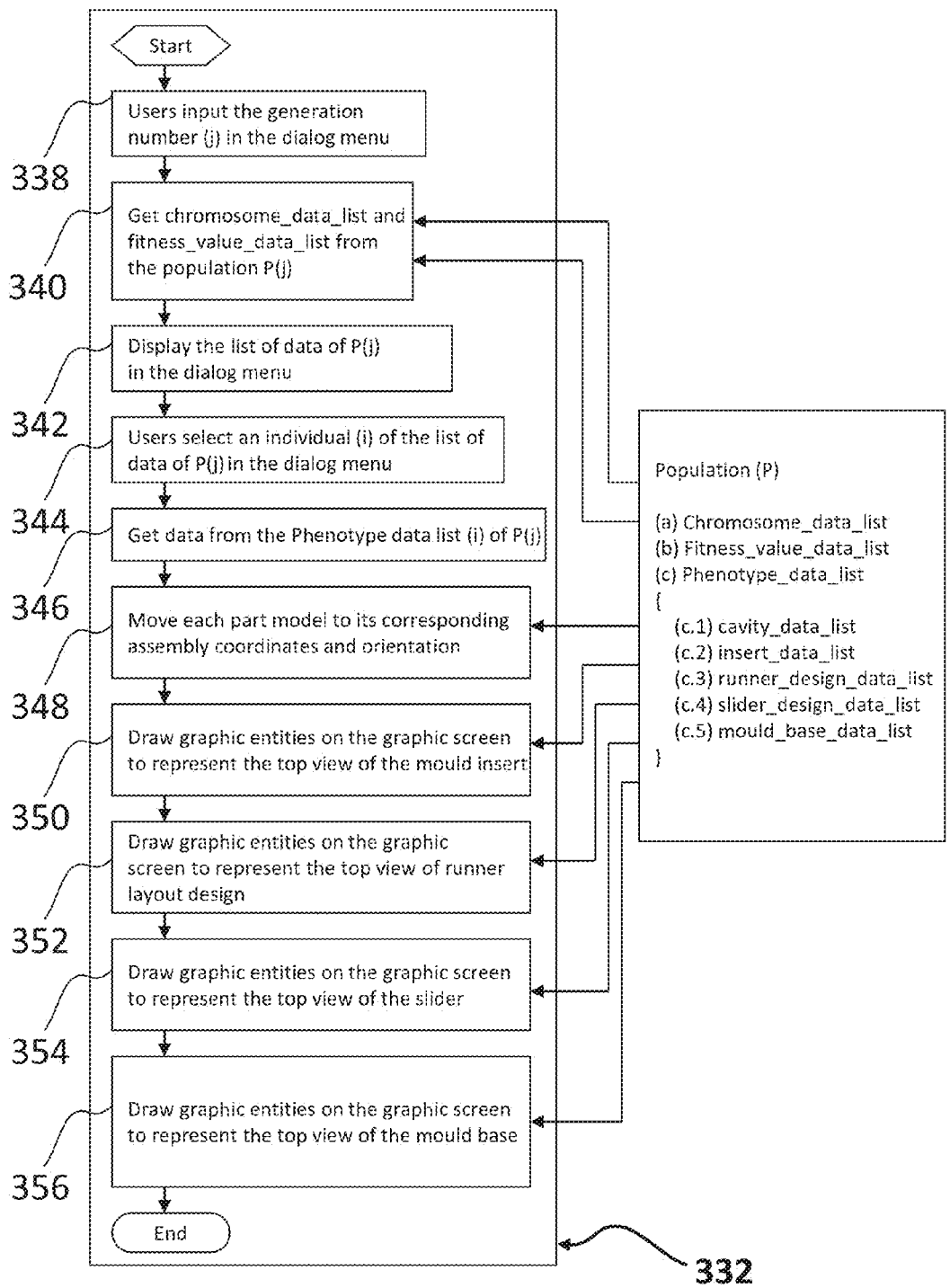
FIG. 35 shows the program flow chart of the rapid visualisation module.

FIG. 35 shows the program flow chart of the rapid visualisation module 332. At Step 338, users are required to input the generation number (j) in the dialogue box menu. Then, the program reads the chromosome data at generation (j) from the "chromosome_data_list" and the fitness data at generation (j) from the "fitness_data_list" at Step 340. Step 342 is to display the data in the dialogue box menu as shown in FIG. 34. When users select one of the individuals listed in the table at Step 344, the program reads data related to the individual (i) from the "population_data_list" at generation (j) at Step 346. Then, the moulding part models are moved to their corresponding assembly coordinates and orientation stored in the "cavity_data_list" at Step 348. Step 350 involves reading data related to the individual (i) from the "insert_data_list" and drawing graphic entities on the graphic screen to represent the boundary box of the mould insert. Similarly, Step 352 involves reading data related to the individual (i) from the "runner_design_data_list" and drawing graphic entities on the graphic screen to represent the runner layout design. Step 354 involves reading data related to the individual (i) from the "slider_design_data_list" and drawing graphic entities on the graphic screen to represent the top view of the sliders. Finally, Step 356 involves reading data related to the individual (i) from the "mould_data_list" and drawing graphic entities on the graphic screen to represent the top view of the mould base (see FIG. 33).

Figure 36:
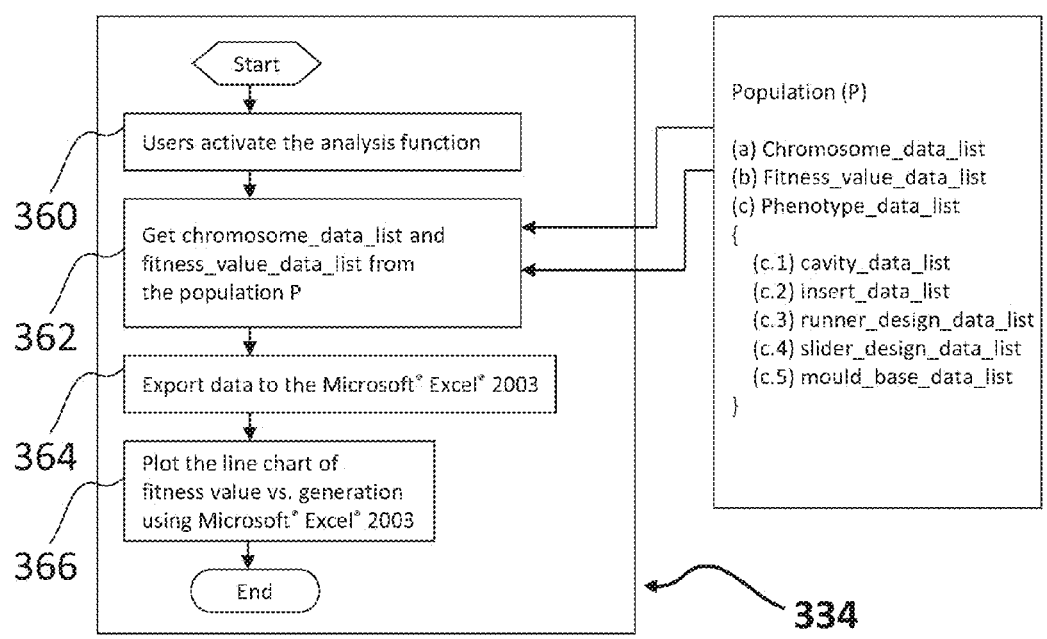
FIG. 36 shows the program flow chart of the evolutionary process analysis module.

FIG. 36 shows the program flow chart of the evolutionary process analysis module 334. Once the analysis function is activated by users at Step 360, the program obtains the chromosome data of all generations from the "chromosome_data_list" and the fitness data of all generations from the "fitness_data_list" at Step 362. Then the data are exported to the Microsoft® Excel® 2003 at Step 364. Finally, the line chart of fitness values is plotted against generations at Step 366 (see FIG. 39).

Figure 37:
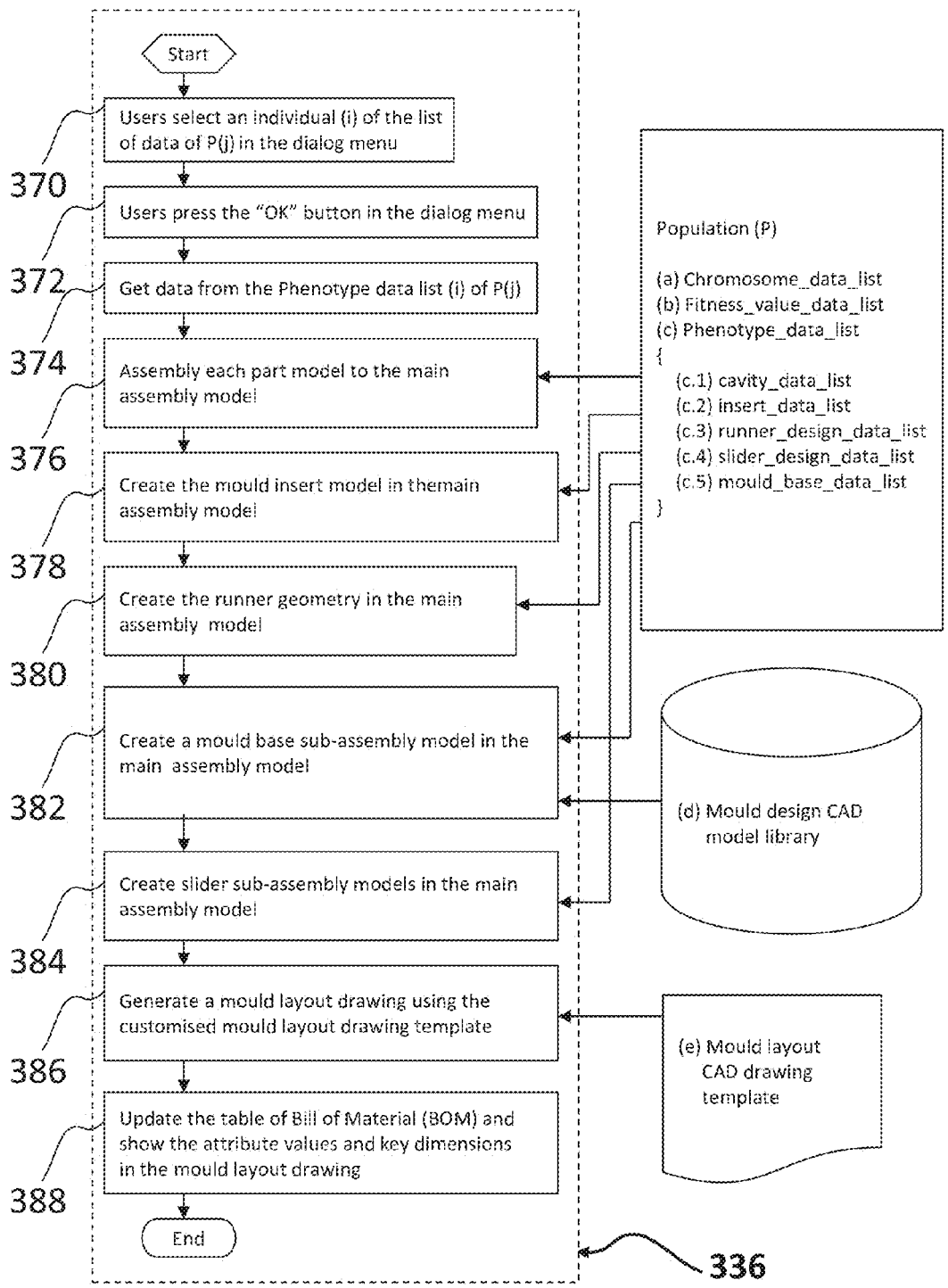
FIG. 37 shows the program flow chart of the CAD model generator module.

FIG. 37 shows the program flow chart of the CAD model generator module 336. At Step 370, users select an individual (i) from the table in the dialogue box menu as shown in FIG. 34. When users press the "OK" button in the dialogue box menu (see FIG. 34) at Step 372, the program obtains the data related to the individual (i) from the "cavity_data_list" at Step 374. Then, at step 376, all moulding part models are assembled together with the main assembly model according to their corresponding assembly coordinates and orientation. Step 378 involves reading data related to the individual (i) from the "insert_data_list" and creating the mould insert model in the main assembly model. Step 380 involves obtaining the data related to the individual (i) from the "runner_design_data_list" and creating the runner features in the main assembly model. At Step 382, the program retrieves the mould base sub-assembly model from the mould design CAD model library and assembles it together with the main assembly model, and updates the dimensional parameters of the mould base assembly with the data related to the individual (i) obtained from the "mould_base_data_list". Similarly, at Step 384, the slider sub-assembly model is retrieved from the mould design CAD model library and is assembled together with the main assembly model, and the dimensional parameters of the slider sub-assembly model is updated with the data related to the individual (i) obtained from the "slider_design_data_list". Then, Step 386 is to generate a mould layout drawing of the main assembly model using the customised drawing template. Finally, Step 388 involves generation of the Bill of Material (BOM) according to the main assembly model and showing the attribute values (such as the project name, mould base model number, type of gate and so forth) and the key dimensions (such as the dimensions of the mould base and the mould insert) in the mould layout drawing.

Operation:

In practice, it is difficult to design a good FMCRLD for dissimilar moulding parts having significant variations in sizes. In an attempt to search for the optimum FMCRLD solutions with good filling balance performance and the use of smaller mould bases, the weighting ratios of $P_f$, $P_r$ and $C_m$ are set to be higher than others for this example. The setting of design objectives and constraints used in this example are summarised in Table 2. The performance of the GA depends on the choice of GA parameters. One of the most important parameters is the population size. If the population size is too small, the GA may not explore enough of the solution space to consistently find good solutions leading to a premature convergence problem. The larger the population sizes, the greater the chance that the GA can find global optimum solutions because of its more diverse gene pool. However, a very large population would be computationally expensive. There should be an optimum value in between, but finding an optimum setting of GA parameters is problem-specific and outside the scope of this invention. This invention focuses more on accelerating mould designers' design alternative exploration, exploitation and optimisation for better design in less time. In an attempt to provide a more diverse gene pool for the GA to explore and exploit more design alternatives to search for global optimum solutions in a limited time, a reasonably large population of about 500 is chosen for this experimental first try. The setting of all the GA parameters used in this example is listed in Table 3. If necessary, the GA parameters may need to be adjusted according to the optimisation results. Users can input the aforementioned GA parameters, design objectives and constraints using the input interface module as shown in FIG. 16-17. Then users can press the start button as shown in FIG. 34 to run the evolutionary process.

Figure 38:
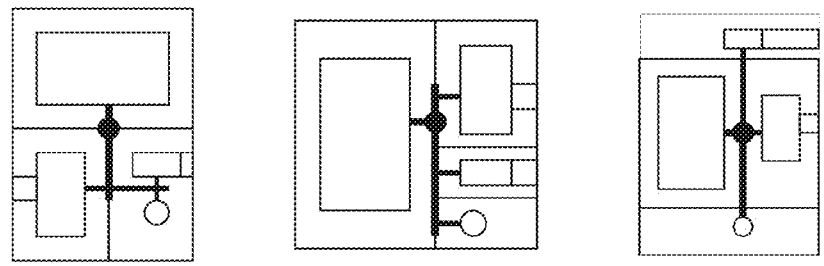
FIG. 38 shows some examples of initial random generation of FMCRLD produced by the ICMLDS.
Figure 39:
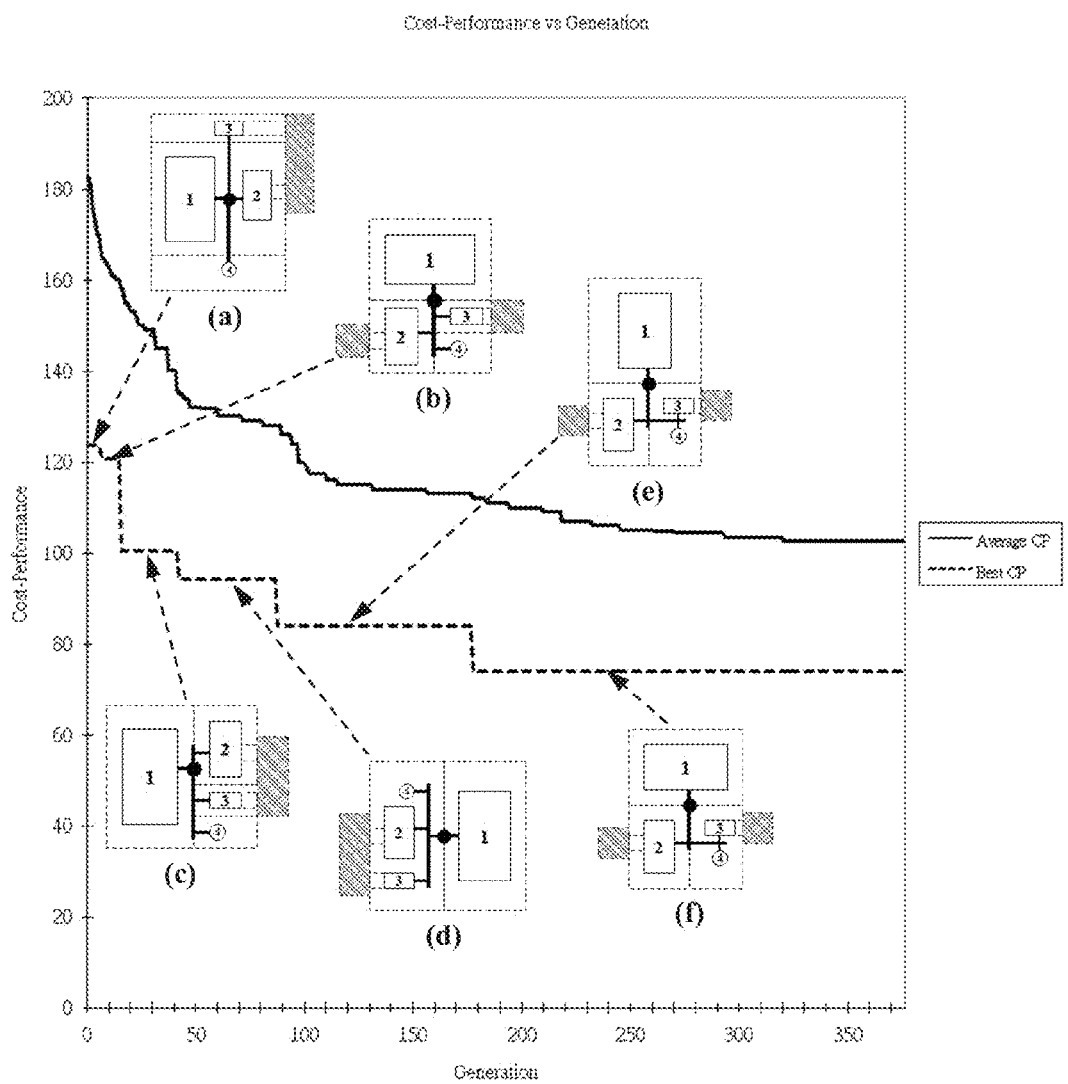
FIG. 39 shows the graph of average CP and best CP vs. generation.
Figure 40:
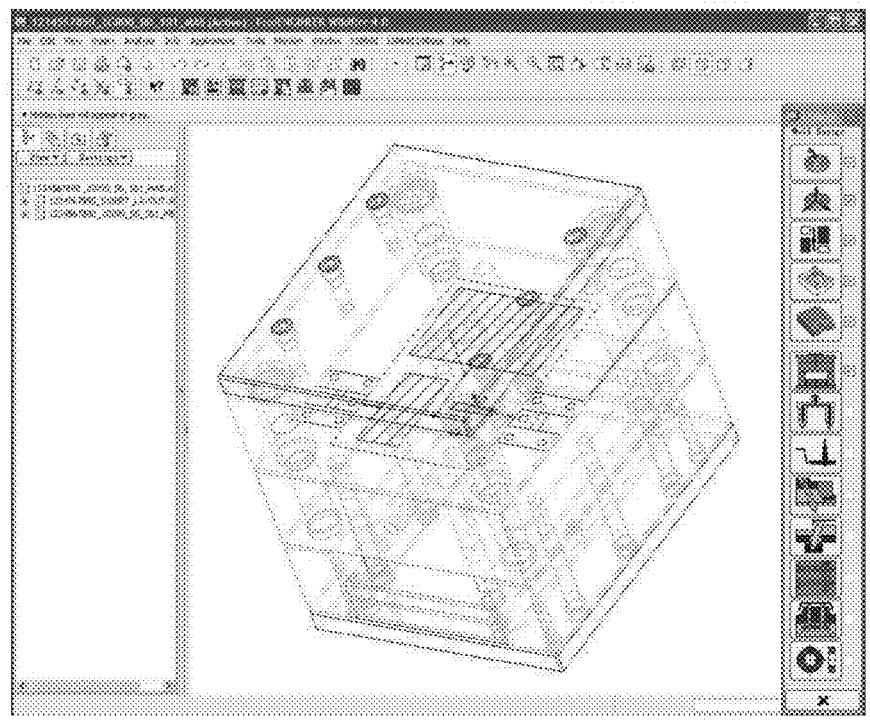
FIG. 40 shows the mould layout assembly model generated by the ICMLDS.
Figure 41:
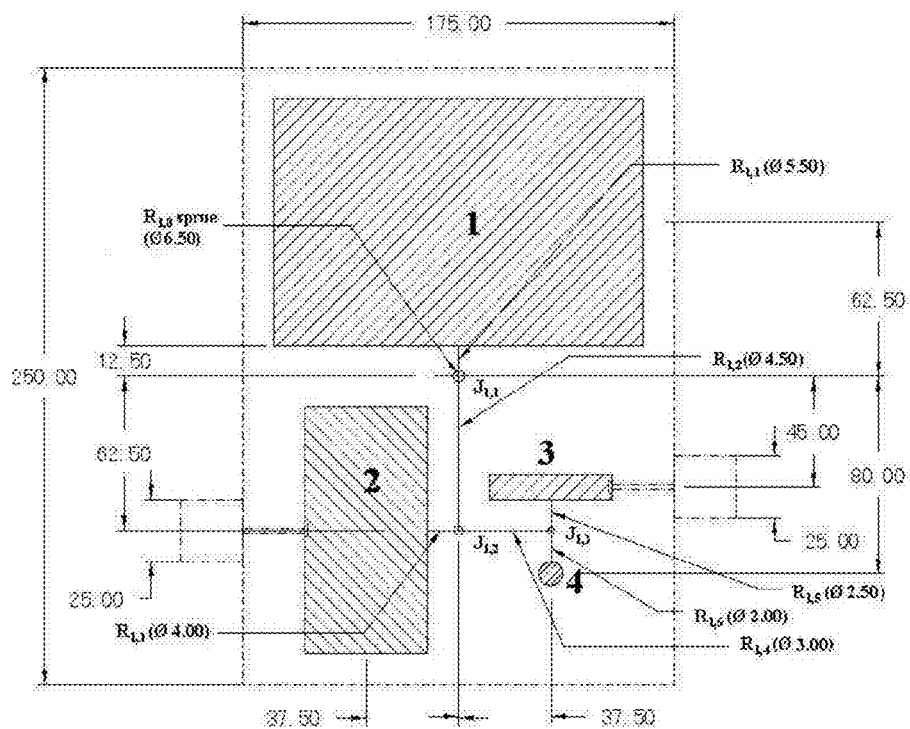
FIG. 41 shows the detail drawing of the best FMCRLD solution.

Based on the proposed GA and SG of FMCRLD integrated with mould design knowledge, the system can automatically generate a number of different feasible FMCRLD alternatives at random. FIG. 38 shows some examples of initial generation of FMCRLD alternatives. As shown in FIG. 39, the result of the evolutionary design process is illustrated by the graph of Average CP and Best CP vs. generations. The six different designs (starting from a to f) attached to the Best CP curve represent the best individual obtained in the population in different generations. Design (a) is obtained from the initial random generation of designs and becomes the best one due to its relatively higher $P_f$ value (see Table 4). After a number of generations, a new Design (b) with a lower $C_m$ value is evolved from parents through the proposed crossover and mutation operations. Using the steady-state population model, the best individuals from the previous generation can always be preserved in the next generation. The worst individual is replaced by the better offspring in each generation. All individuals violating the mould base size constraint are penalised and they are replaced by better offspring eventually. Due to the higher weighting ratio on $P_f$, $P_r$, $C_m$ and $C_n$, individuals with a more balanced runner layout system, smaller mould base and mould insert can have better fitness values to survive and reproduce. More and more stronger offspring can be produced in the population. As shown in the "Average CP" curve in FIG. 39, the average CP value of the population is improving from generation to generation. As shown in the "Best CP" curve in FIG. 39, Design (e) appears at 87 generations and can keep the top position for a number of generations. Then, a new Design (f) is introduced into the population from mutation of Design (e) at 177 generations. Finally, the algorithm stops at 377 generations automatically because there is no change in the best CP value for over 200 generations. The running time is about 78 seconds. In this example, the average CP value of the population is improved from 182.46 to 102.62 (see the "Average CP" curve in FIG. 39). The best CP value is improved from 123.54 to 74.02 (see the "Best CP" curve in FIG. 39). The best value of Cost and Performance obtained are 6000.56 and 81.07 respectively (see the row of Design (f) in Table 5). This result shows that the best individual—Design (f) achieves the best performance and cost objectives among all individuals generated in all previous generations. If necessary, users can rerun the program using different sets of GA parameters, design objectives and constraints to explore the solution space. Besides, the present invention also provides rapid design visualisation and design feedback for users to fine-tune the design interactively. Then users can select the best trade-off solution between performance and cost. Based on the best solution, the ICMDLS can automatically generate the 3D mould layout design model for downstream detail mould design and manufacturing (see FIG. 40). Concurrently, the mould layout drawing associated with a table of bill of material, mould design configuration and specification can also be generated automatically. The detail FMCLRD drawing is shown in FIG. 41.

TABLE 2

The setting of design objectives and constraints in one embodiment

| Design objectives and constraints | Setting value |
| --- | --- |
| Performance goals | |
| Flow Path Balance Ratio (Pf) | 1.0 |
| Runner Diameter Balance Ratio (Pr) | 1.2 |
| Clamping Froce Balance value (Pc) | 10.0 |
| Drop Time value (Pd) | 0.2 |

TABLE 2-continued

The setting of design objectives and constraints in one embodiment

| Design objectives and constraints | Setting value |
|---|---|
| Performance objective weighting ratio | |
| Weight of ($P_f$) | 0.35 |
| Weight of ($P_r$) | 0.35 |
| Weight of ($P_c$) | 0.20 |
| Weight of ($P_d$) | 0.10 |
| Cost objective weighting ratio | |
| Weight of ($C_m$) | 0.50 |
| Weight of ($C_n$) | 0.20 |
| Weight of ($C_r$) | 0.10 |
| Weight of ($C_s$) | 0.10 |
| Weight of ($C_j$) | 0.10 |
| Constraints | |
| Penalty factor ($K_p$) | 0.1 |
| Maximum X | 510.0 |
| Maximum Y | 510.0 |
| Constraint type | soft |

TABLE 3

The initial setting of GA parameters in one embodiment

| GA parameter | Setting value |
|---|---|
| Population size | 500 |
| Number of generation | 1000 |
| Generation gap (G) | 1 |
| Crossover rate | 0.50 |
| Mutation rate | 0.10 |
| Tournament size | 2 |
| Stall generation | 200 |
| Maximum running time (sec) | 120 |

TABLE 4

The detailed cost and performance values of each outstanding individual at different generations

| Design | Performance | | | | Cost | | | | | Penalty |
|---|---|---|---|---|---|---|---|---|---|---|
| | $P_f$ | $P_r$ | $P_c$ | $P_d$ | $C_m$ | $C_n$ | $C_r$ | $C_s$ | $C_j$ | |
| a | 81.30 | 55.30 | 27.30 | 81.21 | 4334.40 | 475.20 | 28233.62 | 3080.00 | 21903.33 | 0.00 |
| b | 64.52 | 43.64 | 32.12 | 82.61 | 2912.76 | 472.50 | 24267.31 | 3200.00 | 20383.33 | 0.00 |
| c | 74.07 | 60.00 | 26.24 | 88.59 | 3314.52 | 378.00 | 20905.93 | 2688.00 | 20383.33 | 0.00 |
| d | 84.03 | 75.00 | 30.93 | 84.47 | 4334.40 | 407.36 | 19155.36 | 2760.00 | 21908.33 | 0.00 |
| e | 86.21 | 98.36 | 20.70 | 71.16 | 2907.00 | 486.00 | 20913.49 | 3200.00 | 24183.33 | 0.00 |
| f | 90.91 | 98.36 | 32.83 | 82.61 | 2912.76 | 472.50 | 20913.49 | 3200.00 | 20383.33 | 0.00 |

TABLE 5

The weighted cost performance values and chromosomes of each outstanding individual at different generations

| Design | Chromosome | CP | P | C |
|---|---|---|---|---|
| a | 1100: 1324: (5, 3, 1)(6, 1, 1)(7, 3, 1) (8, 1, 1) | 123.54 | 61.39 | 7584.44 |
| b | 0100: 1234: (6, 1, 1)(4, 3, 1)(3, 3, 1) (3, 3, 1) | 120.60 | 52.54 | 6335.94 |
| c | 1100: 1234: (5, 3, 1)(2, 3, 1)(3, 3, 1) (3, 3, 1) | 100.45 | 61.03 | 6130.59 |
| d | 1000: 2111: (5, 3, 1)(7, 3, 1) | 94.33 | 70.29 | 6631.04 |
| e | 1100: 1233: (6, 1, 1) (4, 3, 1) (3, 3, 1) | 84.11 | 75.85 | 6380.38 |
| f | 0100: 1233: (6, 1, 1) (4, 3, 1) (3, 3, 1) | 74.02 | 81.07 | 6000.56 |

The exemplary embodiments of the present invention are thus fully described. Although the description referred to particular embodiments, it will be clear to one skilled in the art that numerous variations and/or modifications may be made to the present invention without departing from the spirit or scope of the invention as broadly described. Hence this invention should not be construed as limited to the embodiments set forth herein.

The present invention is originally implemented as a third party application program seamlessly embedded into a commercial MCAD system to support FMCRLD automation and optimisation during the FMLD phase. However, there are many alternative embodiments that the present invention can be implemented.

Firstly, the efficiency and accuracy of cost estimation of family moulds largely rely on a quick and good FMCRLD decision made in the early quotation stage. However, no existing commercial software packages or patents can support automatic cost estimation of family moulds based on optimum FMCRLD solutions. The present invention can automatically generate multiple optimum FMCRLD solutions for users to select the best trade-off solution between performance and cost. Accordingly, the cost components (such as $C_n$, $C_m$, $C_r$, $C_s$ and $C_j$) of each optimised solution are calculated for fitness evaluation beforehand. These cost components determine the critical cost of a family mould. If the approximate manufacturing cost of each dissimilar cavity in a family mould can be input by the users or automatically estimated using other well-known mould cost estimation techniques, the present invention can be implemented not only as an intelligent design tool but also as an innovative cost estimation solution to fill the market gap in the area of cost estimation of family moulds.

Secondly, existing commercial mould flow CAE software packages, such as MOLDFLOW® Insight and Moldex3d®, cannot perform automatic artificial filling balance considering the global optimisation of cavity layout, runner lengths and diameters simultaneously. The present invention can provide the best FMCRLD for mould flow CAE engineers to achieve the global optimum artificial filling balance in the early mould design phase, saving a huge amount of time and money spent on performing artificial filling balance on numerous different FMCRLD alternatives. If the present invention can be seamlessly integrated with the existing commercial mould flow CAE software packages, it will become a powerful automatic design and analysis tool for solving the complex problem of the global optimisation of artificial filling balance of family moulds in industry.

Figure 42:
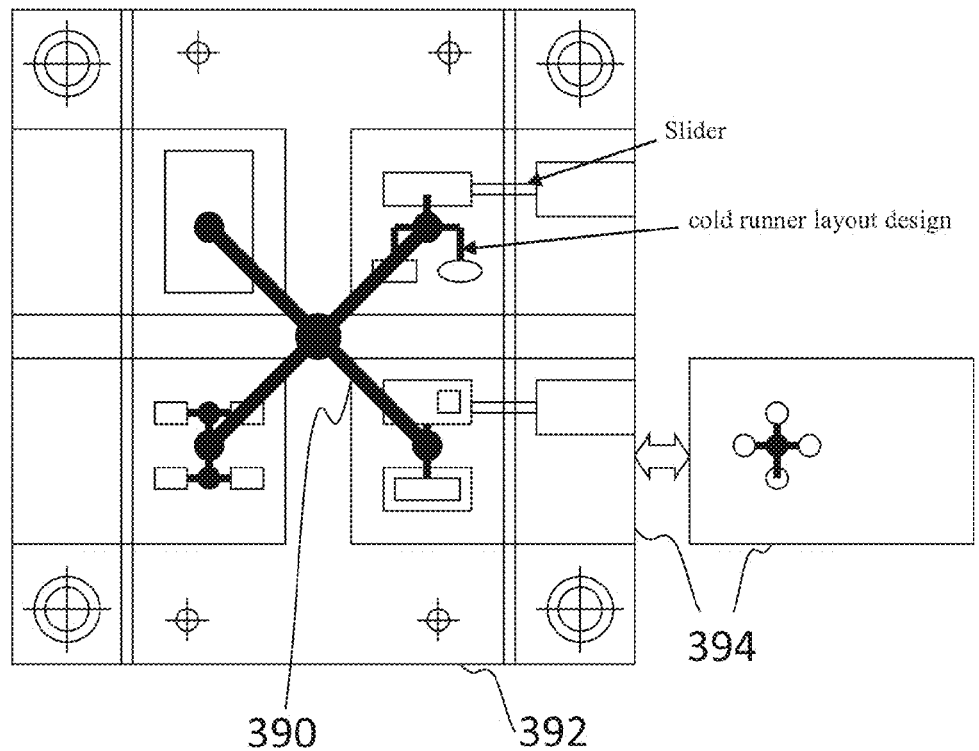
FIG. 42 shows the modular tooling concept.
Figure 43:
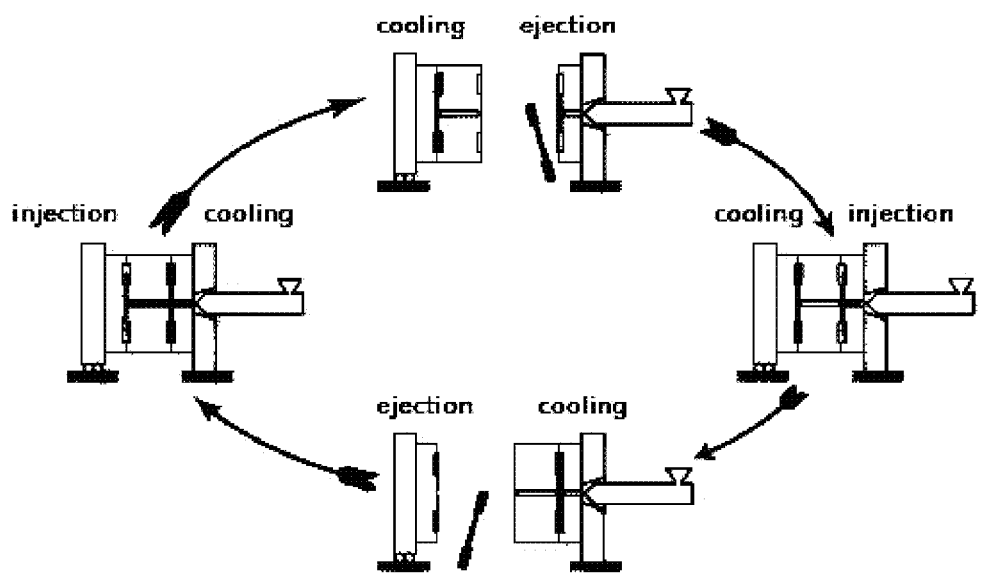
FIG. 43 shows the operation cycle of a tandem mould.

Thirdly, traditional family moulds have not been acceptable for high precision applications due to the difficulties of balancing dissimilar cavities. Family moulds have been largely limited to low tolerance moulding parts over the years. However, this will no longer be a limitation if all dissimilar moulding parts of a family mould can be direct-gated and perfectly balanced with advanced Dynamic Feed® hot runner technology. The Dynamic Feed® hot runner system can provide real time closed loop pressure control to each dissimilar cavity independently, achieving tight dimensional control of each moulding part regardless of the dissimilar cavity geometries and sizes in a family mould. However, the major drawback of incorporating this dynamic feed system in a traditional family mould is the high start-up cost (approximately US$60,000 for a typical 4-drop mould). Therefore, it is not economic to build such expensive stand-alone dynamic feed hot runner family moulds only for one-off low-volume production of high precision injection moulding parts, not to mention for prototype quantities. However, if the expensive dynamic feed hot runner system can be reused for a number of different low-volume or prototype mould projects over and over again, the combination of the dynamic feed hot runner technology with the family mould concept will become a flexible and cost-effective solution. In the aspect of the modular tooling concept, the virtual cavity groups used in the present invention can be viewed as flexible modular tooling components manufactured for different products for different customers sharing the same mould base and the expensive dynamic feed hot runner system. As shown in FIG. 42, the 4-drops dynamic feed hot runner system 390 is incorporated in the universal "quick-change" mould base 392 capable of producing different moulding parts with four interchangeable mould inserts at once. Each interchangeable mould insert module 394 can be regarded as an individual small mould sub-assembly having its own cavities, runners, cooling circuit, sliders, ejectors and cavity pressure sensors, while the hot runner drop can be viewed as a hot runner nozzle for each small mould. This highly flexible modular mould combined with dynamic feed hot runner technology can offer faster lead times on tooling, lower tooling costs and better operational efficiency. On the other hand, Tandem moulds can be viewed as alternatively opening stack moulds having two parting levels allowing for alternatively filling and subsequently de-moulding during the operational cycle (see FIG. 43). Especially when the cooling times are relatively long, this alternative moulding process of a tandem mould can make use of the idle time to perform other moulding tasks on another parting level to increase the productivity like merging two moulds into one. If this Tandem mould concept is combined with the dynamic feed hot runner modular mould, it can achieve the double output within the same cycle time as in the standard mould. However, no research, commercial software packages or patented system can support hot runner layout design automation and optimisation for family moulds. The present invention can be customised to support design automation and optimisation of a dynamic feed hot runner tandem modular mould by adding a set of SG runner layout rules. The existing fitness evaluation function developed in this invention can be reused, but the estimated cost of the hot runner system must be added to the cost function. Besides, the existing rule for selecting the mould base must also be modified to accommodate the hot runner assembly. Then the present invention will be able to search for the global optimum cavity and hot runner layout design of a family mould considering a number of design objectives and constraints in relation to both hot runner layout design and family mould design. With regard to dynamic feed hot runner modular mould design automation and optimisation, it also can be viewed as a complex combinatorial FMCRLD optimisation problem. In the case of ordinary 4-drops hot runner module tooling (single parting level), the number of cavity groups is fixed at 4. Accordingly, the algorithm for generating the initial population can be used to generate the fixed internal cavity layout and the primary hot runner layout. The existing chromosome design and the SG rules can be reused, but genetic operations on the gene for storing the group placement rule number in the group session are omitted. Each cavity group can be viewed as a smaller mould accommodated inside a bigger mould base. The usable area of the smaller mould is fixed. Therefore, a new penalty function for handling the constraints of oversized cavity groups should be added to the fitness evaluation function. Besides, the algorithm for grouping sliders should consider the grouping of sliders for each cavity group instead of each side of the mould. In the case of 8-drops tandem modular tooling (two parting levels and 4-drops on each level), the number of cavity groups should be fixed at 8. For example, cavity groups 1-4 are on level 1 while cavity groups 5-8 are on level 2. A new set of runner layout SG rules also needs to be added for generating runner layout on different parting levels. Then the present invention can automatically determine the best combination of cavity grouping and runner layout design for each interchangeable mould insert.

Some function-oriented architectural space layout design projects (such as for hospitals, factories and airports) involve not only designing topological and geometrical relationships but also combinatorial grouping problems among space elements. For example, different grouping of functional departments in a hospital, facilities in a factory, and functional areas in an airport affect their working capacity and workflow efficiency. By analogising the FMCRLD to the architectural space layout design, a space element can be viewed as a room, department or group of facilities. The runner network connecting all cavities can be considered the travelling path network connecting all departments or work groups, or a HVAC (Heating, Ventilation and Air Conditioning) routing network in the building. The mould base size constraint can be regarded as a limitation of the usable area in the construction site. Similarly, a space element can be an electronic component in a circuit board, a component in a machine, a paragraph, article or advertisement in a web page, magazine or newspaper, an item in a user-interface menu of a device and so forth. A space element's group can be a module in a circuit board, a module in a machine, a functional group in a web page, magazine or newspaper, a module in a user-interface menu of a device and so forth. A network connecting all space elements can be viewed as a wiring in a circuit broad and machine, visual travelling path in a web page, magazine or newspaper, a visual and pointing device travelling path in a user-interface menu of a device and so forth. The present invention provides the hybrid SG-based chromosome and group-oriented SG-based genetic operators that enable GA to automate and optimise a wide range of complex combinatorial layout design problems.

What is claimed is:
1. A method executed by a computer system that provides a family mould layout to a user, the method comprising:
receiving, by the computer system, a knowledgebase with a plurality of rules;

encoding, by the computer system, a family mould layout design to a chromosome by:
    encoding an orientation of a cavity in a family mould by an orientation session of said chromosome;
    encoding design information of a cavity group by a group session of said chromosome; and
    encoding geometric and topological layout information of said cavity and a runner that connects to said cavity by a group layout shape rule session of said chromosome;
decoding, by the computer system and a Genotype-Phenotype mapping module, said chromosome to a phenotype, wherein each said phenotype represents a family mould layout solution;
receiving, by the computer system and via a user input interface, design specific parameters that include information of a plurality of moulding parts, design objectives and constrains, moulding requirements, predefined parameters and stopping criteria;
generating, by the computer system and a Genetic Algorithm module, a population of valid chromosomes and evolving said population towards a resulting population that satisfies said design specific parameters over successive generations, wherein in each of said generations, said population of said valid chromosomes is mapped to a corresponding population of family mould layout solutions by said Genotype-Phenotype mapping module;
displaying, by the computer system and on a display to the user, said family mould layout solutions on the display through an instant design feedback of quantitative fitness values;
receiving, by the computer system and from the user, a selection of a best family mould layout solution; and
generating, by the computer system, a mould design assembly model and a family mould layout based on said best family mould layout solution.

2. The method according to claim 1, wherein said knowledgebase includes:
    group placement rules;
    internal cavity layout rules;
    runner layout shape rules;
    a plurality of mould design knowledgebase, wherein said plurality of mould design knowledgebase comprise standard mould base database, empirical formulae of runner sizes, empirical cavity layout design rules and empirical design rules of sliders; and
    feasible family mould layout design alternatives generated by applying said group placement rules, said internal cavity layout rules, and said runner layout shape rules to various initial shapes.

3. The method according to claim 1, wherein said family mould layout includes at least two cavity groups, wherein each of said cavity groups includes at least one cavity; said at least one cavity within each of said cavity groups being connected by at least one runner.

4. The method according to claim 2, wherein said Genotype-Phenotype mapping module further comprises:
    reading, by the computer system, data of said chromosome;
    decoding, by the computer system, each said chromosome based on said knowledgebase;
    computing, by the computer system and for each of said cavity groups, assembly coordinates;
    computing, by the computer system and for each said cavity, assembly coordinates;
    generating, by the computer system, said runner that connects said cavity within each of said cavity groups;
    selecting, by the computer system, a suitable mould base from said standard mould base database in said knowledgebase that accommodates said cavity groups;
    determining, by the computer system, a diameter of said runner according to said empirical formulae of runner sizes in said knowledgebase; and
    determining, by the computer system, configurations of sliders based on said empirical design rules of sliders in said knowledgebase.

5. The method according to claim 1, wherein said Genetic Algorithm module includes:
    generating, by the computer system, a population of valid chromosomes based on said knowledgebase;
    decoding, by the computer system and said Genotype-Phenotype mapping, said population of valid chromosomes to a population of phenotypes;
    evaluating, by the computer system and a fitness evaluation algorithm, fitness values of said population of phenotypes;
    selecting, by the computer system, two chromosomes from said population of valid chromosomes as parents based on said fitness values;
    generating, by the computer system and a crossover operation on said patents, at least one valid offspring chromosome;
    mutating, by the computer system and a mutation operation, said at least one valid offspring chromosome randomly;
    decoding, by the computer system and said Genotype-Phenotype mapping, said at least one valid offspring chromosome to an offspring phenotype;
    evaluating, by the computer system and said fitness evaluation algorithm, fitness values of said offspring phenotype;
    identifying, by the computer system, a lowest rank chromosome in said population of valid chromosomes according to said fitness values of said population of valid chromosomes;
    replacing, by the computer system, said lowest rank chromosome with said at least one valid offspring chromosome if said fitness values of said at least one valid offspring chromosome are higher than said fitness values of said lowest rank chromosome;
    repeating, by the computer system, steps in the method until a pre-defined generation gap is attained; and
    repeating, by the computer system, steps in the method until one of said stopping criteria is attained.

6. The method according to claim 5, wherein said generating a population of valid chromosomes based on said knowledgebase includes:
    generating, by the computer system, a plurality of cavity groups randomly, wherein quantity of said plurality of cavity groups is greater than two and less than or equal to quantity of said moulding parts;
    filling, by the computer system, said group session of said population of valid chromosomes by assigning at least one of said moulding parts to each of said cavity groups;
    filling, by the computer system, said group layout shape rule session of said population of valid chromosomes with a combination of valid identification numbers of group placement rules, internal cavity layout rules and runner layout shape rules respectively; wherein said valid identification numbers are chosen randomly but said combination is conformed to said knowledgebase; and filling, by the computer system, said orientation session of said population of valid chromosomes by assigning an orientation parameter to each said plurality of moulding parts.

7. The method according to claim 5, wherein said evaluating fitness values of said population of phenotypes and said evaluating fitness values of said offspring phenotype includes:
calculating, by the computer system, a first weighted sum of a plurality of costs;
calculating, by the computer system, a second weighted sum of a plurality of performance values; and
computing, by the computer system, said fitness values, wherein each of said fitness values is a ratio of said first weighted sum to said second weighted sum.

8. The method according to claim 7, wherein said plurality of costs comprise cost of mould insert, cost of mould base, cost of runners, cost of external sliders, cost of injection moulding and penalty cost of violating said design specific parameters; and said plurality of quantitative performance values comprises a flow path balance performance value, a runner diameter balance performance value, a clamping force balance performance value, and a drop time performance value.

9. The method according to claim 5, wherein said crossover operation includes:
selecting, by the computer system, at least one gene in said group layout shape rule session as a crossing group in each of said parents randomly;
injecting, by the computer system, said crossing group of said parents into each other;
copying, by the computer system, corresponding gene in said orientation session and said group session associated with at said crossing group of said two parents into each other to generate at least one offspring chromosome;
eliminating, by the computer system, moulding parts that occur more than once and cavity groups that do not contain any moulding part in said at least one offspring chromosome to generate said at least one valid offspring chromosome; and
changing, by the computer system, sliders based on a new location and an orientation of said plurality of moulding parts.

10. The method according to claim 5, wherein said mutation operation includes:
changing, by the computer system, said orientation session of said at least one valid offspring chromosome randomly;
changing, by the computer system, said group session of said at least one valid offspring chromosome randomly and eliminating empty cavity groups therefrom;
creating, by the computer system, a new cavity group in said group layout shape rule session of said at least one valid offspring chromosome randomly, assigning one of said moulding parts to said new cavity group randomly and updating said group session of said at least one valid offspring chromosome accordingly; and
randomly modifying said group placement rules, said internal cavity layout rules or said runner layout shape rules of at least one group in said group layout shape rule session of said at least one valid offspring chromosome.

11. The method according to claim 1, wherein said stopping criteria include:
maximum number of generations specified by said user is reached;

maximum running time specified by said user is reached;
no improvement of said fitness values over a predefined number of generations is found.

12. A method executed by a computer system that provides a combinatorial layout design to a user, the method comprising:
receiving, by the computer system, a knowledgebase for said combinatorial layout design;
encoding, by the computer system, said combinatorial layout design to a chromosome by:
encoding orientation information of a space element by an orientation session of said chromosome;
encoding space element grouping information by a group session of said chromosome; and
encoding geometric and topological layout information of said space element by a group layout shape rule session of said chromosome;
decoding, by the computer system and a Genotype-Phenotype mapping module, said chromosome to a phenotype wherein each said phenotype represents a combinatorial layout solution;
receiving, by the computer system and a user input interface, design specific parameters;
generating, by the computer system and a Genetic Algorithm module, a population of valid chromosomes and evolve said population towards a resulting population that satisfies said design specific parameters over successive generations; wherein in each of said generations, said population of said valid chromosomes is evolved by a crossover operator and a mutation operator and decoded to a corresponding population of valid layout solutions by said Genotype-Phenotype mapping module; and
generating, by the computer system, layout design assembly models and a combinatorial layout design based on one of said valid layout solutions.

13. The method according to claim 12, wherein said combinatorial layout design includes at least two space element groups; each of said space element groups includes at least one space element.

14. The method according to claim 13, wherein said Genotype-Phenotype mapping module performs:
reading data of said chromosome;
decoding each said chromosome based on said knowledgebase;
computing coordinates for each said space element in each of said space element groups; and
selecting a suitable layout base from said knowledgebase for accommodating said space element groups.

15. The method according to claim 12, wherein said crossover operator performs:
selecting two chromosomes from said population of valid chromosomes as parents;
selecting at least one gene in said group layout shape rule session as crossing group in each said parents randomly;
injecting said crossing group of said parents into each other;
copying corresponding gene in said orientation session and said group session associated with at least one of said crossing group of said two parents into each other to generate at least one offspring chromosome; and
eliminating space elements that occur more than once and space element groups that do not contain any space element in said at least one offspring chromosome to generate at least one valid offspring chromosome.

16. The method according to claim 12, wherein said mutation operator performs:

changing said orientation session of said chromosome randomly;
changing said group session of said chromosome randomly and eliminating empty space element groups therefrom;
creating a new space element group in said group layout shape rule session of said chromosome randomly, assigning one of said space elements to said new space element group randomly and updating said group session of said chromosome accordingly; and
randomly modifying the information in said group layout shape rule session of said chromosome.

* * * * *